(12) United States Patent
Furuuchi et al.

(10) Patent No.: US 10,593,494 B2
(45) Date of Patent: Mar. 17, 2020

(54) SWITCH DEVICE, ELECTRONIC COMPONENT, AND BATTERY SYSTEM

(71) Applicant: DEXERIALS CORPORATION, Tokyo (JP)

(72) Inventors: Yuji Furuuchi, Tochigi (JP); Yoshihiro Yoneda, Tochigi (JP); Koichi Mukai, Tochigi (JP); Kazuyuki Sakakibara, Aichi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/766,853

(22) PCT Filed: Oct. 5, 2016

(86) PCT No.: PCT/JP2016/079593
§ 371 (c)(1),
(2) Date: Apr. 9, 2018

(87) PCT Pub. No.: WO2017/061453
PCT Pub. Date: Apr. 13, 2017

(65) Prior Publication Data
US 2018/0294118 A1 Oct. 11, 2018

(30) Foreign Application Priority Data

Oct. 7, 2015 (JP) .................... 2015-199815

(51) Int. Cl.
*H01H 35/18* (2006.01)
*H01M 2/34* (2006.01)
(Continued)

(52) U.S. Cl.
CPC ............ *H01H 35/18* (2013.01); *G01M 3/045* (2013.01); *G01M 3/16* (2013.01); *G01M 3/40* (2013.01);
(Continued)

(58) Field of Classification Search
CPC .......... G01M 3/045; G01M 3/16; G01M 3/40; H01H 35/18; H01M 2/34
See application file for complete search history.

(56) References Cited

U.S. PATENT DOCUMENTS 2,049,321 A * 7/1936 Sampson ............... G08B 17/06
200/61.19
4,015,616 A * 4/1977 Hanff ................... A01G 25/167
137/78.3
(Continued)

FOREIGN PATENT DOCUMENTS

CN 2657184 Y 11/2004
CN 201060799 Y 5/2008
(Continued)

OTHER PUBLICATIONS

Nov. 22, 2016 International Search Report issued in International Patent Application No. PCT/JP2016/079593.
(Continued)

*Primary Examiner* — Sisay Yacob
(74) *Attorney, Agent, or Firm* — Oliff PLC

(57) ABSTRACT

A switch device capable of safely opening or short-circuiting an electrical circuit in response to an abnormality such as wetting with water or liquid leaking from a battery is provided. The device includes first and second conductors connected to an external circuit, and a reaction part including an insulating material which changes state on contact with a liquid, the first and second conductors being electrically connected or disconnected by the insulating material changing state on contact with the liquid.

23 Claims, 42 Drawing Sheets

(51) Int. Cl.
    *G01M 3/16*      (2006.01)
    *G01M 3/04*      (2006.01)
    *G01M 3/40*      (2006.01)
    *H01H 35/42*     (2006.01)
    *H01H 29/02*     (2006.01)
    *H01M 10/42*     (2006.01)

(52) U.S. Cl.
    CPC ............ *H01H 29/02* (2013.01); *H01H 35/42* (2013.01); *H01M 2/34* (2013.01); *H01M 10/4228* (2013.01); *H01M 2200/00* (2013.01)

(56) References Cited

U.S. PATENT DOCUMENTS

| | | |
|---|---|---|
| 5,842,346 A | 12/1998 | Hsu |
| 2004/0221817 A1* | 11/2004 | Hatfield ............... A01K 7/02 119/74 |
| 2008/0038588 A1* | 2/2008 | Lee ................... H01M 2/0267 429/2 |

FOREIGN PATENT DOCUMENTS

| | | |
|---|---|---|
| CN | 202003902 U | 10/2011 |
| JP | S50-19488 U | 3/1975 |
| JP | H10-208598 A | 8/1998 |
| JP | H11-144695 A | 5/1999 |
| JP | H11-345551 A | 12/1999 |
| JP | 2000-162081 A | 6/2000 |
| JP | 2002-055015 A | 2/2002 |
| JP | 2002-090251 A | 3/2002 |

OTHER PUBLICATIONS

Jul. 22, 2019 Office Action issued in Chinese Patent Application No. 201680055486.6.

Oct. 25, 2019 Office Action issued in Japanese Patent Application No. 2015-199815.

Dec. 12, 2019 Office Action issued in Taiwanese Patent Application No. 105132134.

* cited by examiner

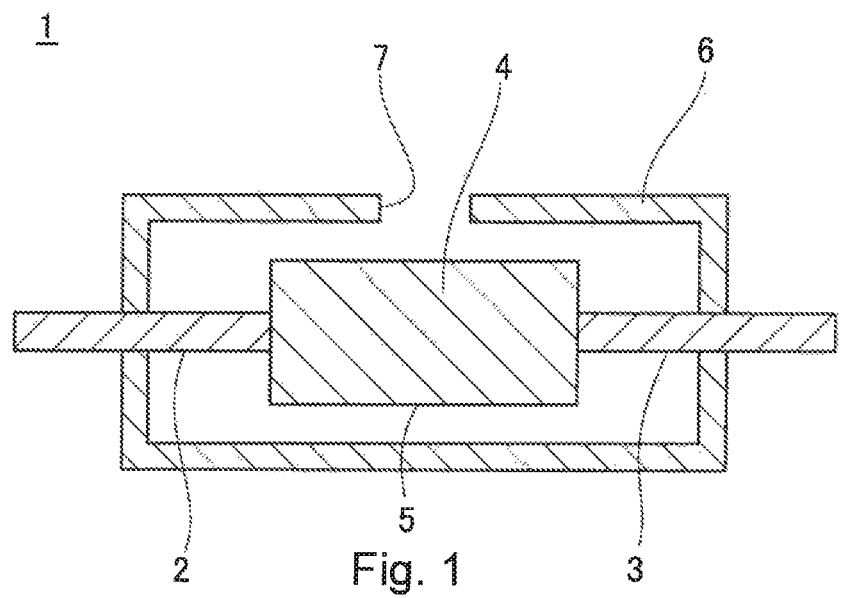

SWITCH DEVICE, ELECTRONIC COMPONENT, AND BATTERY SYSTEM

TECHNICAL FIELD

The present disclosure relates to a switch device for opening and short-circuiting an electric circuit in response to an entering liquid as well as an electronic component and battery system incorporating the same. This application claims priority to Japanese Patent Application No. 2015-199815 filed on Oct. 7, 2015, the entire contents of which are hereby incorporated by reference.

BACKGROUND ART

In recent years, lithium ion secondary batteries have been incorporated in a large number of mobile phones and laptops, among other electronic appliances. Lithium ion secondary batteries have high energy densities and, to ensure the safety of users and electric appliances, are typically provided with several protective circuits incorporated in the battery pack for over-charging protection and over-discharging protection to interrupt the input and output of the battery pack under predetermined conditions. However, if a positive/negative electrode insulation fitting portion were to be corroded by being wet, there is a possibility that pressure from the interior of the battery might leak and a safety valve might malfunction to cause a fire.

CITATION LIST

Patent Literature

PLT 1: Japanese Unexamined Patent Application Publication No. H11-144695
PLT 2: Japanese Unexamined Patent Application Publication No. 2000-162081

SUMMARY OF INVENTION

Technical Problem

Some batteries have employed seals applied for detecting evidence of and providing a warning for exposure to water (for example, see PLT 1); however, battery use is not restricted, potentially creating a risk of a circuit malfunction caused, for example, by migration (degraded insulation) or short circuits due to a wet circuit substrate. Furthermore, a malfunction equivalent to that described above might occur in the case of leaking electrolyte solution accompanying a battery abnormality.

As a measure for wetting of electronic appliances with water, sensors for detecting liquids such as water have been provided which activate a protective circuit by transmitting a signal from the sensor when detecting water. For example, a water leak sensor having a detector constituted by a pair of electrodes disposed on an insulating substrate to face each other across a predetermined interval has been proposed (for example, see PLT 2). In this water leak sensor, when there is water between the electrodes of the detector, electricity leaking between terminals causes a signal to be input to a control circuit to control operation of the device. Because liquid has to enter into the detector to trigger operation, this water wetting sensor requires a configuration to actively draw water into the detector in a wet state; however, in states other than the wet state, in which activating the control circuit is unnecessary, the sensor must avoid improper activation so as to ensure reliability as a sensor.

In view of such conventional circumstances, an object of the present disclosure is to provide a switch device capable of safely opening or short circuiting an electrical circuit in response to an abnormality such as wetting with water or liquid leaking from a battery.

Solution to Problem

In order to solve the above problem, a switch device according to the present disclosure includes first and second conductors connected to an external circuit, and a reaction part having an insulating material which changes state on contact with a liquid, the first and second conductors being electrically connected or disconnected by the insulating material changing state on contact with the liquid which has entered the device interior.

Furthermore, an electronic component according to the present disclosure includes an external-connection terminal connected to an external circuit and a reaction part having an insulating material which changes state on contact with a liquid, the external-connection terminal being electrically insulated by the insulating material expanding, contracting, agglomerating, or dissolving on contact with a liquid.

Furthermore, a battery system according to the present disclosure includes a battery and a reaction part having an insulating material which changes state on contact with a liquid, a positive electrode or negative electrode of the battery being electrically insulated by the insulating material expanding, contracting, agglomerating, or dissolving on contact with the liquid.

Advantageous Effects of Invention

According to the present disclosure, a reacting part includes an insulating material which changes state on contact with a liquid, and by the insulating material contacting liquid which has entered the device interior, because a first and a second conductor are electrically connected or opened, it is possible to safely and reliably open or short-circuit an external circuit in response to an abnormality such as wetting with water or liquid leaking from a battery.

BRIEF DESCRIPTION OF DRAWINGS

FIG. 1 is a schematic diagram of a switch device according to the present disclosure.

FIG. 19 (B) is a cross-sectional view illustrating a state in which an outer surface of an inner conductor is coated with an electrically insulating coating; and FIG. 19 (C) is a cross-sectional view illustrating a state in which an insulating film is interposed between an outer conductor and an inner conductor.

DESCRIPTION OF EMBODIMENTS

Figure 2A:
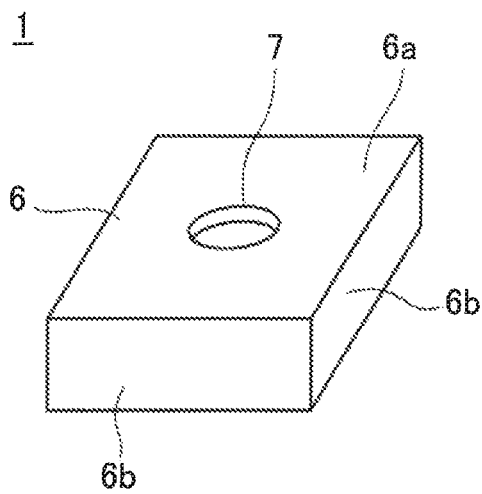
FIG. 2 illustrates a housing of a switch device in perspective views of (A) a configuration having a guiding inlet formed on a top surface, (B) a configuration having a plurality of guiding inlets formed on a top surface, (C) a configuration having a guiding inlet formed on a top surface and a side surface, and (D) a configuration having a plurality of guiding inlets formed on a top surface and side surfaces.
Figure 2B:
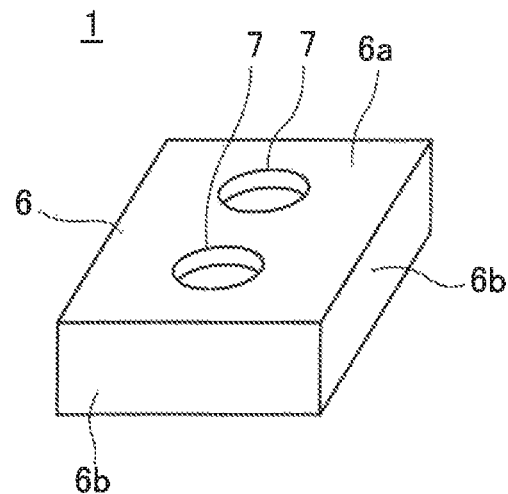
Figure 2C:
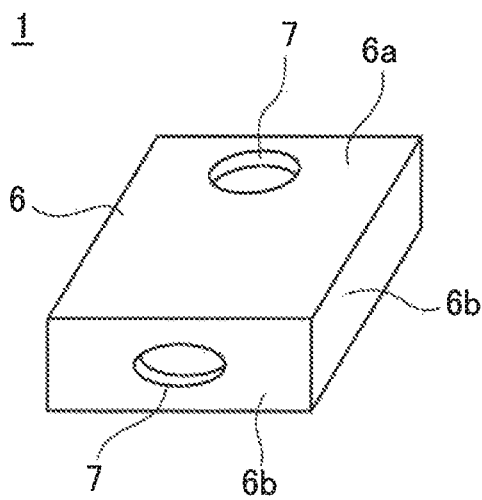
Figure 2D:
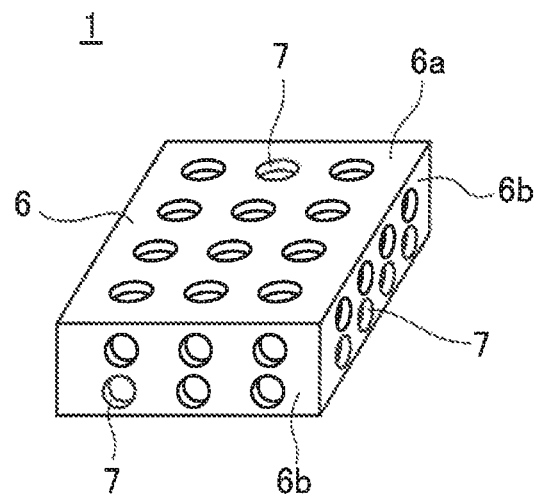

Embodiments of a switch device, an electronic component, and a battery system according to the present disclosure will now be more particularly described with reference to the accompanying drawings. It should be noted that the present disclosure is not limited to the embodiments described below and it is a matter of course that various modifications can be added to the embodiments without departing from the scope of the present disclosure. Furthermore, the features illustrated in the drawings are illustrated schematically and are not intended to be drawn to scale. Actual dimensions should be determined in consideration of the following description. Moreover, those skilled in the art will appreciate that dimensional relations and proportions may be different among the drawings in some parts.

Switch Device 1

A switch device according to the present disclosure is incorporated into an external circuit such as a battery circuit or a warning circuit and interrupts the battery circuit or powers the warning circuit or a protective circuit in a wet state such as in the case of submersion in water or liquid leakage. Referring to FIG. 1, the switch device 1 includes first and second conductors 2, 3 connected to an external circuit, and a reaction part 5 including an insulating material 4 which changes state on contact with a liquid, the first and second conductors 2, 3 being electrically connected or disconnected by the insulating material 4 changing state on contact with the liquid. In the switch device 1, the first and second conductors 2, 3 and reaction part 5 are arranged within a housing 6.

Conductors

By connecting the first and second conductors 2, 3 between open ends of the external circuit in which the switch device 1 is incorporated, the first and second conductors 2, 3 serve as members for electrically connecting an external circuit, and, for example, it is possible to use known conductive components such as lead wires or metal terminal pieces.

In the switch device 1, connecting ends of the first and second conductors 2, 3 are led to the exterior of the housing 6 and are connected to a terminal portion of the external circuit, allowing connection with the external circuit. Moreover, the switch device 1 may be connected to the external circuit by connecting the first and second conductors 2, 3 to an external-connection electrode formed on an insulating substrate provided in the housing 6 and connected with an open terminal of the external circuit.

Under normal conditions, the switch device 1 either electrically connects the external circuit via the first and second conductors 2, 3 or opens the external circuit by separating the first and second conductors 2, 3; on contacting a liquid, the reaction part 5 reacts to separate or connect the first and second electrodes 2, 3 to open or electrically connect the external circuit.

Reaction Part

The reaction part 5 utilizes a state change in an electrically insulating material 4 caused by contacting a liquid to irreversibly connect or separate the first and second conductors 2, 3. As the insulating material 4, any electrically insulating material which changes state such as by expanding, contracting, softening, dissolving, or agglomerating on contact with a liquid may be used, and a suitable material can be selected in accordance with method of connecting or separating the first and second conductors 2, 3 and with state change requirements depending on factors such as form of the first and second conductors 2, 3 and housing 6.

Candidates for the insulating material 4 include, for example, natural polymers such as agar and gelatin, semi-synthetic polymers such as cellulose and starch, and synthetic polymers such as polyvinyl alcohol, among others. These contract or dissolve on contact with a liquid, and, in the case of high molecular weights, tend to expand instead of dissolve. Moreover, as the insulating material 4, in the case of using a water-soluble solid such as solidified sugar, the material dissolves or is reduced in volume when contacting a liquid.

Furthermore, assuming an electrolyte solution such as of ethylene carbonate filling a battery cell as the liquid, in the case of a switch device for activating in response to leaking battery electrolyte solution, examples of the insulating material 4 include ABS, polyacrylonitrile, polyvinylidene fluoride, and saturated polyesters such as PET, PTT, and PEN, among others. In these insulating materials 4 as well, because there are cases in which high molecular weights reduce dissolution rates and thus might reduce the reaction time of the switch device 1, when giving priority to reaction rates, it is preferable to adjust the degree of polymerization.

The housing 6 of the switch device 1 can be formed of an electrically insulating material such as various engineering plastics, and ceramics, among other materials. By providing the switch device 1 with the housing 6, it is possible to protect the first and second conductors 2, 3 and the reaction part 5.

In the housing 6, a guiding inlet 7 is provided for guiding liquid to the reaction part 5. In the switch device 1, liquid flowing into the reaction part 5 through the guiding inlet 7 provided in the housing 6 causes irreversible electrical connection or separation of the first and second conductors 2, 3.

For example, as illustrated in FIG. 2 (A), the housing 6 is polyhedral and provided with one guiding inlet 7 on one surface. In the case of forming the switch device 1 as a chip component for mounting on a circuit substrate on which the external circuit is formed, it is preferable to provide the guiding inlet 7 on a top surface 6a which is opposite to a mounting surface of the housing 6. Providing the guiding inlet 7 on the top surface 6a allows efficient intake of liquid into the housing 6 in a wet state and retention of liquid in the reaction part 5, allowing connection or separation of the first and second conductors 2, 3. It is a matter of course that the housing 6 may have the guiding inlet 7 formed on a surface other than the top surface 6a, for example, a side surface 6b. Furthermore, as illustrated in FIG. 2 (B), the housing 6 may have a plurality of guiding inlets 7 on the top surface 6a or may have a plurality of guiding inlets 7 on the side surface 6b. Providing the plurality of the guiding inlets 7 in the housing 6 can promote guidance of water into the reaction part 5.

Moreover, as illustrated in FIG. 2 (C), the housing 6 may be polyhedral and have the guiding inlet 7 on a plurality of surfaces, for example, on a top surface 6a and a side surface 6b. Furthermore, as illustrated in FIG. 2 (D), the housing 6 may have one or a plurality of the guiding inlets 7 on each of a plurality of surfaces.

Figure 3:
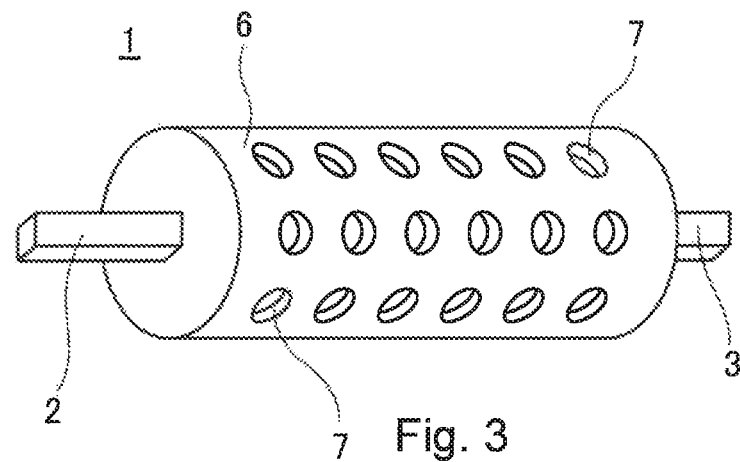
FIG. 3 is a perspective view illustrating a switch device employing a round tube-shaped housing.

The housing 6 may be a cylindrical shape or a prism shape and the guiding inlet 7 may be formed in any position and in any number. FIG. 3 is an external perspective view of the switch device 1 in which the housing 6 is formed in a cylindrical shape and a plurality of the guiding inlets 7 are formed around the entire circumference. By forming the housing 6 in a cylinder or prism shape, the guiding inlets 7 can be formed irrespective of surfaces/angles and liquid entrance path which would outer wise depend on orientation of the switch device 1.

Figure 4:
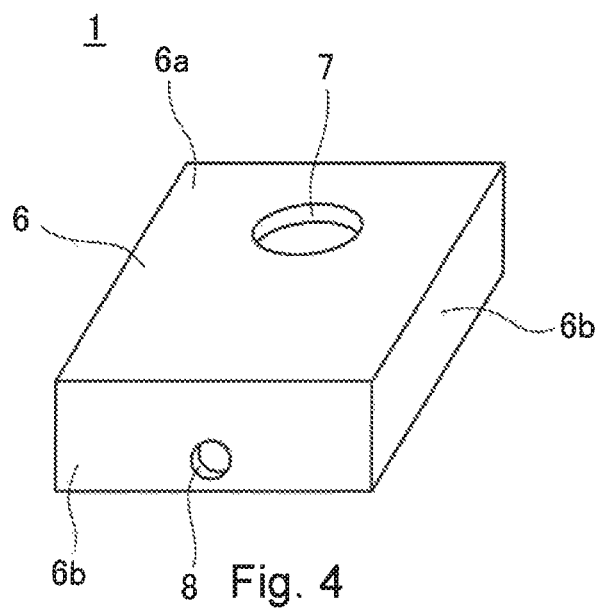
FIG. 4 is a perspective view illustrating a switch device employing a housing having a discharging outlet.

A discharging outlet may be formed in the housing 6 for discharging liquid entering via the guiding inlet 7. FIG. 4 is an external perspective view illustrating the switch device 1 provided with the housing 6 in a polyhedral shape having the guiding inlet 7 formed on the top surface 6a and a discharging outlet 8 for discharging liquid formed on a side surface 6b. Forming the discharging outlet 8 can prevent reductions in reaction rates in the reaction part 5 due to factors such as cooling caused by a large amount of liquid entering the housing 6. Moreover, one or more discharging outlets can be formed.

The discharging outlet 8 is preferably formed smaller than the guiding inlet 7. By making the discharging outlet 8 relatively small, it is possible to prevent excessive discharge of liquid entering the housing 6 from causing a delay in the action of the reaction part 5.

Figure 5:
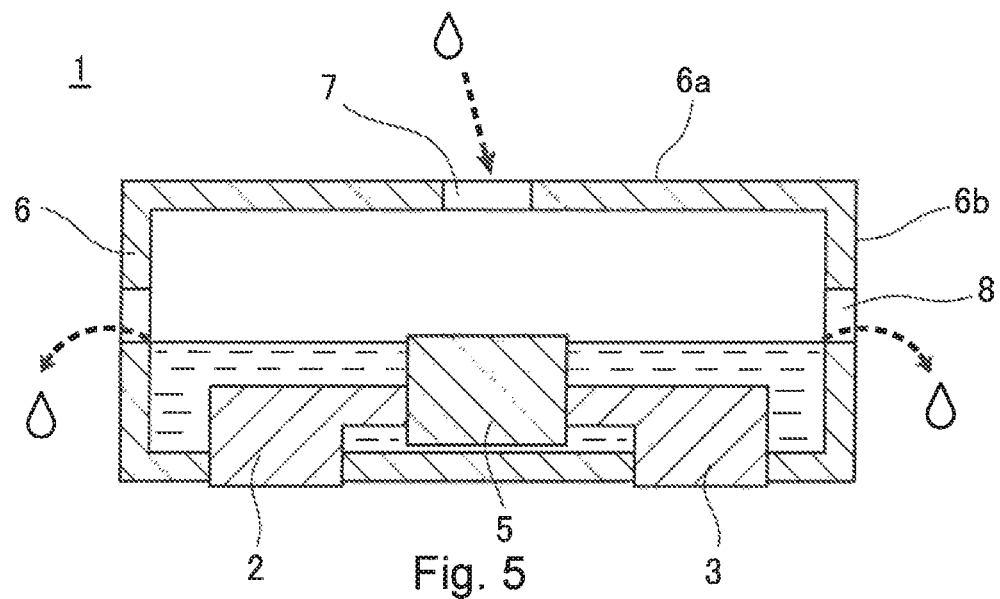
FIG. 5 is a cross-sectional view illustrating a switch device in which a discharging outlet is provided at the same height as a reaction part.

Furthermore, the discharging outlet 8 is preferably provided at the same height as the position at which the reaction part 5 of the housing 6 is provided, or higher than the position at which the reaction part 5 is provided. For example, as illustrated in FIG. 5, the housing 6 is formed in a polyhedral shape and, in the case of being fanned as a chip component on a circuit substrate, the discharging outlet 8 is preferably provided on the side surface 6b of the housing 6 at the same height as or higher than the position at which the reaction part 5 is provided. Thereby, liquid entering the housing 6 remains in the reaction part 5 while portions above the reaction part 5 are drained, which can ensure action of the reaction part 5 and prevent reductions in reaction rates in the reaction part 5 due to influences such as cooling caused by a large amount of liquid entering the housing 6.

Figure 6:
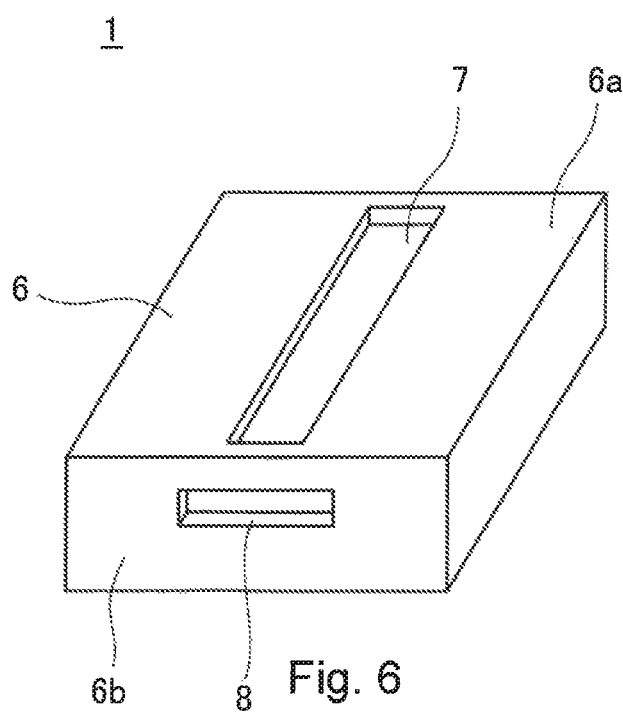
FIG. 6 is a cross-sectional view illustrating a switch device employing a housing having a slit-shaped guiding inlet and a slit-shaped discharging outlet formed therein.

The guiding inlet 7 for guiding liquid and the discharging outlet 8 for discharging liquid may be any shape, for example, circular or rectangular. Furthermore, as illustrated in FIG. 6 the guiding inlet 7 and the discharging outlet 8 may be formed in a slit shape, Forming the guiding inlet 7 in a slit shape can guide liquid over a wider range, enabling rapid reaction in the reaction part 5 and electrical connection or separation of the first and second conductors 2, 3. Moreover, by forming the discharging outlet 8 in a slit shape, it is possible to rapidly drain excess liquid entering the housing 6 and prevent influences, such as cooling caused by a large amount of liquid entering the housing 6, from reducing reaction rates in the reaction part 5.

Figure 7A:
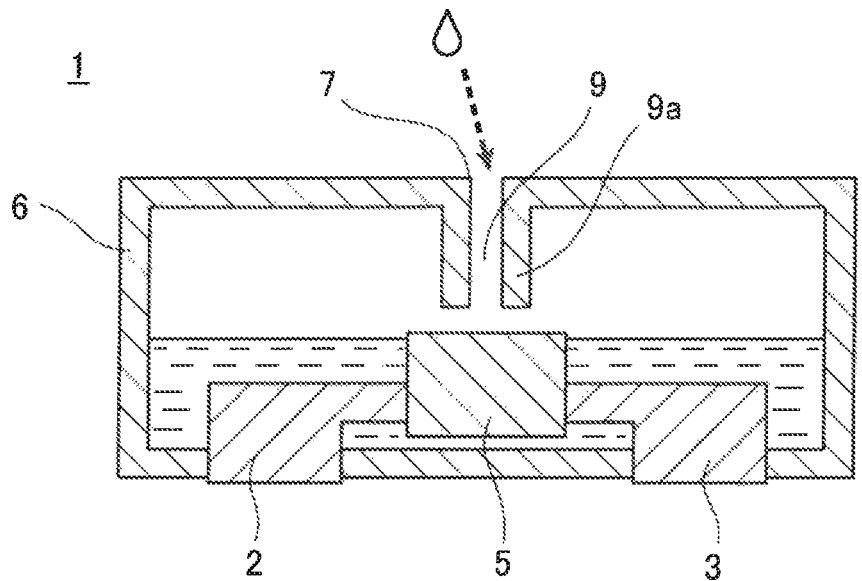
FIG. 7 illustrates a switch device employing a housing having a guiding conduit in (A) a cross-sectional view and (B) an external perspective view.
Figure 7B:
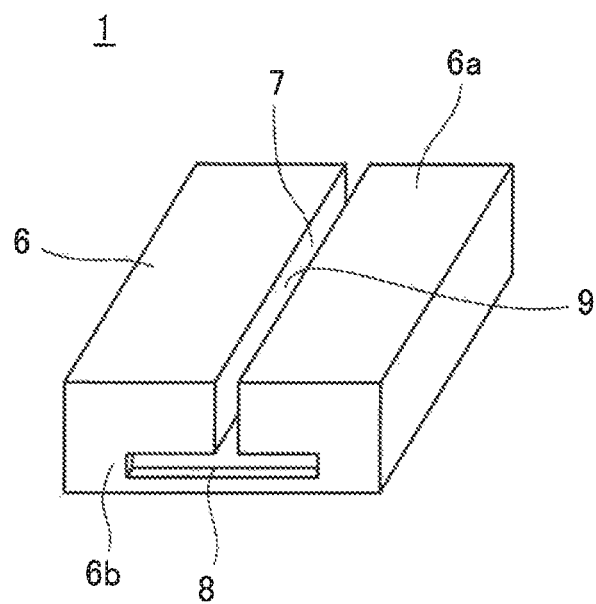

In addition to providing the housing 6 with a slit-shaped guiding inlet 7 on the top surface 6a, the housing 6 may be provided with a guiding conduit 9 for guiding the liquid to the reaction part 5. As illustrated in FIG. 7 (A), the guiding conduit 9 includes a conduit wall 9a extending from the guiding inlet 7 formed in the top surface 6a to the vicinity of the reaction part 5. This ensures that liquid entering the housing 6 via the guiding inlet 7 is guided to the reaction part 5 and does not flow to locations other than the reaction part 5. This also prevents scattering of liquid entering the housing 6 through the guiding inlet 7, thus preventing delays in connection or separation of the first and second conductors 2, 3 by the reaction part 5.

In the housing 6, as illustrated in FIG. 7 (B), the guiding conduit 9 may extend to the side surface 6b and made continuous with the discharging outlet 8 formed in the side surface 6b. Thereby, in the housing 6, liquid entering via the guiding inlet 7 can be effectively guided to the reaction part 5 and excess liquid can be effectively drained via the discharging outlet 8.

Figure 8A:
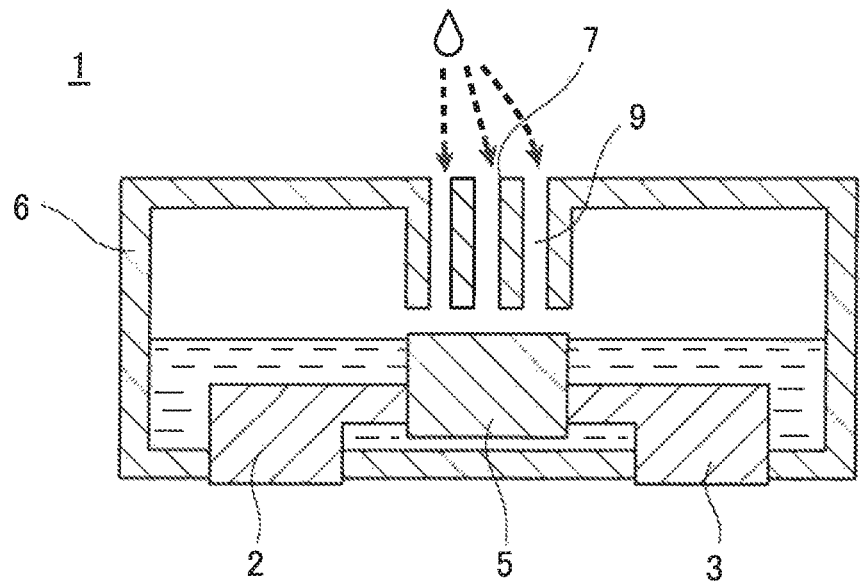
FIG. 8 illustrates a switch device employing a housing provided with a plurality of guiding conduits in (A) a cross-sectional view and (B) an external perspective view.
Figure 8B:
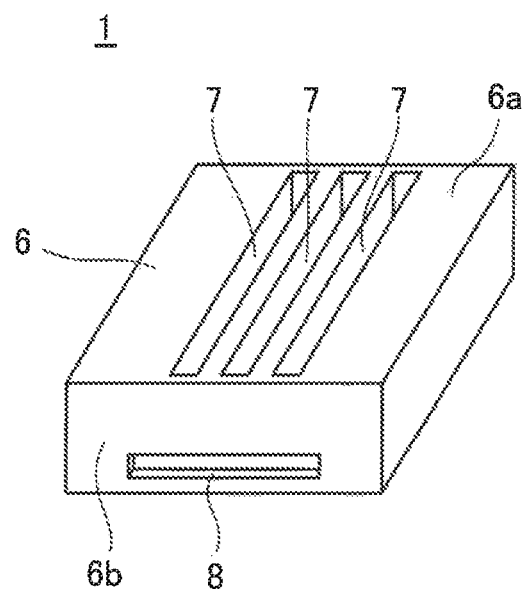

It should be noted that, as illustrated in FIGS. 8 (A) and (B), a plurality of the guiding inlets 7 and the guiding conduits 9 may be formed. By forming a plurality of the guiding conduits 9, it is possible to guide the liquid across the entire width of the reaction part 5.

Figure 9A:
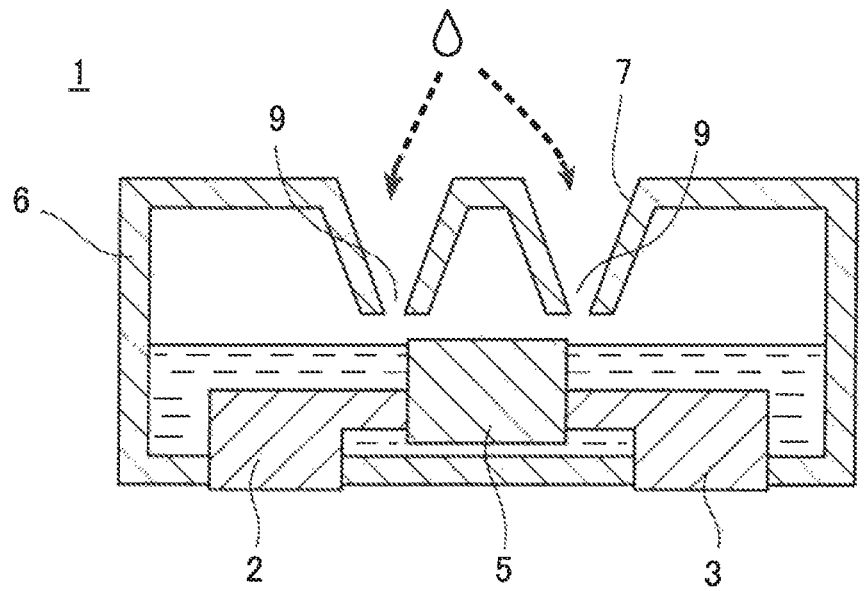
FIG. 9 (A) is a cross-sectional view illustrating a switch device employing a housing in which a guiding conduit progressively narrows towards the interior in which a reaction part is provided and FIG. 9 (B) is a cross-sectional view illustrating a switch device in which an inside of a guiding conduit is sealed with a water-soluble sealing material.
Figure 9B:
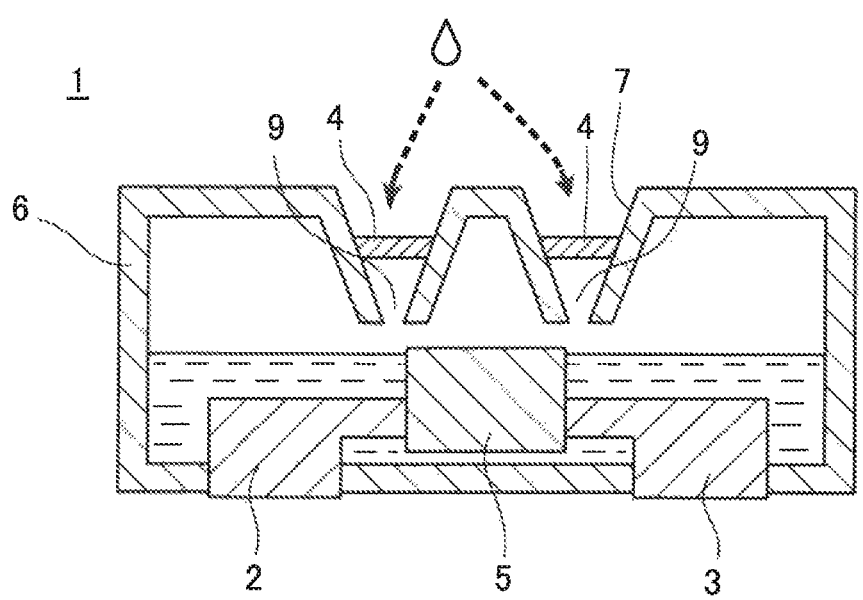

In the switch device 1, as illustrated in FIG. 9 (A), the guiding conduit 9 may progressively narrow from the opening of the guiding inlet 7 in the top surface 6a towards the interior in which the reaction part 5 is provided. By the guiding conduit 9 tapering as it approaches the reaction part 5, it is possible to effectively guide liquid entering via the opening of the guiding inlet 7 to the reaction part 5 by using capillary action.

Moreover, as illustrated in FIG. 9 (B), in the switch device 1, the inside of the guiding conduit 9 may be sealed by the insulating material 4 which dissolves on contact with a liquid. By blocking the guiding conduit 9 with the water-soluble insulating material 4, in states other than a wet state which should activate the switch device 1, small volumes of liquid can be repelled and not allowed to enter the housing 6, thereby preventing improper activation and ensuring reliability as a sensor.

Figure 10:
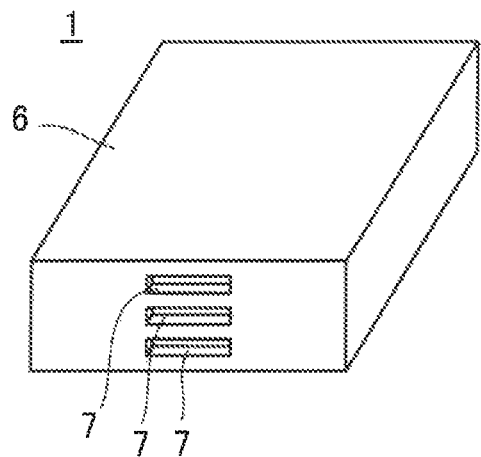
FIG. 10 is a perspective view illustrating a switch device employing a housing having guiding inlets formed at heights in accordance with positions of a conductor and a reaction part.

As illustrated in FIG. 10, the guiding inlet 7, or the guiding inlet 7 and the guiding conduit 9, may be formed in the housing 6 of the switch device 1 in a position in accordance with the reaction part 5. In the switch device 1, as in an example configuration of the first and second conductors 2, 3 and reaction part 5 illustrated in FIG. 14, a first and second terminal pieces 21, 22 and the insulating material 4 which expands on contact with a liquid are arranged within the housing 6, and the guiding inlet 7, or the guiding inlet 7 and the guiding conduit 9, may be formed in the side surface 6b at a height corresponding to the position of the insulating material 4.

Forming the guiding inlet 7 in a position in accordance with the position of the reaction part 5 enables effective guidance of a large volume of liquid through the guiding inlet 7 to the first and second conductors 2, 3 and reaction part 5 so that reaction in the reaction part 5 is effective and connection or separation of the first conductor 2 can be promoted in the switch device 1.

Figure 11:
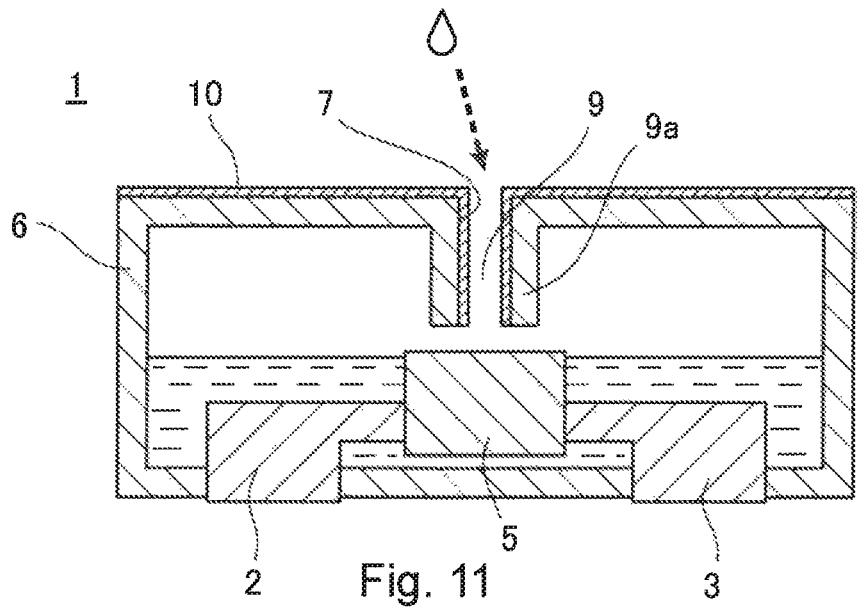
FIG. 11 is a cross-sectional view illustrating a switch device employing a housing subjected to a water repellent treatment portion in a location other than a reaction part.

Furthermore, liquid may be led to the reaction part 5 in the switch device 1 by subjecting a location other than the reaction part 5 to a water repellent treatment. For example, as illustrated in FIG. 11, in the switch device 1, a water repellent treated portion 10 subjected to a water repellent treatment may be formed in the guiding inlet 7, or on the guiding inlet 7 and conduit wall 9a of the guiding conduit 9. It is thereby possible to effectively guide liquid entering through the guiding inlet 7 to the reaction part 5 in the switch device 1. In addition, by subjecting the guiding inlet 7 or the guiding conduit 9 to a water repellent treatment, in states other than a wet state which should activate the switch device 1, small volumes of liquid can be repelled and not allowed to enter the housing 6, thereby preventing improper activation and ensuring reliability as a sensor.

Moreover, in the switch device 1, an interior wall of the housing 6 may be subjected to a water repellent treatment. By subjecting the interior wall of the housing 6 to a water repellent treatment, liquid entering the housing 6 can be effectively guided to the reaction part 5 so that action of the reaction part 5 can occur rapidly.

Figure 12:
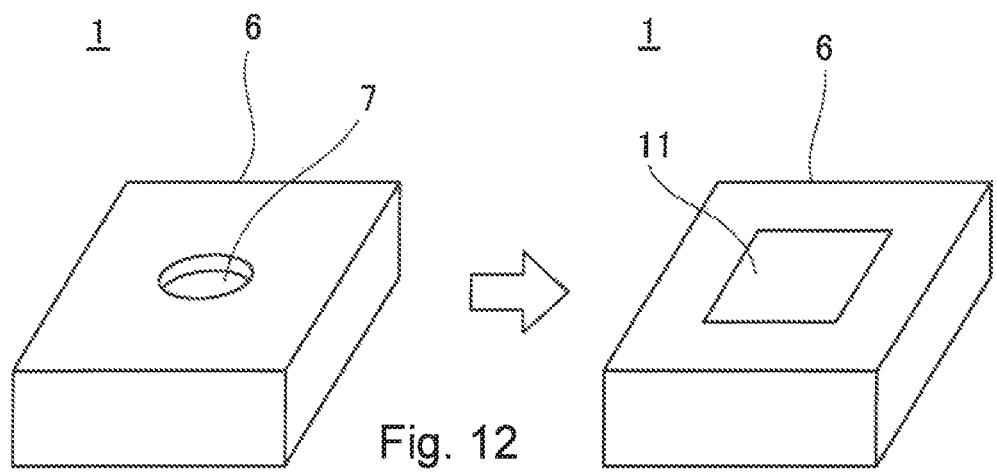
FIG. 12 is a perspective view illustrating a switch device employing a housing in having a guiding inlet sealed with a water-soluble insulating material.

Furthermore, as illustrated in FIG. 12, in the switch device 1, the guiding inlet 7 of the housing 6 may be closed up by the insulating material 4 which dissolves on contact with liquid. For example, a sheet 11 made of the insulating material 4 which is liquid-soluble is pasted onto a surface of the housing through which the guiding inlet 7 opens to close up the switch device 1.

By pasting the sheet 11 to the top surface 6a of the housing 6 to block the guiding inlet 7, small amounts of liquid which should not activate the switch device 1 can be prevented from entering the guiding inlet 7, thus ensuring reliability of the switch device 1 as a sensor. It should be noted that, in the switch device 1, in addition to pasting the sheet 11 made of the insulating material 4, the insulating material 4 may be applied to or filled in the guiding inlet 7 so as to block the guiding inlet 7. The activation condition of the switch device 1, which is entrance of water into the guiding inlet 7, can be adjusted by selecting thickness and constituents of the insulating material 4.

Similarly, in the switch device 1, as illustrated in FIG. 9 (B), the guiding conduit 9 may be blocked by the insulating material 4 which is liquid-soluble and dissolves in a liquid. By blocking the guiding conduit 9 with the liquid-soluble insulating material 4, small amounts of liquid can be repelled and not allowed to enter the housing 6, thereby preventing improper activation.

Figure 13A:
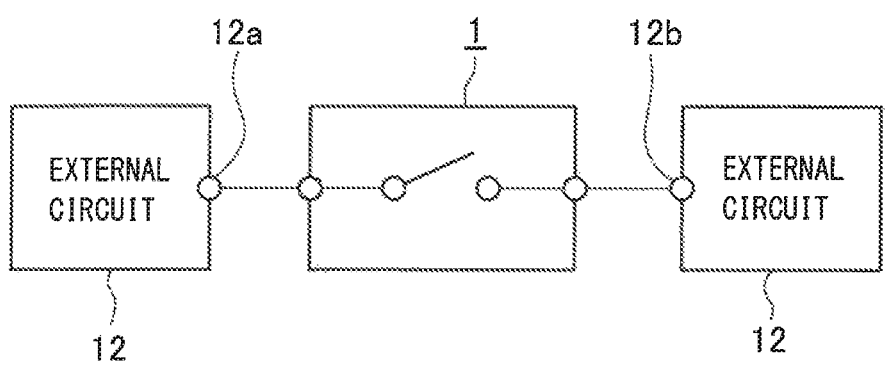
FIG. 13 is a circuit diagram of a switch device connected to an external circuit representing (A) a state in which the external circuit is open and (B) a state in which the external circuit is electrically connected.
Figure 13B:
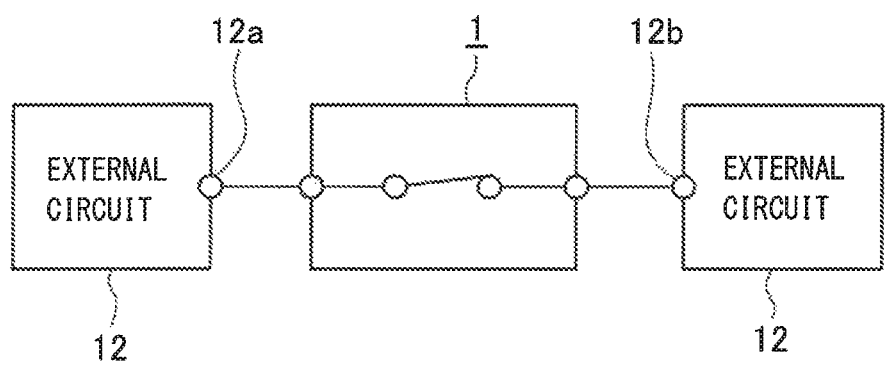

FIG. 13 has circuit diagrams representing the switch device 1. In the switch device 1, the first and second conductors 2, 3 are connected to one open end 12a and the other open end 12b of an external circuit 12 such that the switch device opens (FIG. 13 (A)) the external circuit 12 before activation. Then, when liquid enters the housing 6 in a wet state, the insulating material 4 of the reacting part 5 changes state and the first and second conductors 2, 3 are connected (FIG. 13 (B)) so that the switch device 1 allows current to flow between each open end 12a, 12b of the external circuit 12.

Therefore, by connecting the external circuit 12 such as an alarm circuit for outputting an alarm, a protective circuit for interrupting a charging/discharging path of a battery, or a backup circuit, these external circuits can be activated in response to an abnormality such as wetting with water or liquid leaking from a battery.

Inversely, the switch device 1 may connect (in FIG. 13 (B)) the external circuit 12 before activation; when liquid enters the housing 6 in a wet state, the insulating material 4 of the reaction part 5 changes state and the first and second conductors 2, 3 are separated (in FIG. 13 (A)) so as to open the open ends 12a, 12b of the external circuit 12.

Alternative Example 1 of the Switch Device

Figure 14:
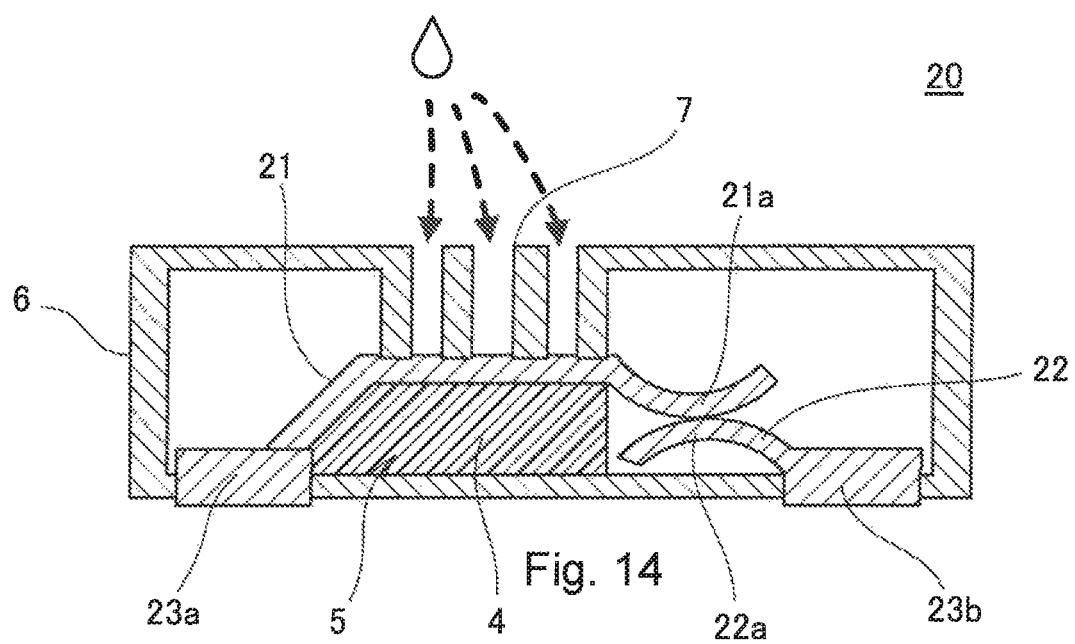
FIG. 14 is a cross-sectional view of a switch device using a pair of metal terminal pieces as conductors.

Next, an example configuration of the first and second conductors 2, 3 and reaction part 5 will be more particularly described. FIG. 14 is a cross-sectional view of one example of the switch device. A switch device 20 illustrated in FIG. 14 uses a first and second terminal pieces 21, 22 as the first and second conductors 2, 3. The first and second metal terminal pieces 21, 22 are respectively connected to external-connection electrodes 23a, 23b provided in the housing 6 and have contacting portions 21a, 22a in mutual contact; under normal conditions, the contact portion 21a is urged into contact with the contact portion 22a from above. The external-connection electrode 23a is connected to one open end of the external circuit and the external-connection electrode 23b is connected to the other open end of the external circuit. Thereby, the external circuit is normally electrically connected via the first and second metal terminal pieces 21, 22.

Figure 15A:
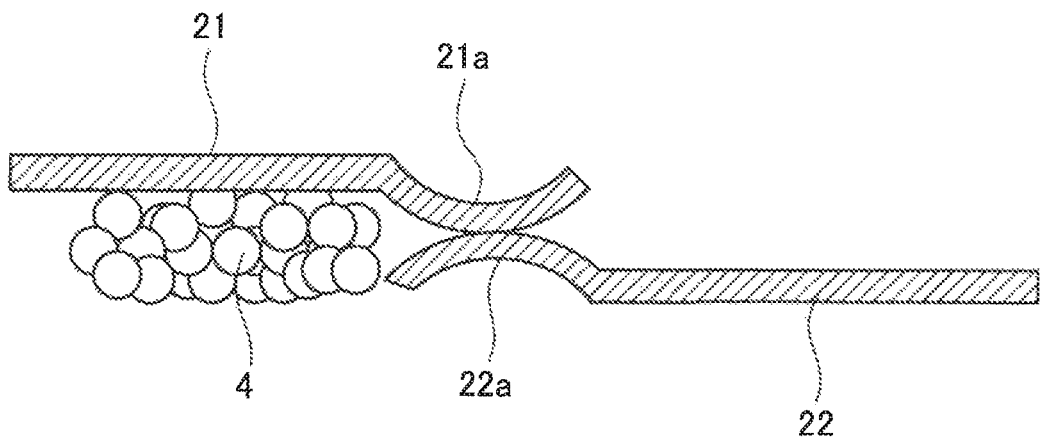
FIG. 15 is a view illustrating connected and separated states of a pair of metal terminal pieces in (A) a state in which the metal terminal pieces are connected before the insulating material contacts a liquid and (B) a state in which the insulating material has contacted a liquid and expanded so that the pair of metal terminal pieces are separated.
Figure 15B:
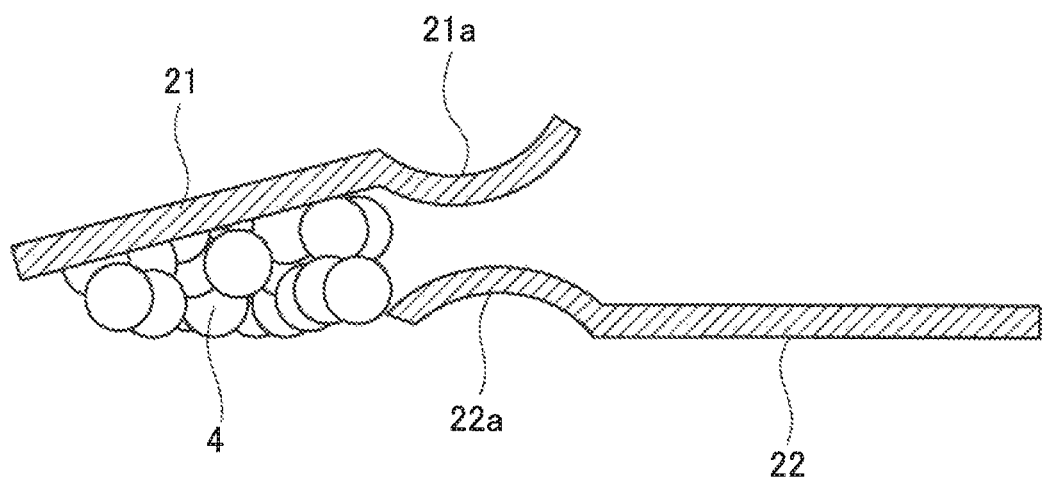

Under the first metal terminal piece 21, a reaction part 5 having an insulating material 4 which changes state on contact with a liquid is provided. The insulating material 4 used in the reaction part 5 of the switch device 20 expands on contact with a liquid. As illustrated in FIG. 15 (A), in the switch device 20, the insulating material 4 is disposed under the first metal terminal piece 21 and, in a state before liquid enters the housing 6, the contact portion 21a of the first metal terminal piece 21 and the contact portion 22a of the second metal terminal piece 22 are in contact, thus electrically connecting the external circuit. Then, when liquid enters the housing 6 of the switch device 20, such as when wet with water or liquid leaks from a battery, as illustrated in FIG. 15 (B), the insulating material 4 of the reaction part 5 expands on contact with the liquid and pushes the first metal terminal piece 21 upwards. This separates the contact portion 21a of the first metal terminal piece 21 and the contact portion 22a of the second metal terminal piece 22, thereby interrupting the external circuit.

It should be noted that the switch device 20 may use an insulating material 4 which contracts or dissolves on contact with a liquid, the first and second metal terminal pieces 21, 22 being separated under normal conditions; by the insulating material 4 contracting or dissolving, the first and second metal terminal pieces 21, 22 are connected. In this case, under normal conditions, the first and second metal terminal pieces 21, 22 are urged in a direction towards connection; by providing the insulating material 4 under the first metal terminal piece 21, in a state before liquid enters the housing 6, the contact portion 21a of the first metal terminal piece 21 and the contact portion 22a of the second metal terminal piece 22 are separated. Then, when liquid enters the housing 6, the insulating material 4 contracts or dissolves, causing the first and second metal terminal pieces 21, 22 to elastically return, thus bringing the contact portions 21a, 22a into contact with each other.

Figure 16A:
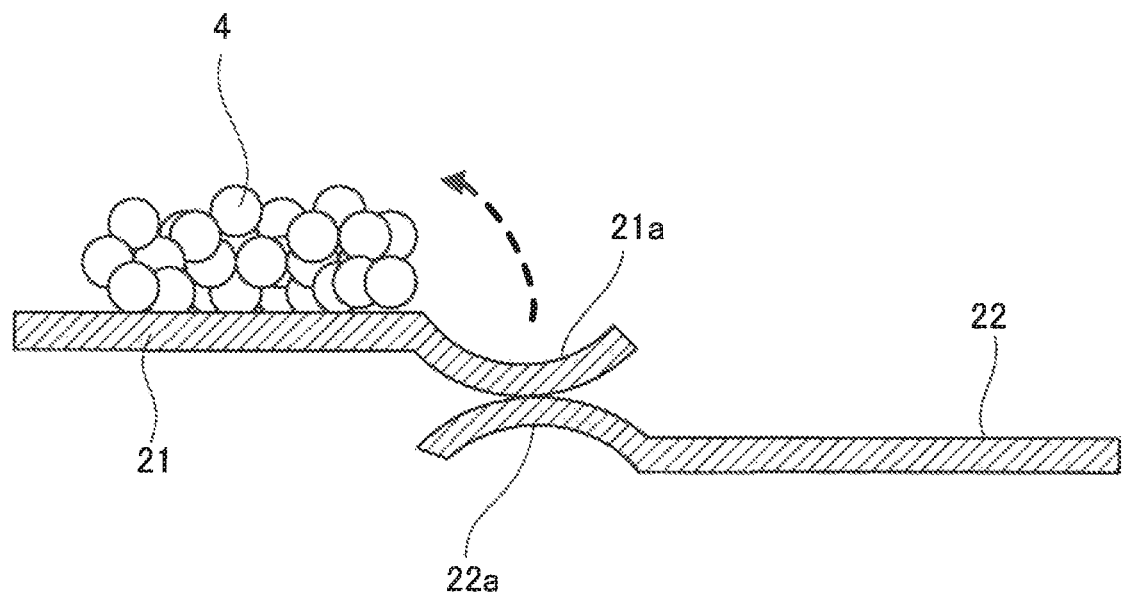
FIG. 16 is a view illustrating connected and separated states of a pair of metal terminal pieces in (A) a state in which the metal terminal pieces are connected before the insulating material contacts a liquid and (B) a state in which the insulating material has contacted a liquid and contracted, dissolved, softened, or otherwise changed state, so that the pair of metal terminal pieces are separated.
Figure 16B:
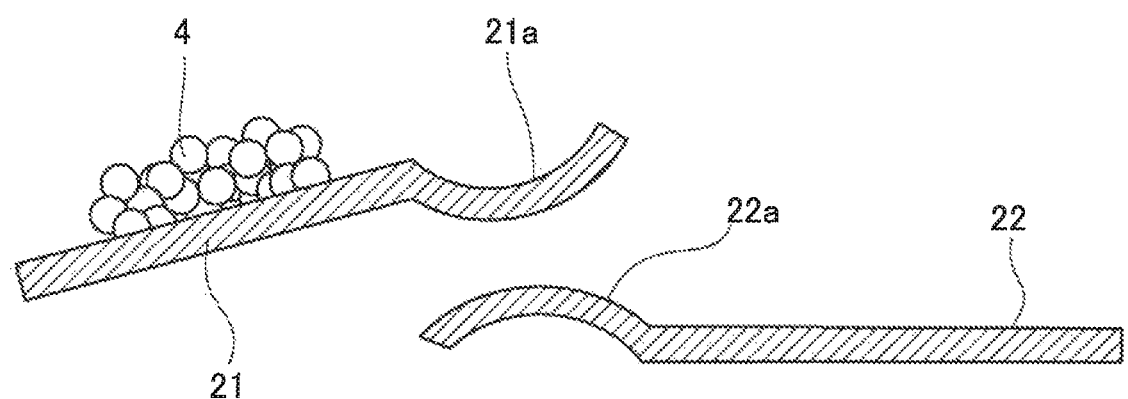

Furthermore, as illustrated in FIG. 16, the first metal terminal piece 21 may be urged in a direction away from a connection between the contact portion 21a and the contact portion 22a of the second metal terminal piece 22 and, under normal conditions, may be pressed downwards by the insulating material 4 so as to contact the second metal terminal piece 22. The insulating material 4 uses a material which, for example, contracts, dissolves or softens on contact with a liquid and is arranged on an upper side of the first metal terminal piece 21.

As illustrated in FIG. 16 (A), in the switch device 20, in a state before liquid enters the housing 6, by the first metal terminal piece 21 being pressed downwards by the insulating material 4 the contact portion 21a contacts the contact portion 22a of the second metal terminal piece 22, thus electrically connecting the external circuit. Then, in the switch device 20, when liquid enters the housing 6, such as when wet with water or liquid leaks from a battery, as illustrated in FIG. 16 (B), the insulating material 4 of the reaction part 5 contacts the liquid and changes state, for example, by contracting, dissolving, or softening, so as to have properties which are overcome by internal stress in the first metal terminal piece 21, and the first metal terminal piece 21 elastically returns in a separating direction away from the second metal terminal piece 22. Thus, the contact portion 21a of the first metal terminal piece 21 separates from the contact portion 22a of the second metal terminal piece 22, thereby interrupting the external circuit.

It should be noted that the switch device 20 may use an insulating material 4 which expands on contact with a liquid to connect the first and second metal terminal pieces 21, 22 which are separated. In this case, the insulating material 4 is disposed above the first metal terminal piece 21. The first and second metal terminal pieces 21, 22 are urged in a direction away from connection therebetween, and in a state before liquid enters the housing 6, the contact portion 21a of the first metal terminal piece 21 and the contact portion 22a of the second metal terminal piece 22 are separated. Then, when a liquid enters the housing 6, the insulating material 4 expands and presses downwards on the first metal terminal piece 21, thus bringing the contact portion 21a into contact with the contact portion 22a of the second metal terminal piece 22.

Figure 17A:
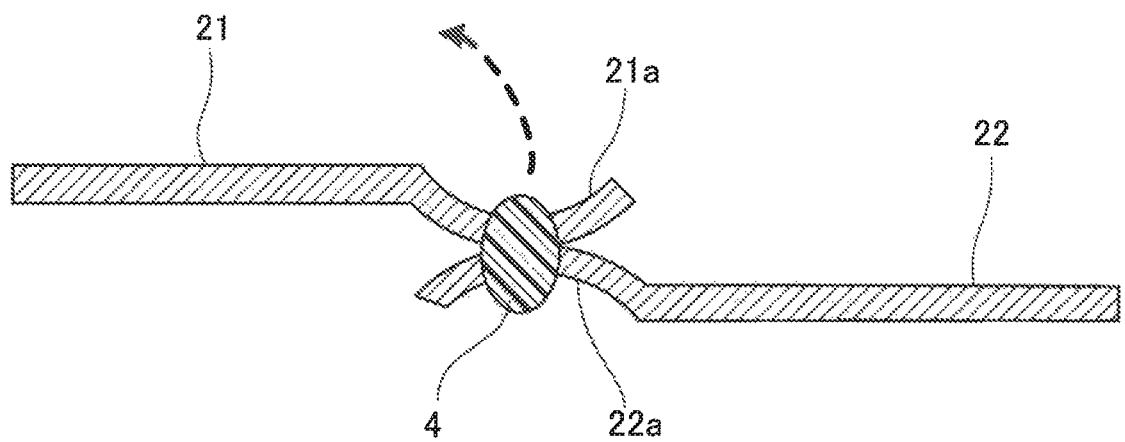
FIG. 17 is a view illustrating connected and separated states of a pair of metal terminal pieces in (A) a state in which the metal terminal pieces are connected before the insulating material contacts a liquid and (B) a state in which the insulating material has contacted a liquid and dissolved, softened, or otherwise changed state, so that the pair of metal terminal pieces are separated.
Figure 17B:
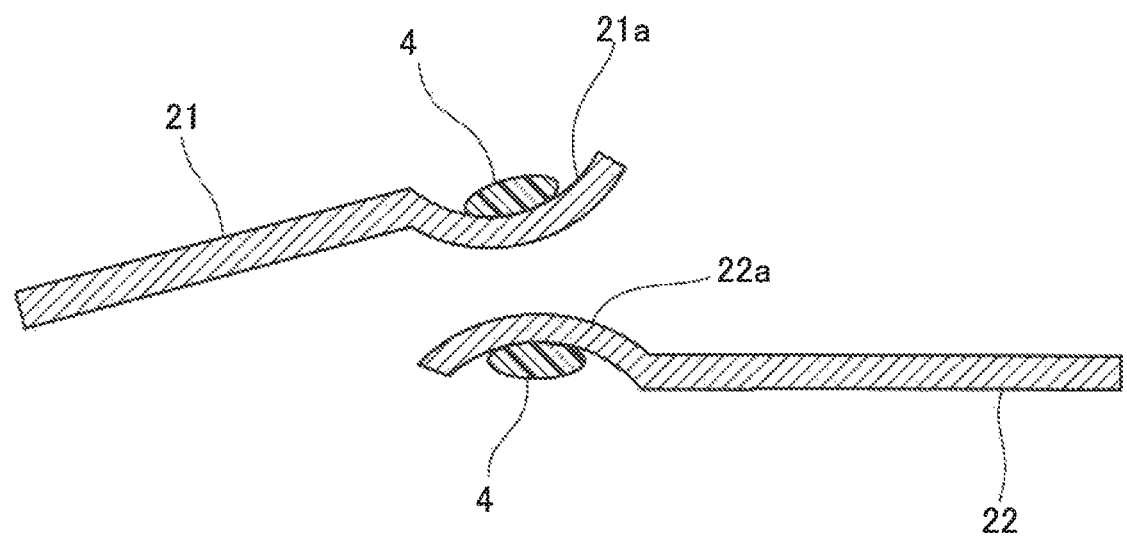

Furthermore, as illustrated in FIG. 17, the first metal terminal piece 21 may be urged in a direction in which the contact portion 21a separates from the contact portion 22a of the second metal terminal piece 22 and may be secured in a state of contact with the second metal terminal piece 22 by the insulating material 4 under normal conditions. The insulating material 4 uses a material having an adhesive property under normal conditions in addition to dissolving on contact with a liquid and secures the contact portions 21a, 22a of the first and second metal terminal pieces 21, 22 together.

As illustrated in FIG. 17 (A), in the switch device 20, in a state before liquid enters the housing 6, the first metal terminal piece 21 is secured by the insulating material 4, thereby bringing the contact portion 21a into contact with the contact portion 22a of the second metal terminal piece 22 and electrically connecting the external circuit. Then, in the switch device 20, when liquid enters the housing 6, such as when wet with water or liquid leaks from a battery, as illustrated in FIG. 17 (B), the insulating material 4 of the reaction part 5 contacts the liquid and changes, for example, dissolves or softens, so as to have properties which are overcome by internal stress in the first metal terminal piece 21, and the first metal terminal piece 21 elastically returns in a separating direction away from the second metal terminal piece 22. Thus, the contact portion 21a of the first metal terminal piece 21 separates from the contact portion 22a of the second metal terminal piece 22, thereby interrupting the external circuit.

Alternative Example 2 of the Switch Device

Furthermore, in a switch device according to the present disclosure, the second conductor 3 and the reaction part 5 may be arranged within the first conductor 2. In a switch device 30 illustrated in FIGS. 18 and 19, the first conductor 2 is a hollow outer conductor 32 having one or more guiding inlets 31 for guiding a liquid, the second conductor 3 is an inner conductor 33 arranged within a hollow of the outer conductor 32, and an interior wall of the outer conductor 32 or an outer surface of the inner conductor 33 is coated with the insulating material 4. The outer conductor 32 is connected to one open end of an external circuit via a lead wire or other means selected as appropriate, and the inner conductor 33 is connected to the other open end of the external circuit via a lead wire or other conductor selected as appropriate. The outer conductor 32 is, for example, a round tube-shaped conductor and one or more guiding inlets 31 are formed on an outer circumferential surface thereof through which liquid enters. Alternatively, instead of a round tube shape, the outer conductor 32 may be formed into a hollow cylinder shape.

Figure 18:
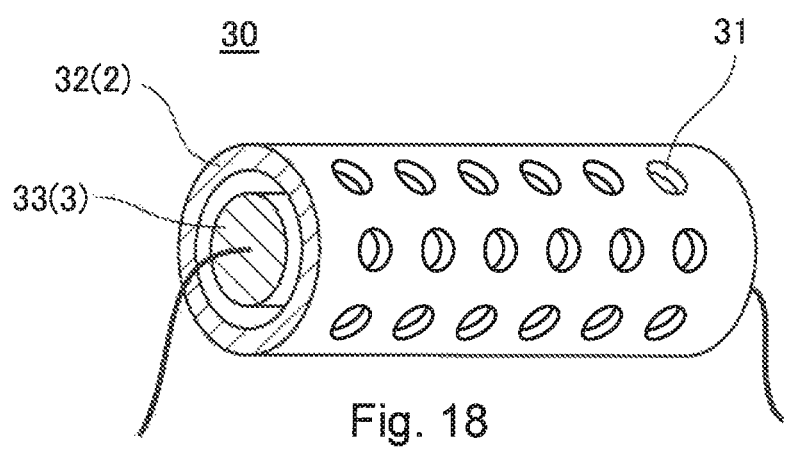
FIG. 18 is a perspective view illustrating a hollow outer conductor and an inner conductor arranged in the outer conductor, both of which serving as a conductor.

So long as allowing arrangement within the outer conductor 32, the inner conductor 33 may be any shape and, in addition to the cylinder shape illustrated in FIG. 18, may be a prism shape, a wrapped sheet shape, or a block shape, among others. Moreover, the inner conductor 33 is movably held inside the outer conductor 32.

Figure 19A:
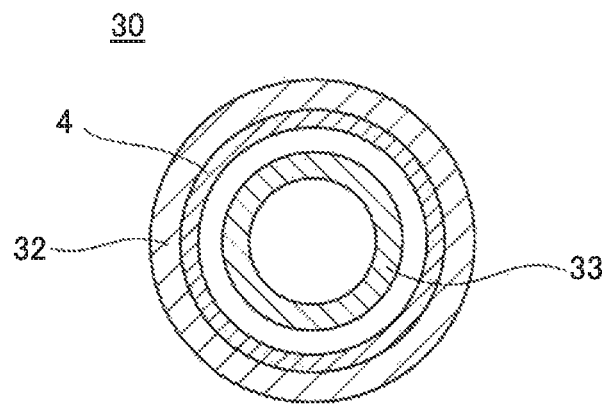
FIG. 19 (A) is a cross-sectional view illustrating a state in which an inner surface of an outer conductor is coated with an electrically insulating coating.
Figure 19B:
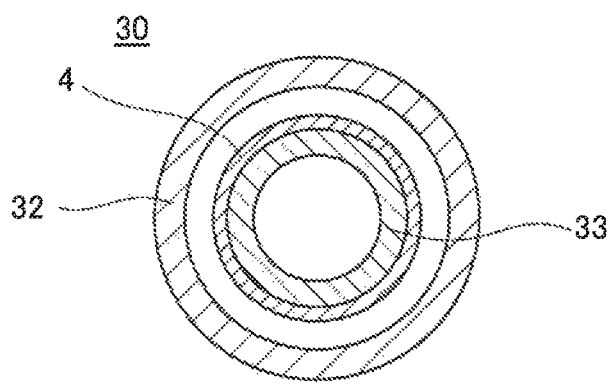
Figure 19C:
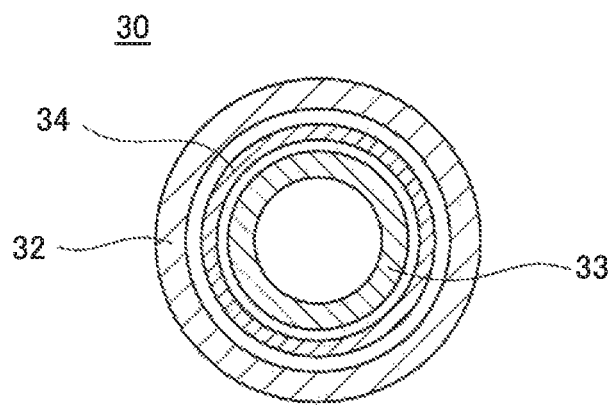

In the switch device 30, as illustrated in FIG. 19 (A), an inner surface of the outer conductor 32 is coated with an electrical insulator of the insulating material 4 which dissolves on contact with a liquid; this insulates the outer conductor 32 and inner conductor 33 under normal conditions and opens the external circuit. Then, in the switch device 30, when an abnormality occurs, such as wetting with water or liquid leaking from a battery, liquid entering the housing 6 enters the outer conductor 32 via the guiding inlet 31 and dissolves the insulating material 4, thereby electrically connecting the outer conductor 32 and inner conductor 33 and allowing current to flow through the external circuit.

It should be noted that, in the switch device 30, as illustrated in FIG. 19 (B), the insulating material 4 which dissolves on contact with a liquid may be applied to the outer surface of the inner conductor 33 to electrically insulate the inner conductor 33 from the outer conductor 32. The insulating material 4 dissolves on contact with liquid entering through the guiding inlet 31 of the outer conductor 32, thereby connecting the first conductor 2 and the second conductor 3.

Furthermore, in the switch device 30, as illustrated in FIG. 19 (C), an electrically insulating film 34 made of the insulating material 4 which dissolves on contact with a liquid may be interposed between the outer conductor 32 and the inner conductor 33. The insulating film 34 is of a size and shape sufficient to shield the inner conductor 33 from the inner surface of the outer conductor 32 and electrically insulates the outer conductor 32 and the inner conductor 33 from each other under normal conditions. Then, when an abnormality occurs, such as wetting with water or liquid leaking from a battery, the insulating film 34 is dissolved on contact with liquid entering through the guiding inlets 31 of the outer conductor 32, thereby electrically connecting the outer conductor 32 and the inner conductor 33.

It should be noted that the switch device 30 may use the outer conductor 32 as the housing 6, or, in this case, an outer circumferential surface of the outer conductor 32 is preferably coated with an electrically insulating material.

Alternative Example 3 of the Switch Device

Figure 20A:
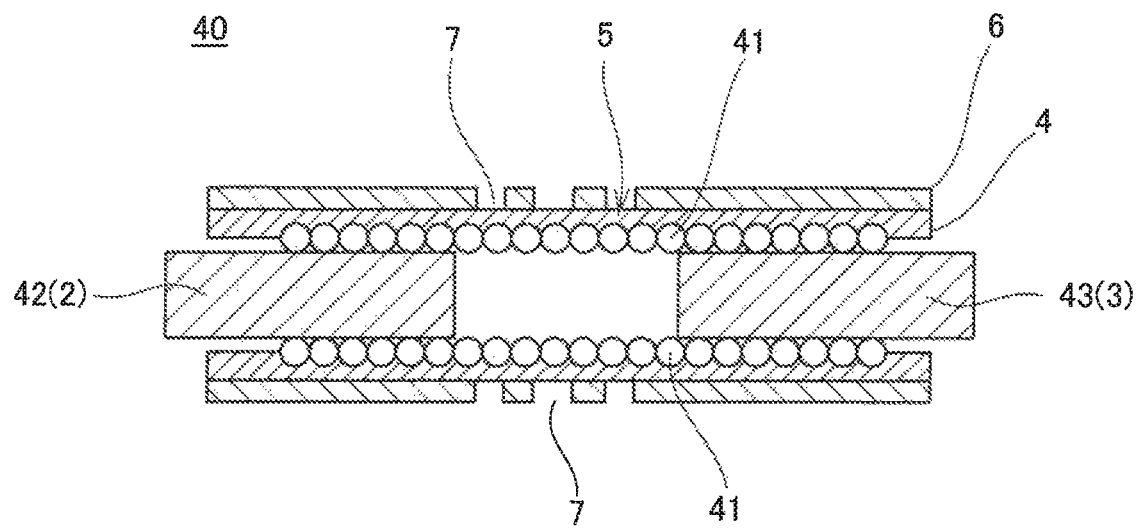
FIG. 20 is a cross-sectional view illustrating a switch device in which a pair of lead wires serving as a conductor are connected via conductive particles in (A) a state before liquid enters and (B) a state after liquid enters.
Figure 20B:
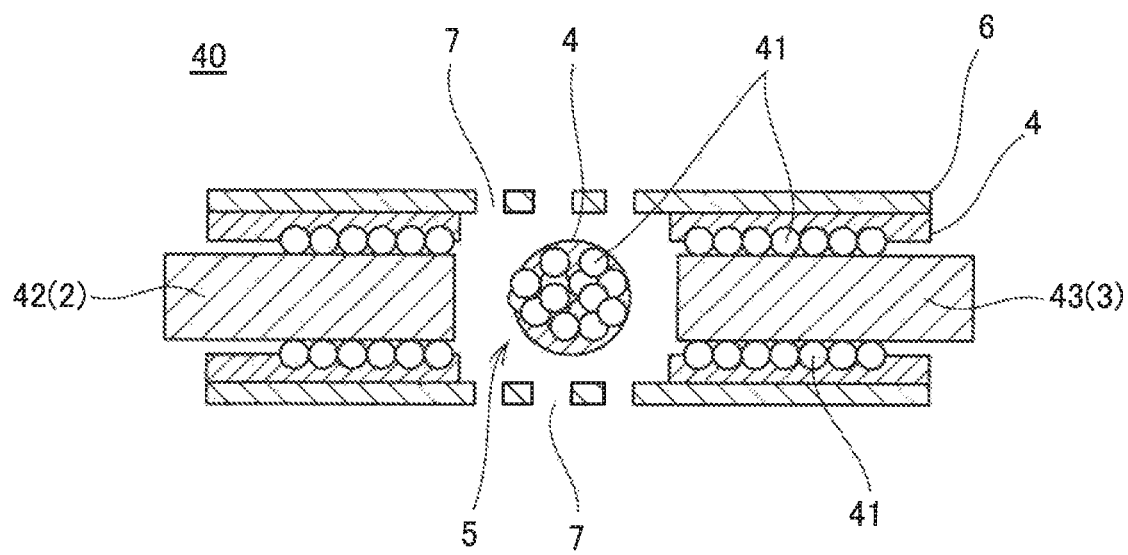
Figure 21:
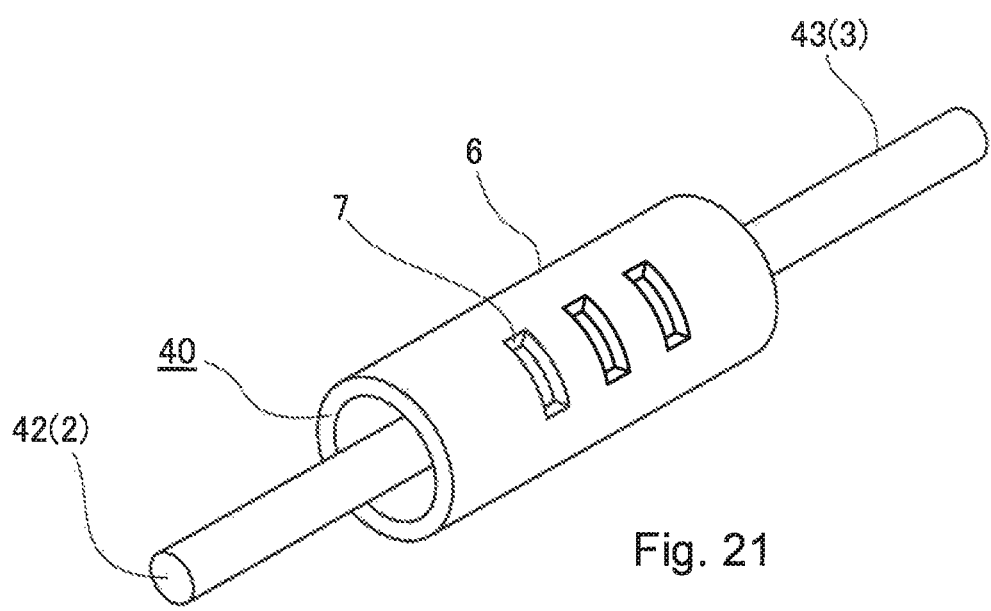
FIG. 21 is an external perspective view of the switch device illustrated in FIG. 20.

Furthermore, in a switch device according to the present disclosure, as illustrated in FIGS. 20 and 21, the first and second conductors 2, 3 may be connected via electrically conductive particles 41 and an electrically conductive path via the conductive particles 41 may be interrupted by the reacting part 5. A switch device 40 illustrated in FIGS. 20 and 21 includes a housing 6 having one or more guiding inlets 7 for a liquid; as the reaction part 5, the insulating material 4 which dissolves on contact with liquid is provided on an interior wall of the housing 6 through which the guiding inlet 7 opens; the conductive particles 41 are arranged and secured in the insulating material 4. The housing 6 is formed in a tube shape and lead wires 42, 43 serving as the first and second conductors 2, 3 are led out from both ends of the housing 6. Moreover, the guiding inlet 7 may be formed in a slit shape extending in the circumferential direction of the housing 6 in an approximately central portion in which the lead wires 42, 43 are not provided.

Furthermore, in the switch device 40, the lead wires 42, 43 are separated within the housing 6 and are electrically connected by the conductive particles 41 secured in the insulating material 4 being continuous between the lead wires 42, 43. The guiding inlet 7 is formed above the arrangement of the conductive particles 41.

The lead wires 42, 43 serving as the first and second conductors 2, 3 are led to the exterior of the housing 6 and are each connected to a connecting end of an external circuit.

In the switch device 40, in a state before liquid enters the housing 6, as illustrated in FIG. 20 (A), the lead wires 42, 43 are electrically connected via a conductive path formed by the conductive particles 41 secured in the insulating material 4, and current is allowed to flow through the external circuit. Then, in the switch device 40, when liquid enters the housing 6, such as in wetting with water or liquid leaking from a battery, as illustrated in FIG. 20 (B), the insulating material 4 of the reaction part 5 contacts liquid and a characteristic thereof is altered, for example, by dissolving or contracting, to agglomerate the conductive particles 41 and interrupt the conductive path formed by the arranged conductive particles 41. This disconnects the path between the lead wires 42, 43, thereby interrupting the external circuit.

It should be noted that, as the first and second conductors 2, 3, the switch device 40 may employ metal terminal pieces supported in the housing 6 or external-connection electrodes constituted by an electrode pattern formed on an insulating substrate. In the switch device 40 illustrated in FIG. 22, a pair of metal terminal pieces 44, 45 connected by the conductive particles 41 are provided as the first and second conductors 2, 3. The metal terminal pieces 44, 45 are respectively connected to external-connection electrodes 46, 47 exposed to the exterior from the mounting surface of the housing 6. The surface of the switch device 40 on which the external-connection electrodes 46, 47 are exposed serves as a mounting surface for mounting to an external circuit board, electrodes formed on the external circuit being connected with the external-connection electrodes 46, 47.

Figure 22A:
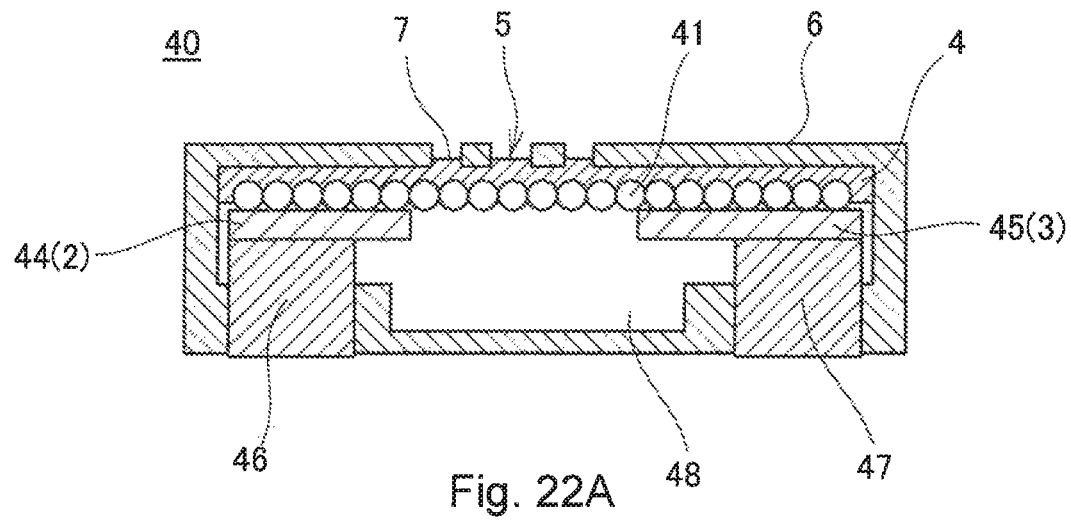
FIG. 22 is a cross-sectional view illustrating a switch device in which a pair of metal terminal pieces serving as a conductor are connected via conductive particles in (A) a state before liquid enters and (B) a state after liquid enters.
Figure 22B:
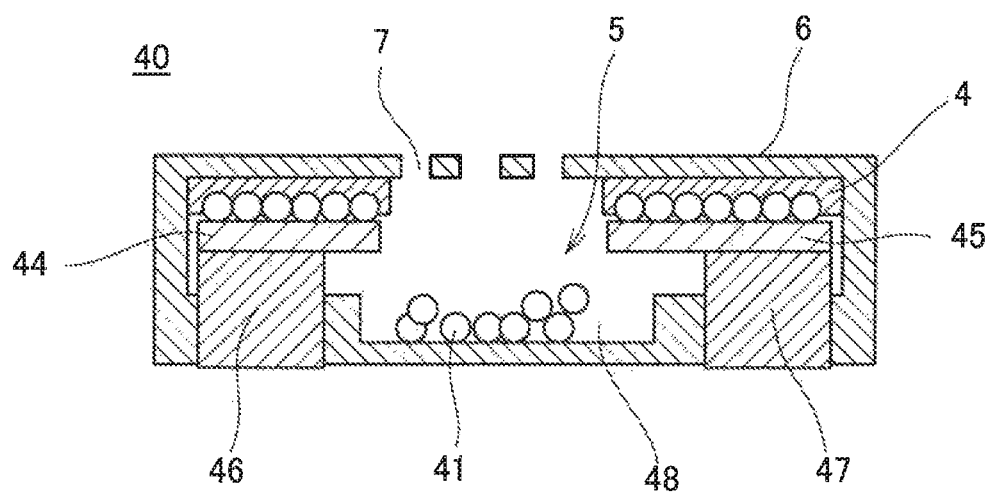

The housing 6 has a guiding inlet 7 formed in a top surface in a substantially central portion in which the metal terminal pieces 44, 45 are not provided; the insulating material 4 which dissolves on contact with a liquid is formed on an interior top surface, and the conductive particles 41 are adhered to the insulating material 4. Furthermore, as illustrated in FIG. 22 (A), in the switch device 40, the metal terminal pieces 44, 45 are separated within the housing 6 and electrically connected by the conductive particles 41 secured in the insulating material 4 being continuous between the metal terminal pieces 44, 45. The guiding inlet 7 is formed above the arrangement of the conductive particles 41.

Below the guiding inlet 7, a space 48 is provided into which the arranged conductive particles 41 fall and are held. Then, as illustrated in FIG. 22 (B) in the switch device 40, when liquid enters through the guiding inlet 7, the insulating material 4 dissolves and the conductive particles 41 fall into the space 48. Thereby, the conductive path between the metal terminal pieces 44, 45 made by arranging the conductive particles 41 is interrupted.

Alternative Example 4 of the Switch Device

Figure 23A:
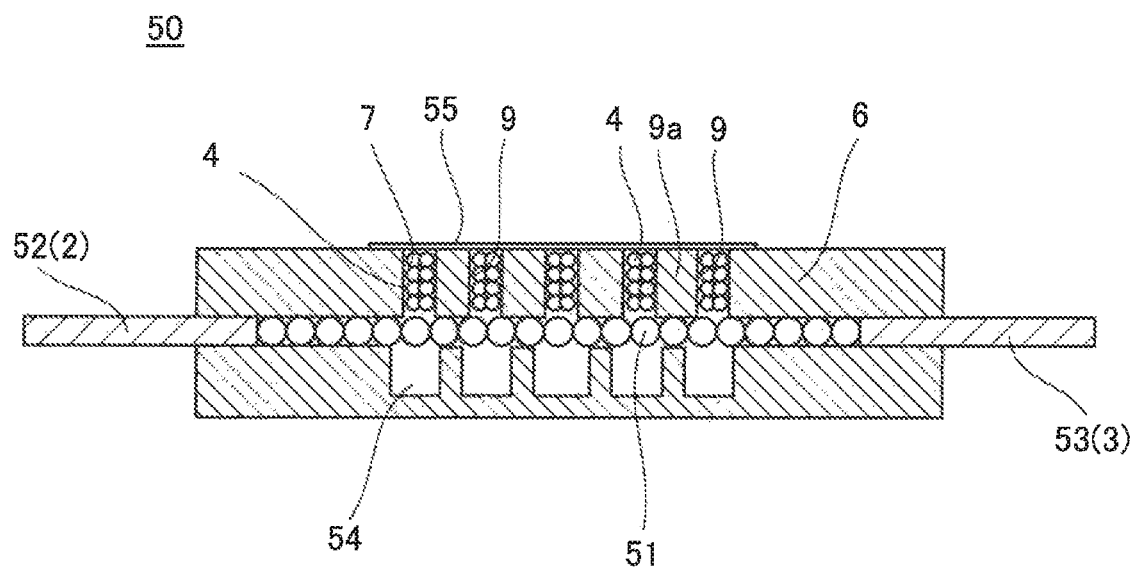
FIG. 23 is a cross-sectional view illustrating a switch device in which a pair of lead wires serving as a conductor are connected via conductive particles in (A) a state before liquid enters and (B) a state after liquid enters.
Figure 23B:
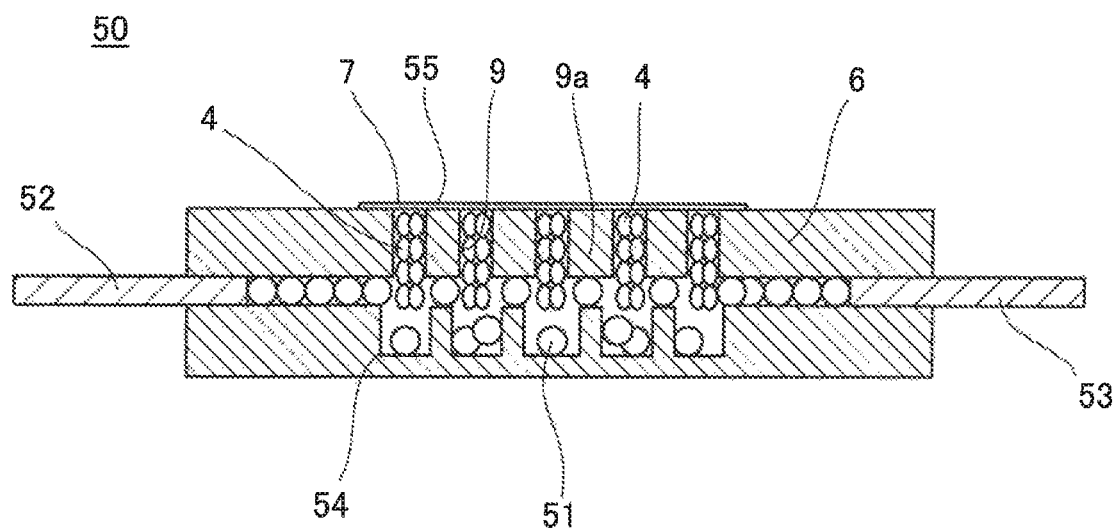

Furthermore, in a switch device according to the present disclosure, the guiding inlet 7 of the housing 6 may be provided with a guiding conduit 9 filled with the insulating material 4 and facing an arrangement of conductive particles 51. A switch device 50 as illustrated in FIGS. 23 (A) and (B) includes a housing 6 having a guiding inlet 7 with a slit-shaped opening formed on one surface, a guiding conduit 9 extending from the guiding inlet 7 into the housing 6, lead wires 52, 53 serving as the first and second conductors 2, 3 arranged in separation within the housing 6, conductive particles 51 which are arranged to be continuous within the housing 6 to electrically connect the lead wires 52, 53, and an insulating material 4 which is filled in the guiding conduit 9 which expands on contact with a liquid to interrupt the arrangement of the conductive particles 51.

In the switch device 50, a conduit wall 9a of the guiding conduit 9 extends to and faces a vicinity neighboring the arrangement of the conductive particles 51. Thereby, in the housing 6, when liquid enters the guiding conduit 9, it is possible to press on the arrangement of the conductive particles 51. with expansion of the insulating material 4; moreover, it is possible to ensure that the insulating material 4 interrupts the arrangement of the conductive particles 51 without the insulating material 4 scattering within the housing 6 after expansion. Moreover, in the switch device 50, on the side opposite the guiding conduit 9, between which the conductive particles 51 are sandwiched, a space 54 is formed into which the conductive particles 51 are pushed.

In this switch device 50, in a state before liquid enters the housing 6, the lead wires 52, 53 are electrically connected via a conductive path formed by the conductive particles 51 which are arranged and secured within the housing 6 and current is allowed to flow through the external circuit. Then, in the switch device 50, when liquid enters the housing 6, such as in wetting with water or liquid leaking from a battery, as illustrated in FIG. 23 (B), liquid entering from the guiding inlet 7 and through the guiding conduit 9 contacts the insulating material 4 which is caused to expand and push the conductive particles 51 into the space 54, thus interrupting the conductive path. This disconnects the connection between the lead wires 2, 3, thereby interrupting the external circuit.

It should be noted that in the switch device 50, as the first and second conductors 2, 3, instead of the lead wires 52. 53, other known conductive components, such as metal terminal pieces, can be used.

It should be noted that the switch device 50 may include a mesh member 55 having a mesh size smaller than the insulating material 4 after expanding arranged on a surface of the housing 6 to block the guiding inlet 7. Thereby, in the switch device 1, when the insulating material 4 filled in the guiding conduit 9 expands on contact with liquid entering through the opening of the guiding inlet 7, the insulating material 4 expands towards the interior of the housing 6 without being expelled to the housing exterior through the guiding inlet 7, which is blocked by the mesh member 55; this ensures the conductive particles 51 are pushed into the space 54 to interrupt the connection between the lead wires 52, 53.

Figure 24A:
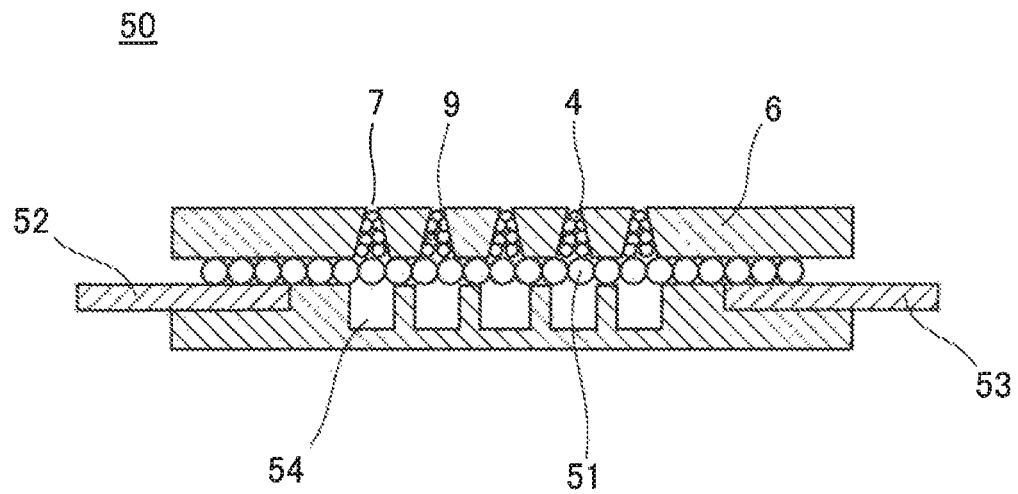
FIG. 24 is a cross-sectional view illustrating a switch device in which a tapered guiding conduit is formed in (A) a state before liquid enters and (B) a state after liquid enters.
Figure 24B:
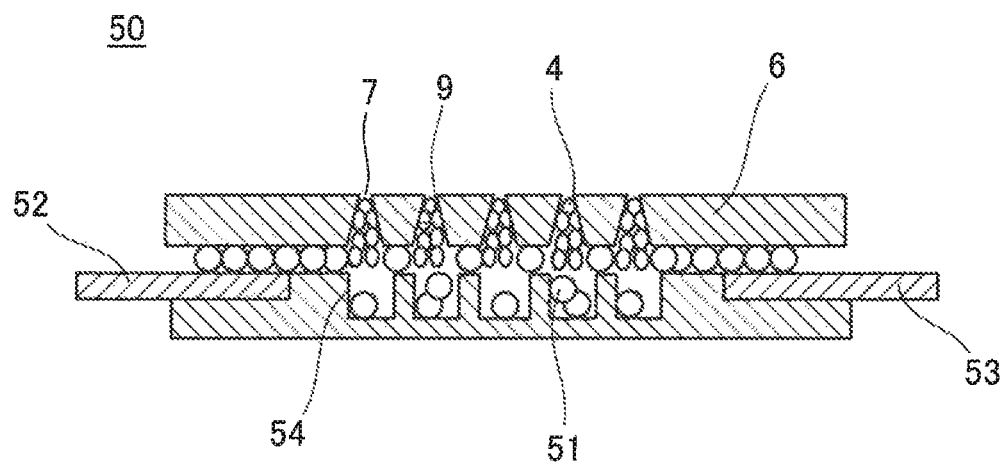

Furthermore, in the switch device 50, as illustrated in FIG. 24 (A), the guiding conduit 9 may be for in a tapered shape progressively increasing in width from the opening of the guiding inlet 7 towards the interior in which the conductive particles 51 are arranged. By the guiding conduit 9 progressively widening as it approaches the arrangement of the conductive particles 51, as illustrated in FIG. 24 (B), when liquid entering through the guiding inlet 7 contacts the insulating material 4 filled in the guiding conduit 9, in addition to promoting expansion, when the insulating material 4 expands, it expands towards the wider inside of the housing 6, thus ensuring that the conductive particles 51 are pushed into the space 54 to interrupt the connection between the lead wires 52, 53.

Moreover, in the switch device 50, by forming the guiding conduit 9 so as to widen from the opening of the guiding inlet 7 to the interior of the housing 6, small amounts of liquid which should not activate the switch device 50 can be prevented from entering the guiding conduit 9, thus ensuring reliability of the switch device 50 as a sensor.

Additionally, the housing 6 of the switch device 50 may be made of a ceramic material. This improves strength of the housing 6 to prevent deformation of the housing 6 in case of expansive pressure accompanying expansion of the insulating material 4. Instead of forming the housing 6 of the switch device 50 from a ceramic material, the housing 6 may be provided with a ceramic coating to improve strength. Moreover, using a porous material for the ceramic or ceramic coating material of the housing 6 can improve water intake in the switch device 50.

Figure 25A:
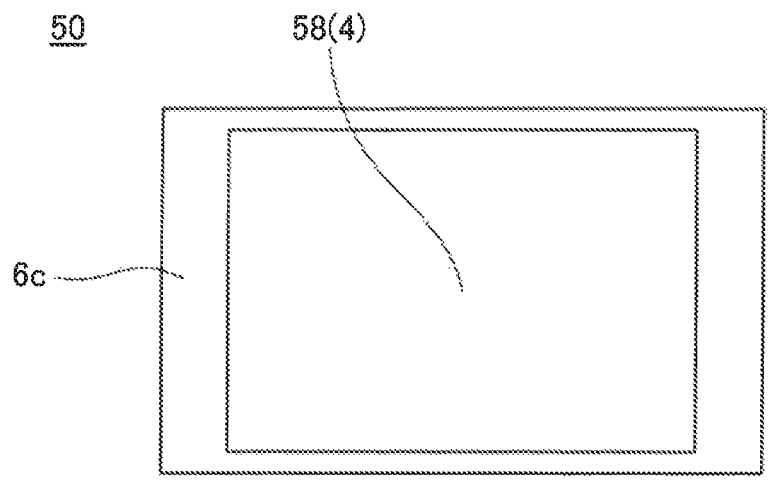
FIG. 25 is a view illustrating a switch device using a sheet-shaped insulating material which expands on contact with a liquid in (A) a plan view illustrating an upper half of a housing provided with the sheet-shaped insulating material and (B) a plan view illustrating a lower half of the housing provided with metal terminal pieces serving as a conductor and provided with conductive particles.
Figure 25B:
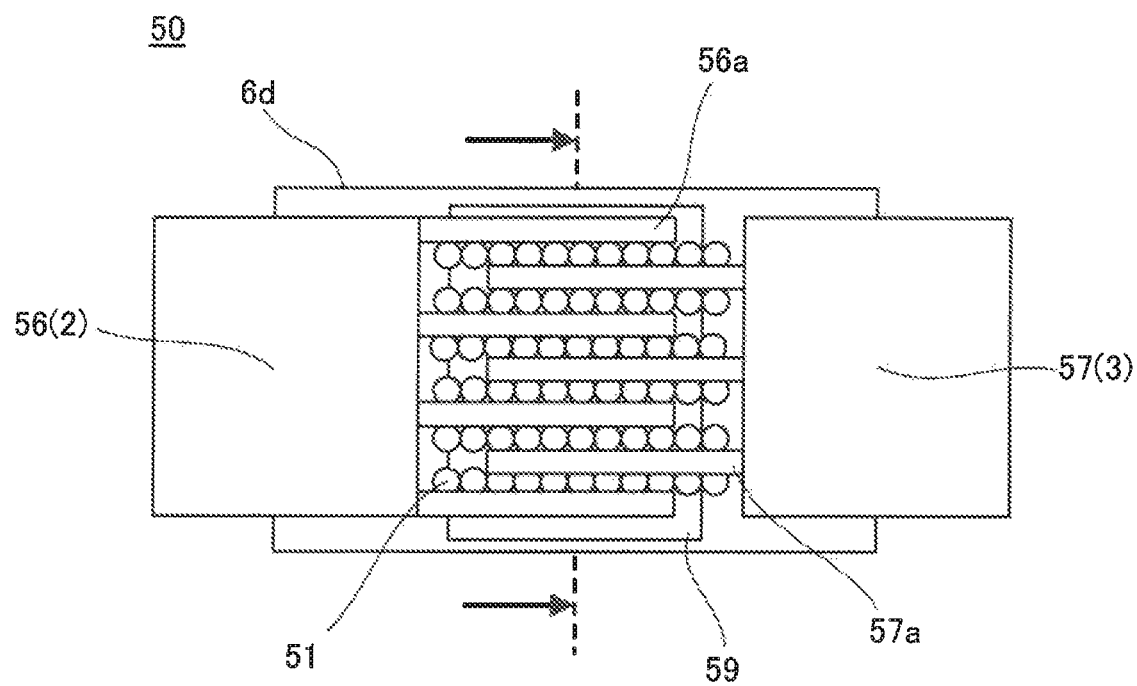
Figure 26A:
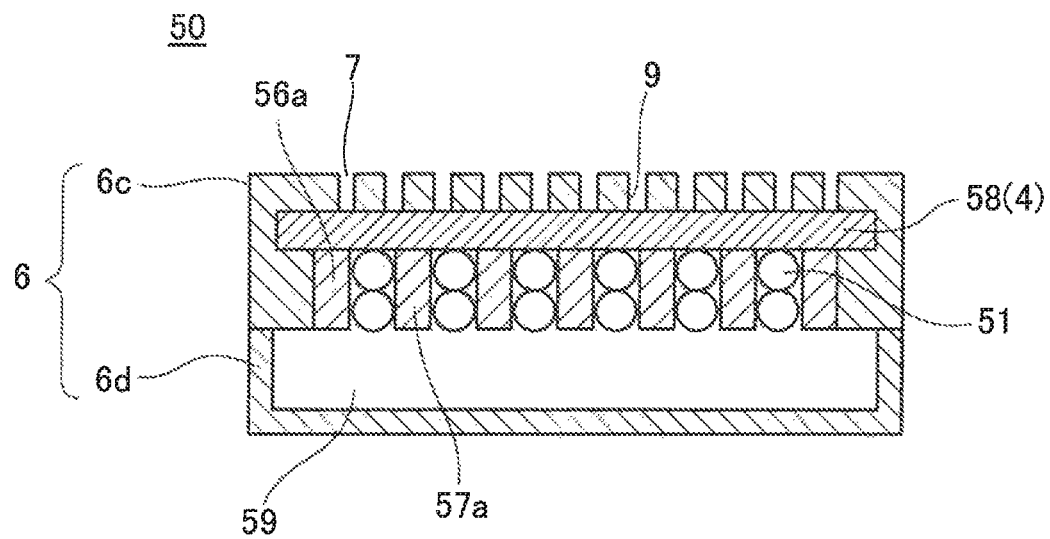
FIG. 26 is a cross-sectional view illustrating the switch device illustrated in FIG. 25 in (A) a state before liquid enters and (B) a state after liquid enters.
Figure 26B:
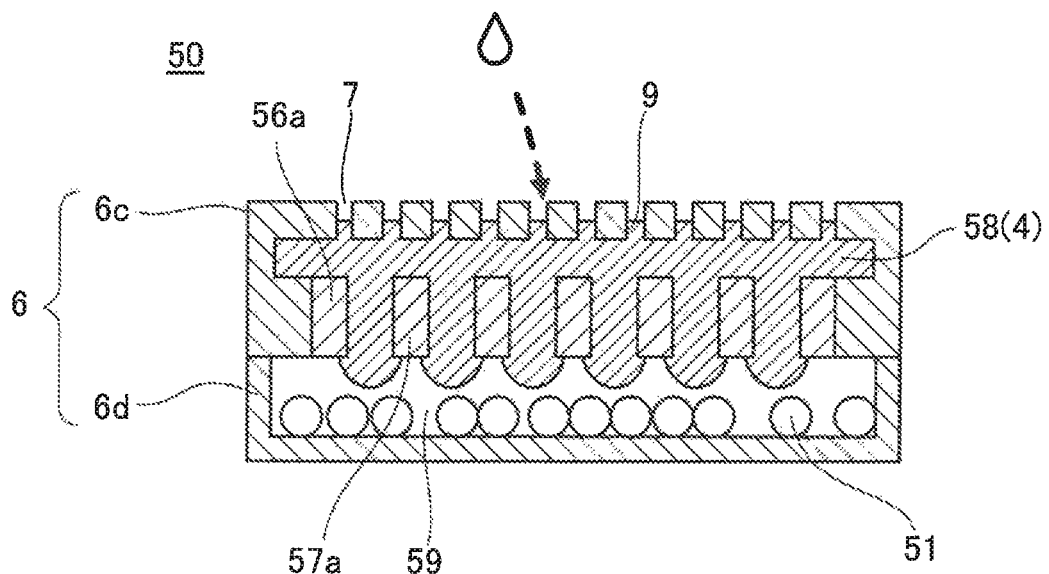

Furthermore, as illustrated in FIGS. 25 and 26, in the switch device 50, the insulating material 4 may be arranged in a sheet shape between the guiding inlet 7 and the conductive particles 51. A switch device 50 as illustrated in FIGS. 25 and 26 includes a housing 6 in which a guiding inlet 7 having a slit shaped opening is formed on one surface, a guiding conduit 9 extending from the guiding inlet 7 into the housing, metal terminal pieces 56, 57 serving as the first and second conductors 2, 3 arranged in separation within the housing 6, conductive particles 51 arranged to be continuous within the housing 6 to electrically connect the metal terminal pieces 56, 57, and a sheet 58 of an insulating material 4 which is provided between the guiding inlet 7 and the conductive particles 51 and which expands on contact with a liquid to interrupt the arranged conductive particles 51.

The housing 6 is formed by butting a pair of halves constituted by upper and lower halves 6c, 6d. The upper half 6c has a slit-shaped guiding inlet 7 and guiding conduit 9 and, on an inner surface side to be butted with the lower half 6d, the sheet 58 of the insulating material 4 which expands on contact with water is pasted. In the lower half 6d, the metal terminal pieces 56, 57 and the conductive particles 51 are arranged and, on a side of the metal terminal pieces 56, 57 opposite to that facing the upper half 6c, a space 59 is formed into which the conductive particles 51 are to be pushed; the metal terminal pieces 56, 57 are separated and are electrically connected via the conductive particles 51 arranged within the housing.

In the switch device 50, by butting the upper and lower halves 6c, 6d, the sheet 58 of the insulating material 4 is disposed between the guiding inlet 7 and the arrangement of the conductive particles 51.

In this switch device 50, in a state before liquid enters the housing 6, the metal terminal pieces 56, 57 are electrically connected via a conductive path formed by the conductive particles 51 which are arranged and secured within the housing 6, and current is allowed to flow through the external circuit. Then, in the switch device 50, when liquid enters the housing 6, such as in wetting with water or liquid leaking from a battery, as illustrated in FIG. 26 (B), liquid entering from the guiding inlet 7 and through the guiding conduit 9 contacts the sheet 58, causing the insulating material 4 to expand; this pushes the conductive particles 51 from between the metal terminal pieces 56, 57 into the space 59, thereby interrupting the conductive path. This disconnects the connection between the metal terminal pieces 56, 57, thereby interrupting the external circuit.

In the switch device 50, the metal terminal pieces 56, 57 may be arranged in parallel in a non-contacting manner, and the conductive particles 51 may be arranged between the metal terminal pieces 56, 57. For example, as illustrated in FIG. 25 (B), the metal terminal pieces 56, 57 may be formed in a comb shape and arranged such that comb-tooth portions 56a, 57a project over the space 59 and intermesh in a non-contacting manner, the conductive particles 51 being arranged between the comb-tooth portions 56a, 57a. In this case, the guiding inlet 7 and the guiding conduit 9 formed in a slit shape are preferably aligned with the conductive particles 51 arranged between the comb-tooth portions 56a, 57a.

Alternative Example 5 of the Switch Device

Furthermore, in a switch device according to the present disclosure, conductive particles 61 filled in the guiding conduit 9 may be pushed out to electrically connect the first and second conductors 2, 3. A switch device 60 as illustrated in FIG. 27 includes a housing 6 having a guiding inlet 7 formed on one surface, a guiding conduit 9 extending from the guiding inlet 7 into the housing, conductive particles 61 filled in the guiding conduit 9, a space 62 which is continuous with the guiding conduit 9 and into which the conductive particles 61 filling the guiding conduit 9 are to be pushed, lead wires 63, 64 serving as the first and second conductors 2, 3 separated within the space 62, and an insulating material 4 which expands on contact with a liquid and which fills the guiding conduit 9 on the guiding inlet 7 side.

The guiding conduit 9 is filled with the insulating material 4, which expands on contact with a liquid, on a side of the guiding inlet 7 and filled with the conductive particles 61 on a side of the space 62. The space 62 is continuous with the guiding conduit 9 and, as illustrated in FIG. 27 (A), arrangements of conductive particles 65, each connected to one end of the lead wires 63, 64 respectively, are provided in separation. Moreover, the space 62 has a height enabling the conductive particles 61 to form an arrangement having a single layer, and the conductive particles 61 are arranged so as to be continuous when pushed out.

In this switch device 60, in a state before liquid enters the housing 6, the lead wires 63, 64 and the arrangements of the conductive particles 65 are separated, and the external circuit is interrupted. Then, in the switch device 60, when liquid enters the housing 6, such as in wetting with water or liquid leaking from a battery, as illustrated in FIG. 27 (B), the insulating material 4 expands on contact with liquid entering from the guiding inlet 7 and into the guiding conduit 9 and pushes the conductive particles 61 into the space 62. Consequently, in the space 62, the conductive particles 61 become continuous with the conductive particles 65 which are continuous with the lead wires 63, 64, thus forming a conductive path between the lead wires 63, 64 and electrically connecting the external circuit.

Figure 27A:
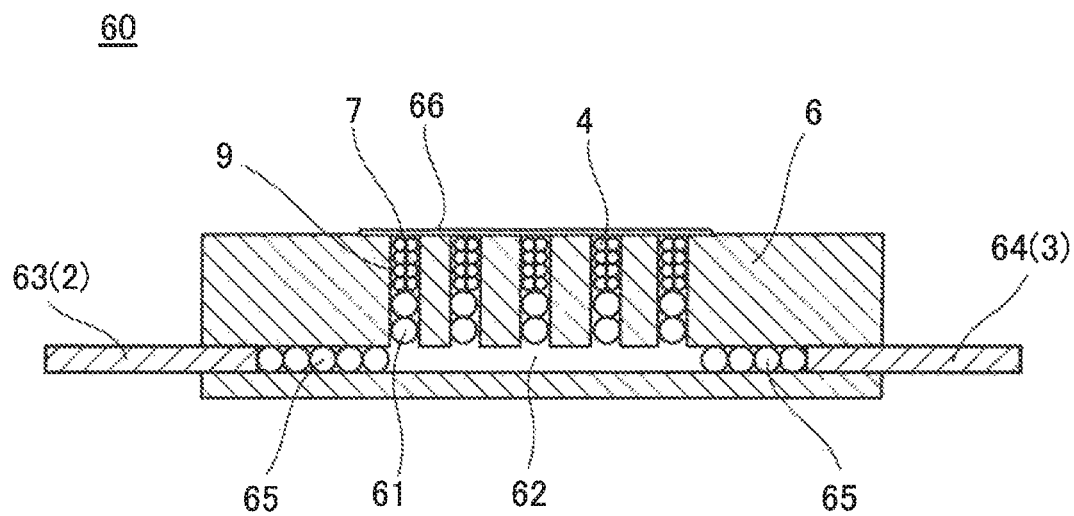
FIG. 27 is a cross-sectional view illustrating a switch device in which a pair of lead wires serving as a conductor are connected via conductive particles in (A) a state before liquid enters and (B) a state after liquid enters.
Figure 27B:
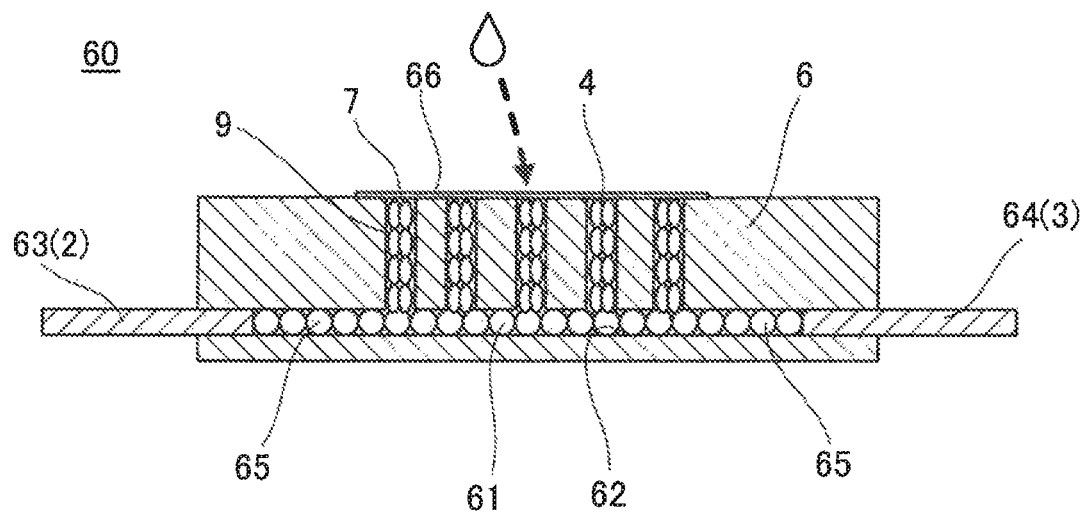

As an alternative to having the conductive particles 65 arranged within the space 62, the lead wires 63, 64 of the switch device 60 illustrated in FIG. 27 may extend to under the guiding conduit 9 and be electrically connected by directly contacting the conductive particles 61.

Moreover, in the switch device 60, the guiding conduit 9 may be formed in a tapered shape that widens towards the inside of the housing 6 or may be blocked by a mesh member having a smaller mesh size than a particle diameter of the insulating material 4 when expanded. Thereby, in the switch device 60, when the insulating material 4 filled in the guiding conduit 9 expands on contact with liquid entering through the opening of the guiding inlet 7, the insulating material 4 expands towards the interior of the housing 6 without being expelled to the housing exterior through the guiding inlet 7; this ensures the conductive particles 61 are pushed into the space 62 so that current can flow between the lead wires 63, 64.

Still further, as illustrated in FIG. 27, in the switch device 60 as well, the guiding inlet 7 may be blocked by a sheet 66 of the insulating material 4 which dissolves on contact with a liquid. Thereby, small amounts of liquid which should not activate the switch device 60 are prevented from entering the guiding inlet 7, thus ensuring reliability of the switch device 60 as a sensor. As an alternative to pasting the sheet 66 of insulating material 4, in the switch device 60, the guiding inlet 7 may be blocked in other ways, for example, by coating the insulating material 4 or filling the insulating material 4 in the guiding inlet 7. The activation condition of the switch device 60, which is entrance of water into the guiding inlet 7, can be adjusted by selecting thickness and constituents of the insulating material 4.

Alternative Example 6 of the Switch Device

Figure 28:
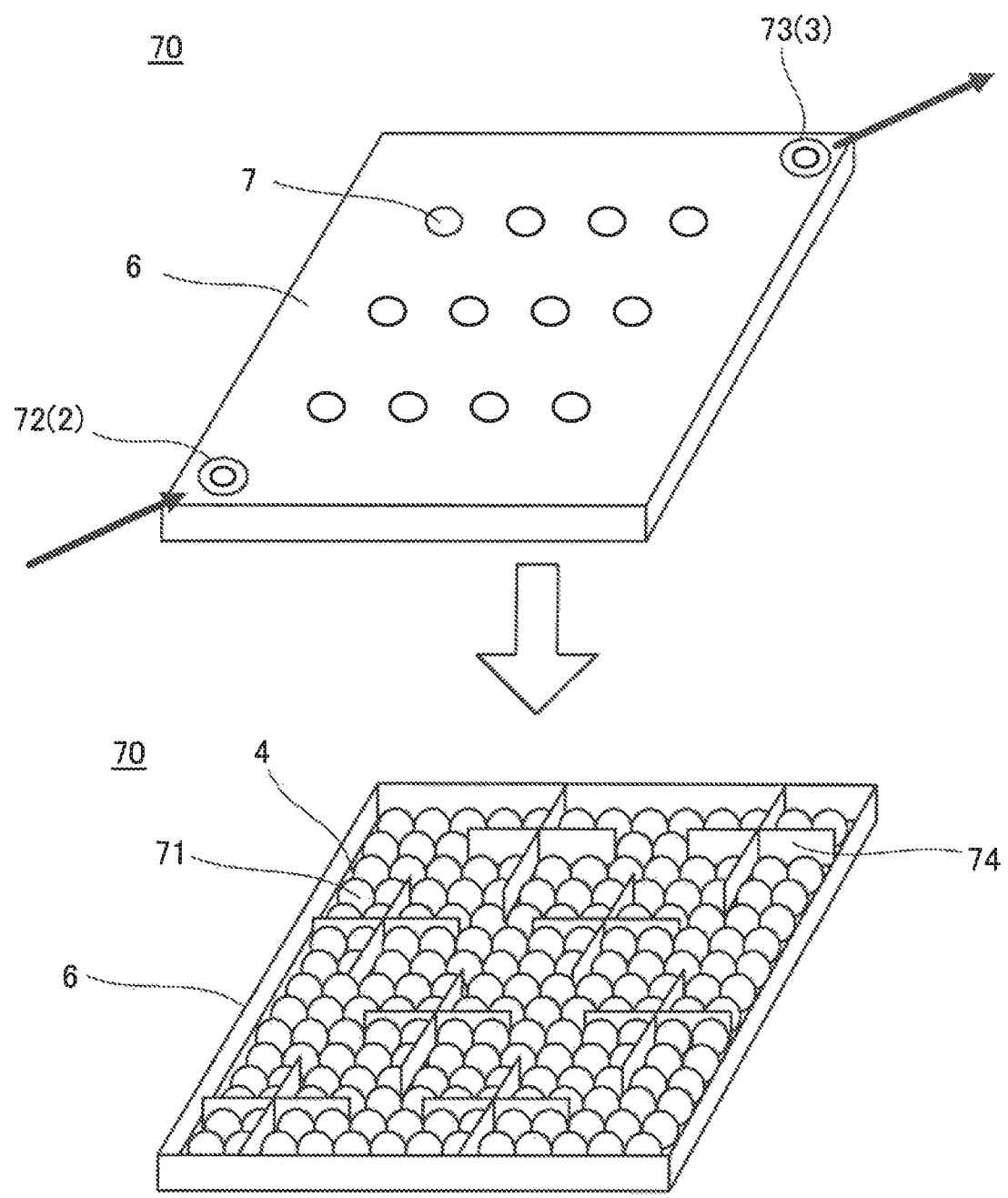
FIG. 28 is a perspective view illustrating a switch device in which a pair of external-connection electrodes used as a conductor are connected via conductive particles arranged in a lattice pattern.

Furthermore, a switch device according to the present disclosure may have conductive particles 71 arranged in a lattice pattern, and in response to a state change of the insulating material 4, the arrangement of the conductive particles 71 may be disconnected to interrupt the first and second conductors 2, 3. A switch device 70 as illustrated in FIG. 28 includes a housing 6 having a plurality of guiding inlets 7 through which a liquid enters formed in a lattice pattern, the housing 6 having an insulating material 4 which expands, contracts, or dissolves on contact with a liquid provided over an entire surface within the housing 6, and conductive particles 71 defined in an arrangement by the insulating material 4. Furthermore, in the housing 6, external-connection electrodes 72, 73 serving as the first and second conductors 2, 3 are provided in separation in the vicinity of mutually opposite corner portions of the housing 6 and exposed on a top/bottom surface of the housing 6. By the insulating material 4 defining the arrangement of the conductive particles 71 in a lattice pattern in a state in which adjacent conductive particles 71 are in close contact, a conductive path between the external-connecting electrodes 72, 73 is formed, thereby electrically connecting the external-connection electrodes 72, 73.

In the switch device 70, to secure the conductive particles 71 more reliably in an arrangement at predetermined positions, the conductive particles 71 may be secured to the insulating material 4 by an adhesive agent or a pressure-sensitive adhesive agent. Alternatively, the conductive particles 71 may be secured in predetermined positions in the switch device 70 by a depression formed in the insulating material 4 in accordance with the shape of the conductive particles 71.

Furthermore, within the housing 6 of the switch device 70, a securing part 74 is provided for restricting movement of the conductive particles 71. The securing part 74 is formed of an insulating material and ensures electrical insulation between the external-connection electrodes 72, 73 by restricting movement of the conductive particles 71 caused by a state change of the insulating material 4; for example, a plurality of the securing part 74 is provided as cross-shaped vertical walls at predetermined intervals.

Figure 29A:
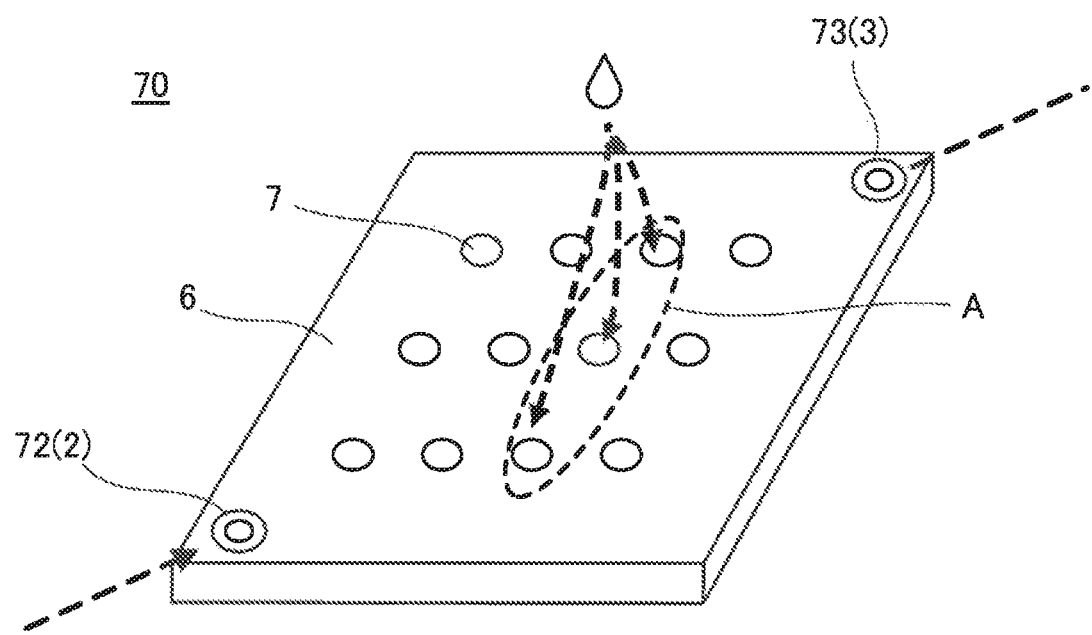
FIG. 29 is a view illustrating the switch device illustrated in FIG. 28 in which conductive particles have been caused to agglomerate by a conductive material contacting a liquid to interrupt a circuit path in (A) an external perspective view and (B) a perspective view illustrating a housing interior.
Figure 29B:
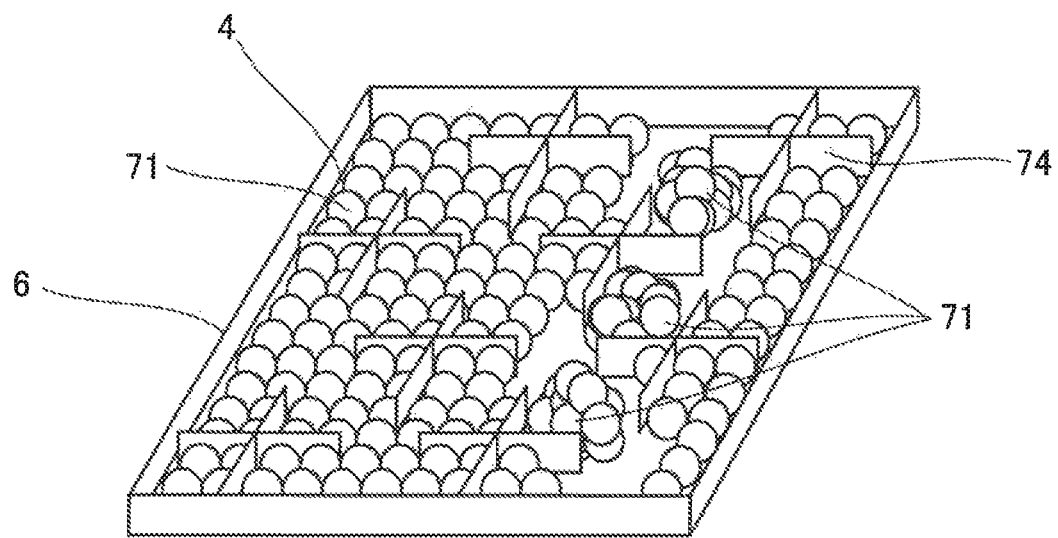

This switch device 70 electrically connects the external circuit before liquid enters the housing 6 by the conductive particles 71 being continuous between the separated external-connection electrodes 72, 73 and secured in a lattice pattern arrangement by the insulating material 4. Then, in the switch device 70, when liquid enters the housing 6 through the guiding inlet 7, such as in wetting with water or liquid leaking from a battery, a state change of the insulating material 4 occurs on contact with a liquid to interrupt a conductive path of the conductive particles 71, which were arranged in a lattice pattern. For example, as illustrated in FIG. 29, in the switch device 70, the insulating material 4 contracts on contact with a liquid, thereby agglomerating the conductive particles 71 secured at the location of contraction and interrupting the conductive path of the conductive particles 71. Accordingly, the switch device 70 can interrupt the external circuit by electrically disconnecting the external-connection electrodes 72, 73.

Figure 30:
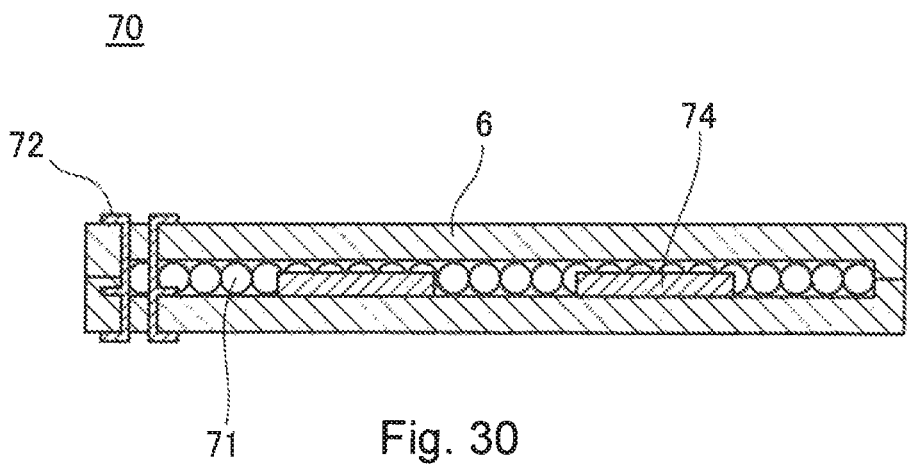
FIG. 30 is a cross-sectional view illustrating the switch device of FIG. 29.

In this switch device 70, by forming the guiding inlet 7 in a lattice pattern on one surface of the housing 6 and by arranging the conductive particles 71 in a lattice pattern in the insulating material 4 provided across an entire surface of the housing 6, as illustrated in FIG. 29 (A), a state change occurs in the insulating material 4 in a location corresponding to a liquid entry location A, for example, to agglomerate the conductive particles 71. In this case, as illustrated in FIG. 29 (B) and FIG. 30, the switch device restricts movement of the particles by the securing part 74 restricting free movement of the conductive particles 71 to prevent an agglomerated body of the conductive particles 71 from contacting another particle arrangement to form a new conductive path, thus ensuring electrical insulation. Moreover, because the conductive path of the conductive particles 71 is cut by a state change occurring in the insulating material 4 at a location corresponding to the liquid entry location A, for liquid entering the housing 6 at any location, it is possible to detect this liquid entry in the switch device 70.

Furthermore, in the switch device 70, the conductive particles 71 may be linearly arranged, and the external-connection electrodes 72, 73 may be interrupted by disconnecting this arrangement of the conductive particles 71 with a state change in the insulating material 4. The switch device 70 illustrated in FIG. 31 includes a housing 6 in which a plurality of the guiding inlet 7 for guiding a liquid are formed in a lattice pattern, an insulating material 4 which expands, contracts, or dissolves on contact with a liquid is provided across an entire surface of the housing 6, and conductive particles 71 are secured in an arrangement by the insulating material 4. Furthermore, in the housing 6, external-connection electrodes 72, 73 are provided in separation in the vicinity of mutually opposite corner portions of the housing 6 and exposed on a top/bottom surface of the housing 6. By arranging the conductive particles 71, which are arranged and secured by the insulating material 4, a conductive path is formed between the external-connection electrodes 72, 73 so that the external-connection electrodes 72, 73 are electrically connected.

Figure 31A:
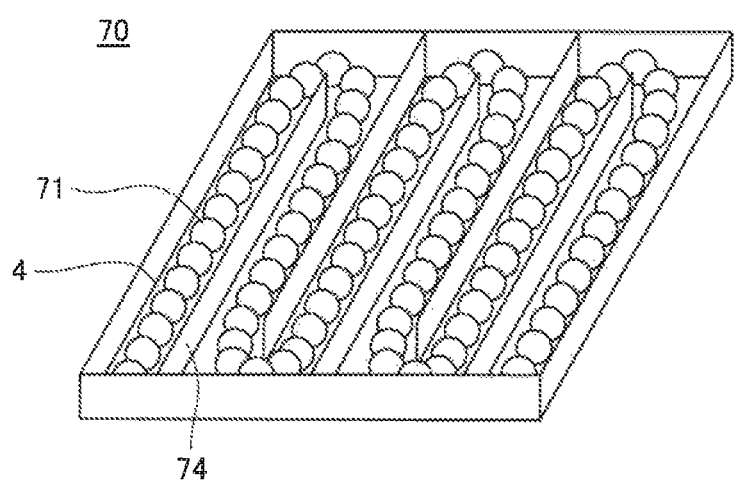
FIG. 31 is a perspective view illustrating a switch device in which a pair of external-connection electrodes used as a conductor are connected via conductive particles arranged in a linear pattern in (A) a state before liquid enters and (B) a state after liquid enters.
Figure 31B:
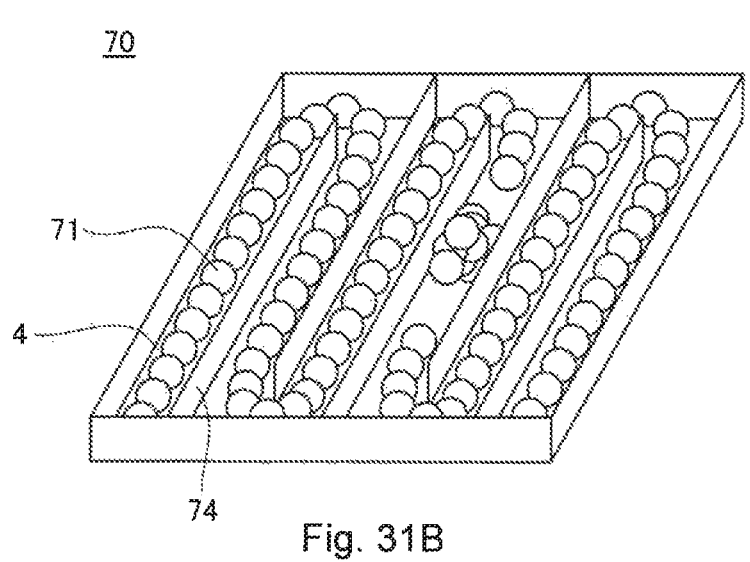

It should be noted that, in the switch device 70 illustrated in FIG. 31, to better ensure that the conductive particles 71 are secured and arranged in predetermined positions, the conductive particles 71 may be secured to the insulating material 4 by an adhesive agent or a pressure-sensitive adhesive agent. Alternatively, the conductive particles 71 may be secured in predetermined positions in the switch device 70 by a depression formed in the insulating material 4 in accordance with the shape of the conductive particles 71.

In this case, in the switch device 70, the conductive particles 71 are preferably arranged in a serpentine pattern so that the arrangement covers a wide area of an entire surface of the housing 6. Moreover, in the switch device 70, within the housing 6, a plurality of the securing part 74 described above are provided at a predetermined interval to restrict movement of the conductive particles 71.

In this switch device 70, in a state before liquid enters the housing 6, as illustrated in FIG. 31, the separately arranged external-connection electrodes 72, 73 are continuous via the conductive particles 71 in a linear arrangement secured by the insulating material 4, thereby electrically connecting the external circuit. Then, in the switch device 70, when liquid enters the housing 6 through the guiding inlet 7, such as in wetting with water or liquid leaking from a battery, a state change in the insulating material 4 occurring on contact with the liquid interrupts a conductive path of the conductive particles 71 arranged in a linear pattern. As illustrated in FIG. 31 (B), by the insulating material 4 contracting on contact with a liquid, the switch device 70 agglomerates the conductive particles 71 secured at the location of contraction, thereby interrupting the conductive path of the conductive particles 71. Accordingly, the switch device 70 can interrupt the external circuit by electrically disconnecting the external-connection electrodes 72, 73.

In this switch device 70, by forming the guiding inlet 7 in a lattice pattern on one surface of the housing 6 and by arranging the conductive particles 71 in a linear pattern across an entire surface of the housing 6, the state change occurs in the insulating material 4 at a location corresponding to a liquid entry location. A, for example, to agglomerate the conductive particles 71. In this case, in the switch device 70, because free movement of the conductive particles 71 is restricted by the securing part 74, an agglomerated body of the conductive particles 71 can be prevented from contacting other particles in the arrangement to form a new conductive path, thus ensuring electrical insulation. Moreover, in the switch device 70, because the conductive path of the conductive particles 71 is cut by a state change occurring in the insulating material 4 at a location corresponding to the liquid entry location A, for liquid entering the housing 6 at any location, it is possible to detect this liquid entry in the switch device 70.

Alternative Example 7 of the Switch Device

Furthermore, a switch device according to the present disclosure may use lead terminals 82, 83 serving as the first and second conductors 2, 3 to electrically connect or open via conductive particles 81 secured in an electrically insulating material, this connecting or opening being in response to a state change occurring in the insulating material. A switch device 80 illustrated in FIGS. 32 (A) and (B) includes lead electrodes 82, 83 extending from the exterior to the interior of the housing 6 and serving as the first and second conductors 2, 3. The lead terminals 82, 83 are secured in a mutually separated state within the housing 6, and electrically connected via the conductive particles 81 filled iii the housing 6.

The housing 6 has one or more guiding inlets 7 through which liquid enters. Further, the housing 6 is provided with an insulating material 4, which contracts or dissolves on contact with a liquid, and the conductive particles 81 secured by the insulating material 4. The conductive particles 81 are secured in predetermined positions by the insulating material 4 filled in the housing 6 and are filled in an arrangement between the lead terminals 82, 83, which are supported in separation. Thereby, the switch device 80 allows current to flow between the lead terminals 82. 83.

Figure 32A:
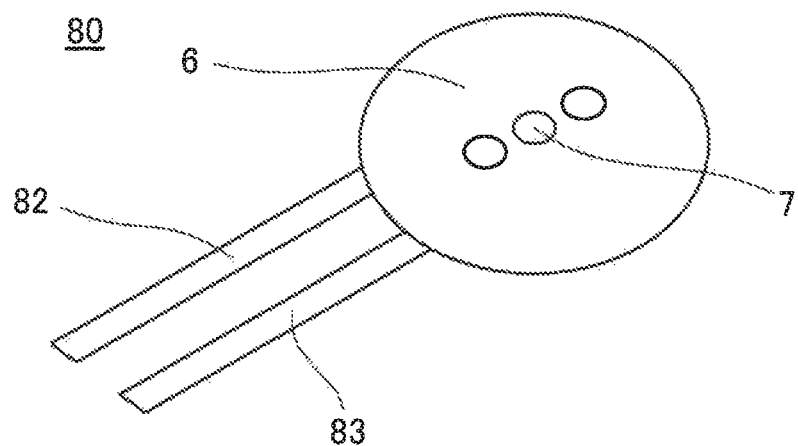
FIG. 32 is a view illustrating a switch device using lead terminals as a conductor in (A) an external perspective view and (B) an exploded perspective view.
Figure 32B:
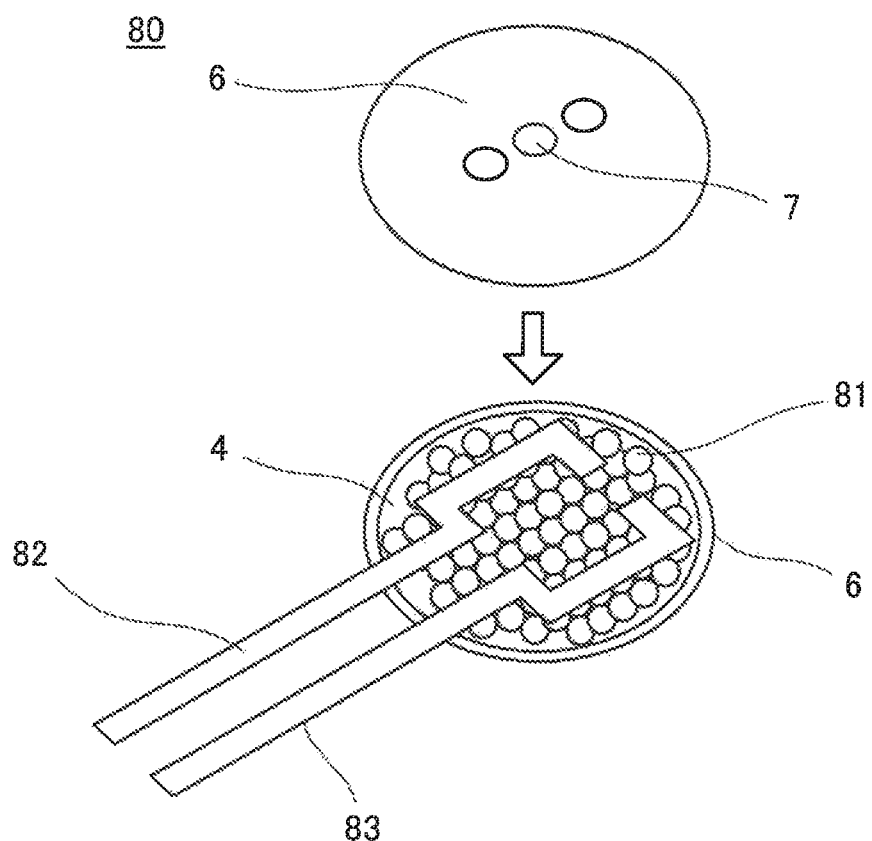
Figure 33A:
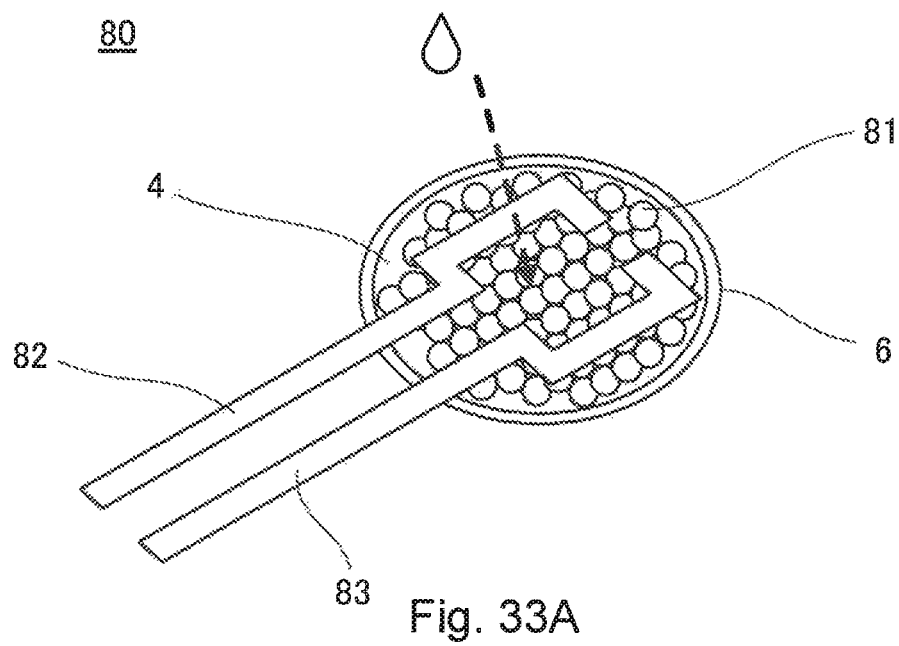
FIG. 33 is a perspective view illustrating an interior of the switch device illustrated in FIG. 32 in (A) a state before liquid enters and (B) a state after liquid enters.
Figure 33B:
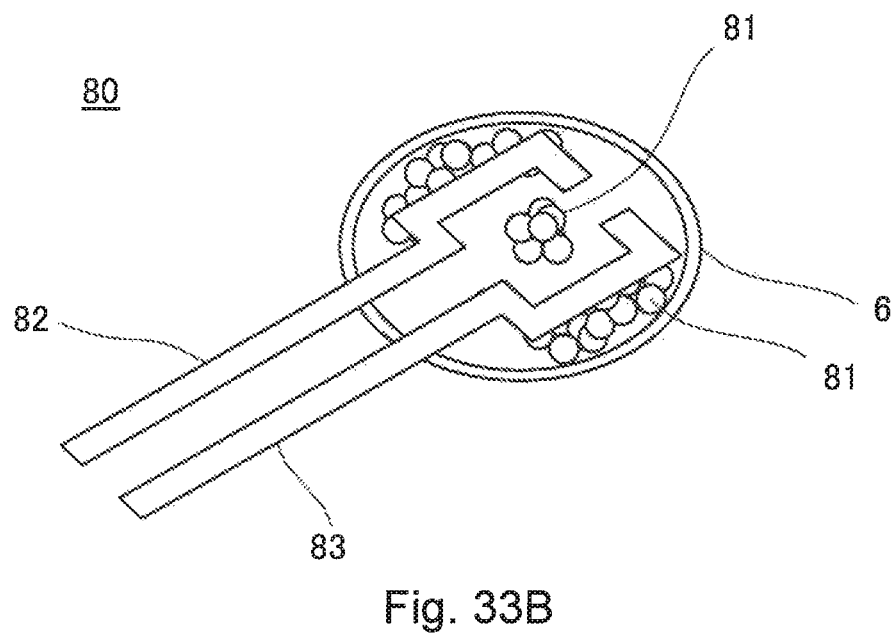

In this switch device 80, before liquid enters the housing 6, as illustrated in FIG. 32, the separately arranged lead terminals 82, 83 are continuous via the conductive particles 81 in an arrangement secured by the insulating material 4, thereby electrically connecting the external circuit. Then, in the switch device 80, as illustrated in FIG. 33 (A), when liquid enters the housing 6 through the guiding inlet 7, such as in wetting with water or liquid leaking from a battery, as illustrated in FIG. 33 (B), the insulating material 4 contracts or dissolves on contact with the entering liquid so that the conductive particles 81 in an arrangement between the lead terminals 82, 83 agglomerate. In the switch device 80, agglomeration of the conductive particles 81 arranged and secured between the lead terminals 82, 83 interrupts the conductive path of the conductive particles 81. Accordingly, the switch device 80 can interrupt the external circuit by electrically disconnecting the lead terminals 82, 83.

Furthermore, the switch device 80 may employ an insulating material 4 Which expands, contracts, or dissolves to make an electrical connection between open lead terminals 82, 83. In a switch device 80 illustrated in FIG. 34 (A), conductive particles 81 are secured in an agglomerated state by the insulating material 4 in a region which is not between the lead terminals 82, 83; under normal conditions, the lead terminals 82, 83 are open.

Figure 34A:
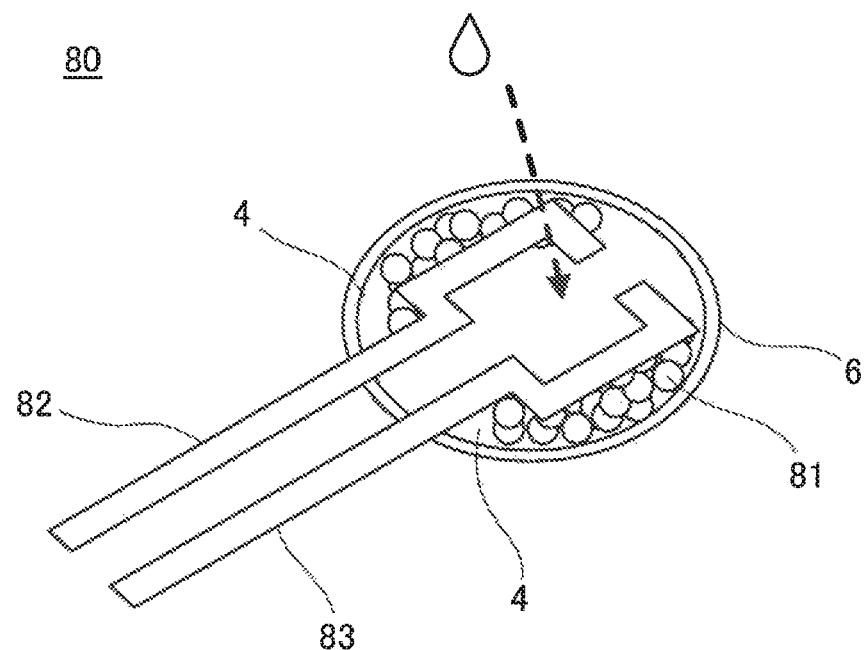
FIG. 34 is a perspective view illustrating a switch device in which lead terminals are opened and are to be electrically connected in (A) a state before liquid enters and (B) a state after liquid enters.
Figure 34B:
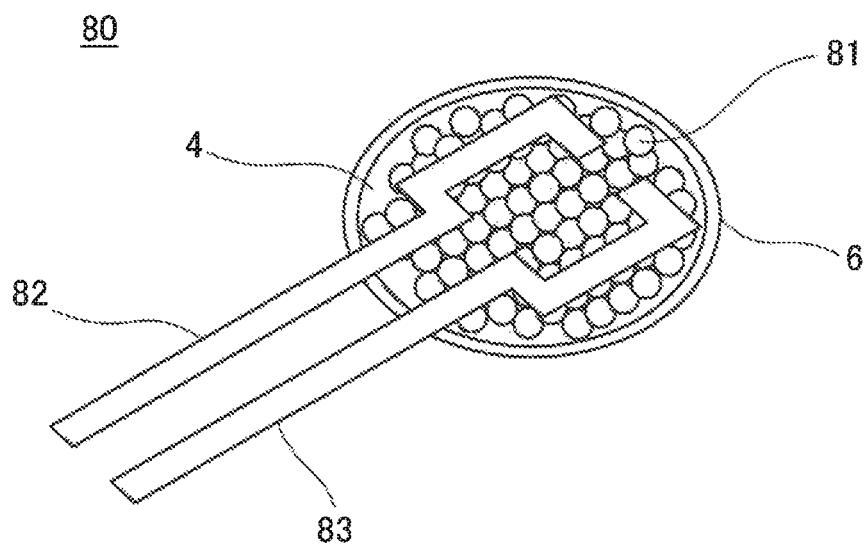

Then, in the switch device 80, when liquid enters the housing 6 through the guiding inlet 7, such as in wetting with water or liquid leaking from a battery, the insulating material 4 expands, contracts, or dissolves on contact with the entering liquid, thereby spreading the conductive particles 81, which were secured in an agglomeration in a region that is not between the lead terminals 82, 83, within the housing 6. Consequently, as illustrated in FIG. 34 (B), in the switch device 80, a large number of the conductive particles 81 enter between the lead terminals 82, 83 and llama a conductive path. Accordingly, the switch device 80 can electrically connect an external circuit by electrically connecting the lead terminals 82, 83.

Alternative Example 8 of the Switch Device

Figure 35A:
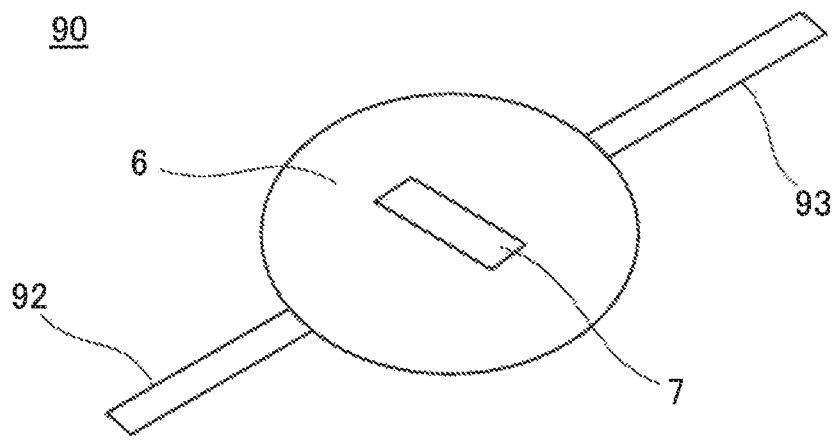
FIG. 35 is a perspective view illustrating a switch device in which lead terminals are opened and are to be electrically connected in (A) an external perspective view and (B) an exploded perspective view.
Figure 35B:
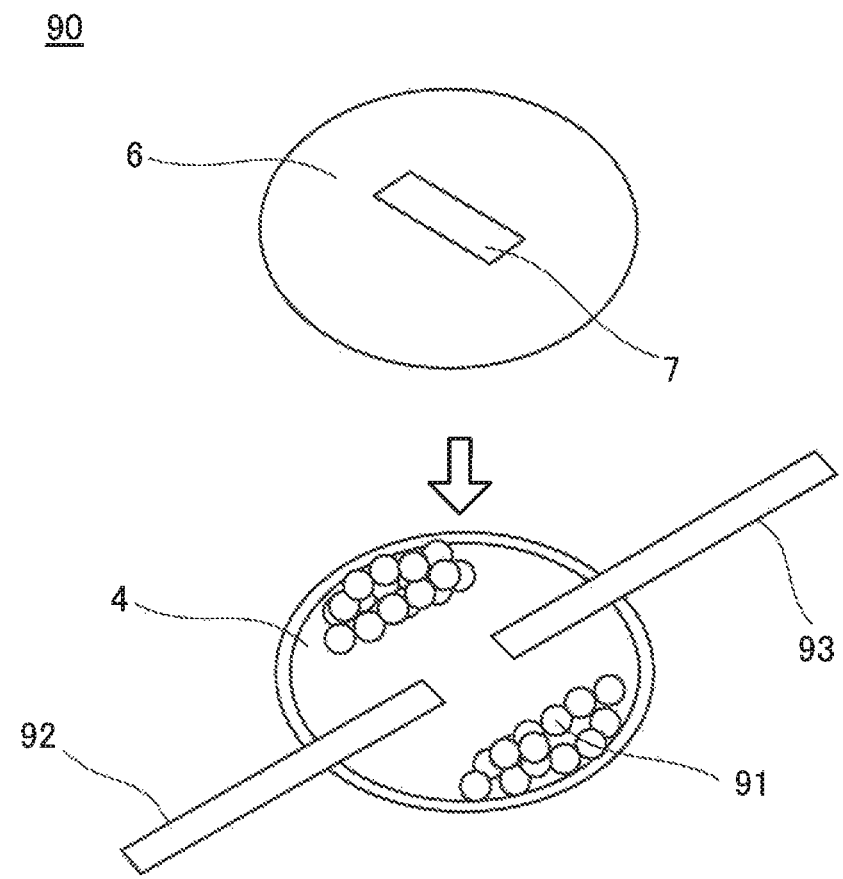

Furthermore, in a switch device according to the present disclosure, the guiding inlet 7 in the housing 6 may be formed in accordance with an agglomeration position of conductive particles 91. As in the switch device 80, a switch device 90 illustrated in FIG. 35 includes lead terminals 92, 93 serving as the first and second conductors 2, 3 and connects the normally open lead terminals 92, 93 via the conductive particles 91.

In the switch device 90, the lead terminals 92, 93 are mutually separated within the housing 6 and the conductive particles 91 are secured in an agglomerated state by an insulating material 4, which dissolves on contact with a liquid, in a region which is not between the lead terminals 97, 93, and, under normal conditions, the lead terminals 92, 93 are open.

The housing 6 of the switch device 90 has a guiding inlet 7 formed in a slit shape through which liquid enters. The guiding inlet 7 is formed in a slit shape at a position corresponding to an agglomeration position of the conductive particles 91 between the lead terminals 92, 93. In particular, in the switch device 90, the lead terminals 92, 93 are supported within the housing 6 in mutual opposition across a predetermined interval; the conductive particles 91 are secured in an agglomerated state by the insulating material 4, which is water-soluble, in positions on opposite sides sandwiching the lead terminals 92, 93 and the gap therebetween. Then, referring to FIG. 35 (B), the housing 6 of the switch device 90 has the guiding inlet 7 formed in a slit shape oriented to intersect the gap between the lead wires 92, 93. The insulating material 4 entirely fills the interior of the housing 6 and secures the conductive particles 91 in predetermined positions.

Figure 36A:
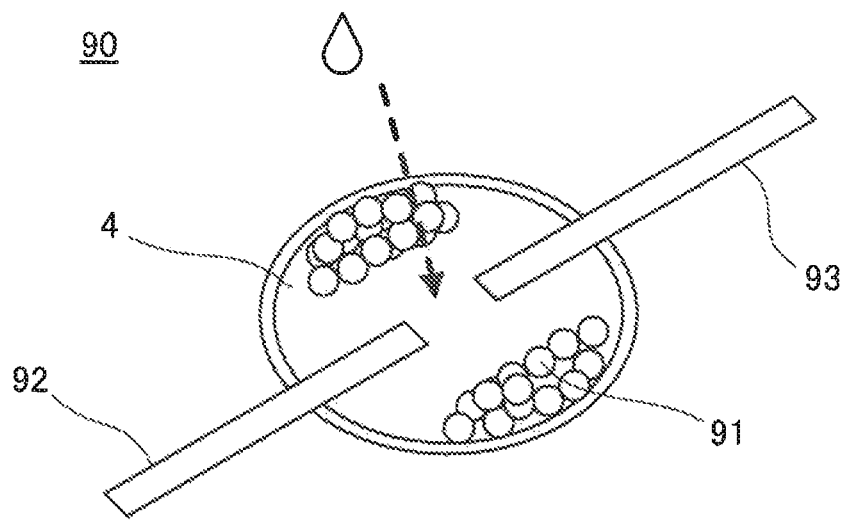
FIG. 36 is a perspective view illustrating the switch device illustrated in FIG. 35 in (A) a state before liquid enters and (B) a state after liquid enters.
Figure 36B:
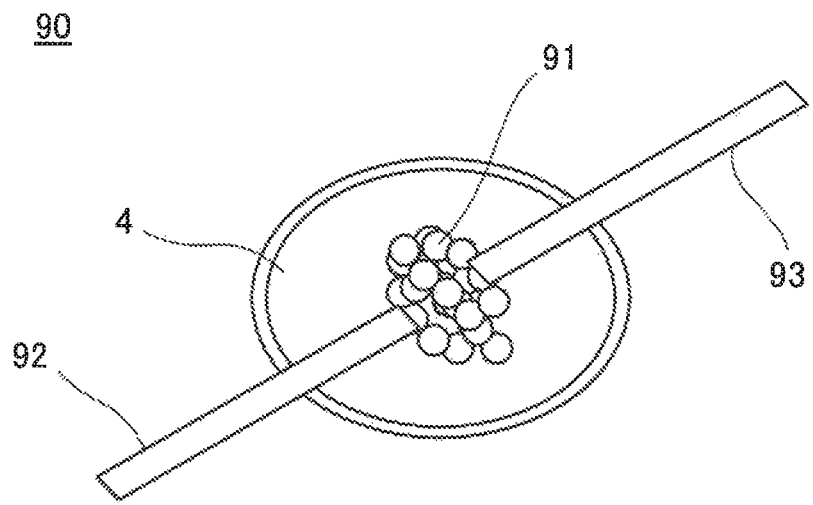

As illustrated in FIG. 36 (A), in the switch device 90, when liquid enters the housing 6 through the guiding inlet 7, such as in wetting with water or liquid leaking from a battery, dissolution of the insulating material 4 by the entering liquid is concentrated at the gap between the lead terminals 92, 93. Consequently, as illustrated in FIG. 36 (B), in the switch device 90, the conductive particles 91 are actively agglomerated between the lead terminals 92, 93, and a conductive path is formed by the conductive particles 91. Accordingly, the switch device 90 can electrically connect an external circuit by connecting the lead terminals 92, 93.

Figure 37A:
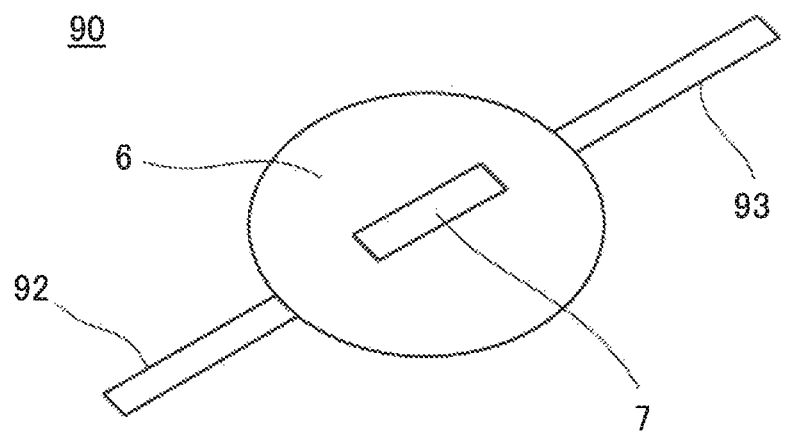
FIG. 37 is a perspective view illustrating another switch device in which lead terminals are opened and are to be electrically connected in (A) an external perspective view and (B) an exploded perspective view.
Figure 37B:
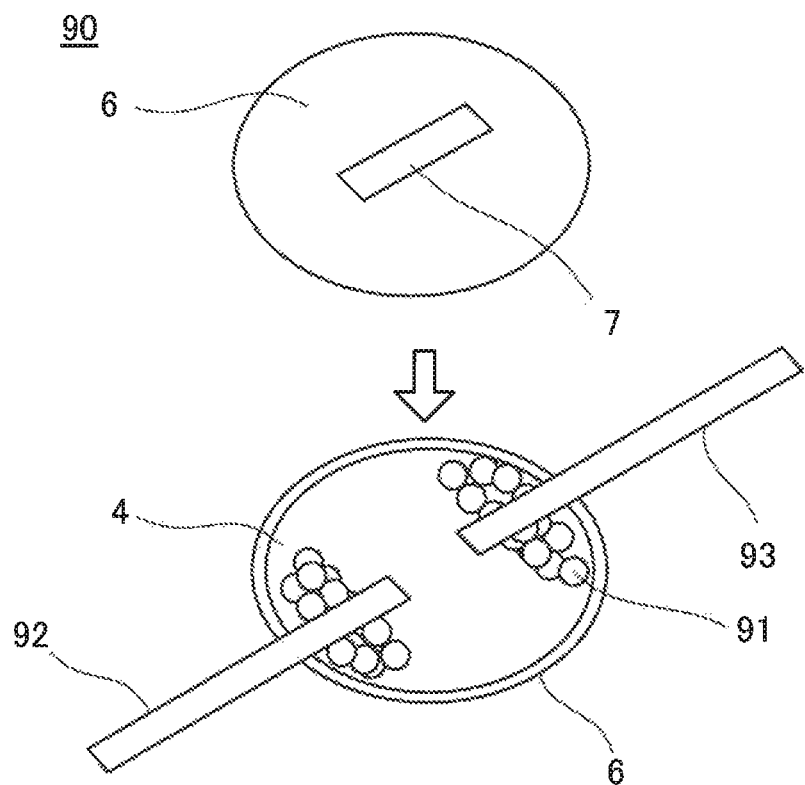

Furthermore, in the switch device 90, as illustrated in. FIGS. 37 (A) and (B), the conductive particles 91 may be agglomerated and secured on sides of the lead terminals 92, 93 which are supported on opposite sides of the housing 6 with a predetermined gap therebetween, and the guiding inlet 7 may be formed in a slit shape above the gap between the lead terminals 92, 93 and aligned in the same direction as the lead terminals 92, 93.

Figure 38A:
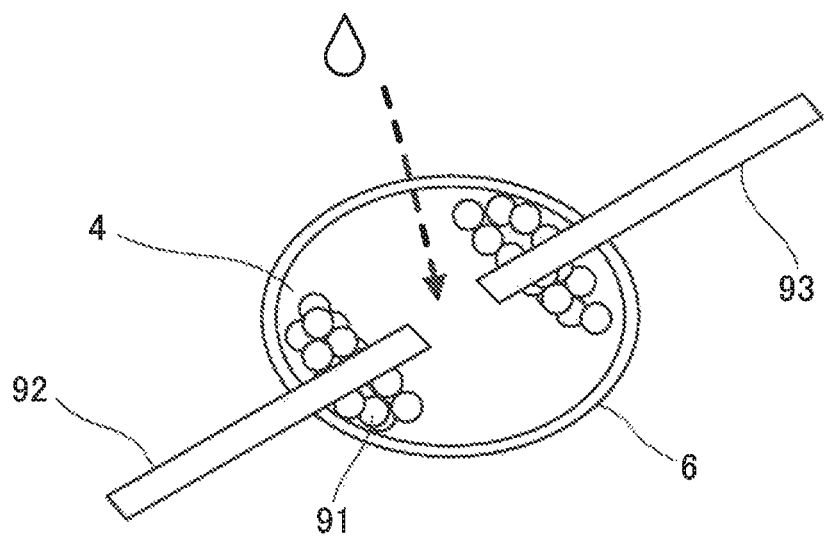
FIG. 38 is a perspective view illustrating an interior of the switch device illustrated in FIG. 37 in (A) a state before liquid enters and (B) a state after liquid enters.
Figure 38B:
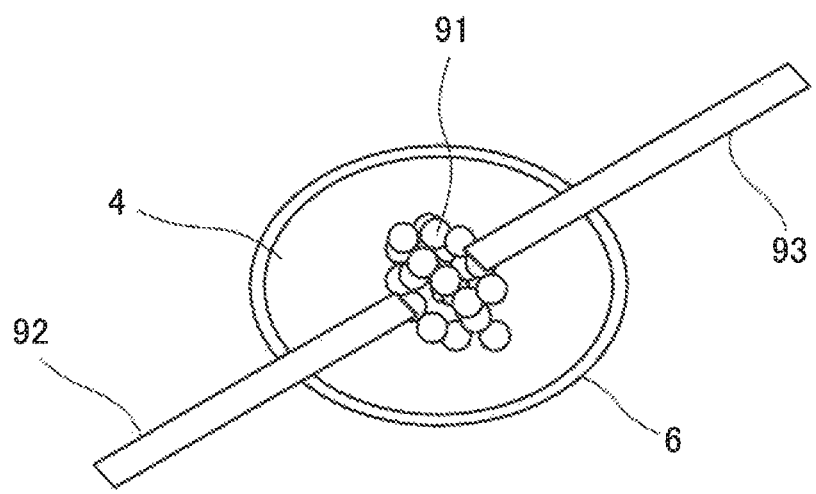

Thereby, as illustrated in FIG. 38 (A), in the switch device 90, when liquid enters the housing 6 through the guiding inlet 7, such as in wetting with water or liquid leaking from a battery, dissolution of the insulating material 4 by the entering liquid is concentrated at the gap between the lead terminals 92, 93. In this case as well, as illustrated in FIG. 38 (B), in the switch device 90, the conductive particles 91 are actively agglomerated between the lead terminals 92, 93, and a conductive path is formed of the conductive particles 91. Accordingly, the switch device 90 can electrically connect an external circuit by connecting the lead terminals 92, 93.

Alternative Example 9 of the Switch Device

Furthermore, in a switch device according to the present disclosure, a conducting layer may be formed on a side surface of the insulating material, and both ends of the conducting layer may be made discontinuous by the insulating material expanding on contact with a liquid. A switch device 100 illustrated in FIGS. 39 and 40 includes a housing 102 having one or more guiding inlets 101, an insulating material 103 which expands on contact with a liquid provided within the housing 102, and an electrically conductive layer 104 which is connected on both ends to an external circuit and which is coated onto a side surface of the insulating material 103; by the insulating material 103 expanding on contact with a liquid entering through the guiding inlet 101, both ends of the conductive layer 104 are to be made discontinuous.

The housing 102 is, for example, formed in a tube shape and houses the insulating material 103. Furthermore, a plurality of the guiding inlets 101 are formed in the housing 102 which penetrate through to the interior of the housing 102. The insulating material 103 housed within the housing 102 is a material which expands on contact with a liquid and can be formed of the same material as that used in the insulating material 4 described above. The conductive layer 104 is formed on a circumferential surface of the insulating material 103 formed, for example, in a cylinder shape.

The conductive layer 104 can be formed of well-known conductive materials such as solder and can be formed using well-known methods such as electroplating or printing. Furthermore, the conductive layer 104 is connected to external-connection electrode members 105, 106, for example a pair of lead wires; these external-connection electrode members 105, 106 are connected to connecting electrodes of an external circuit so that the conductive layer 104 constitutes a portion of a current path of the external circuit.

Figure 39A:
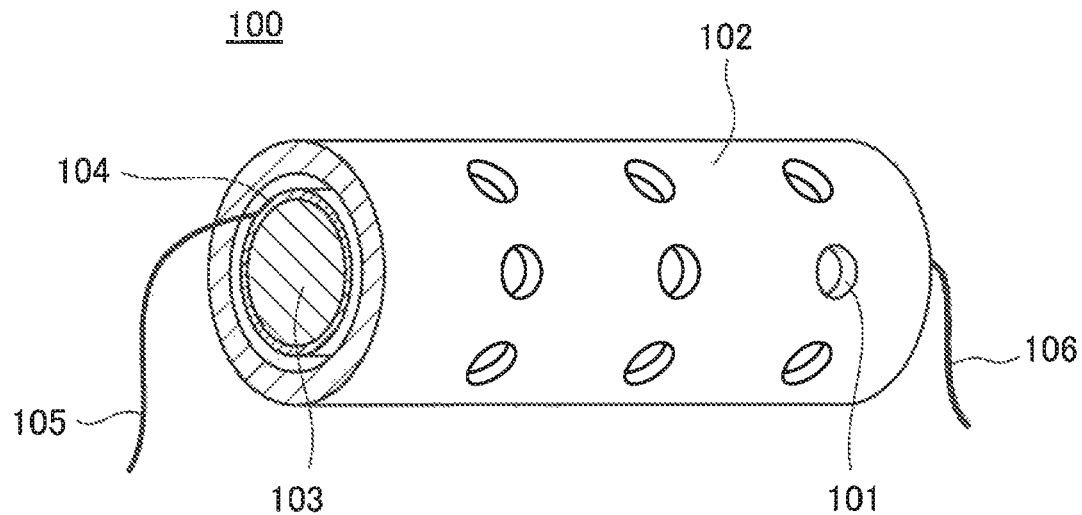
FIG. 39 is a perspective view illustrating a switch device in which a conductive layer is formed on a side surface of an insulating material, and both ends of the conductive layer are to be made discontinuous by the insulating material expanding on contact with a liquid in (A) a state before liquid enters and (B) a state after liquid enters.
Figure 39B:
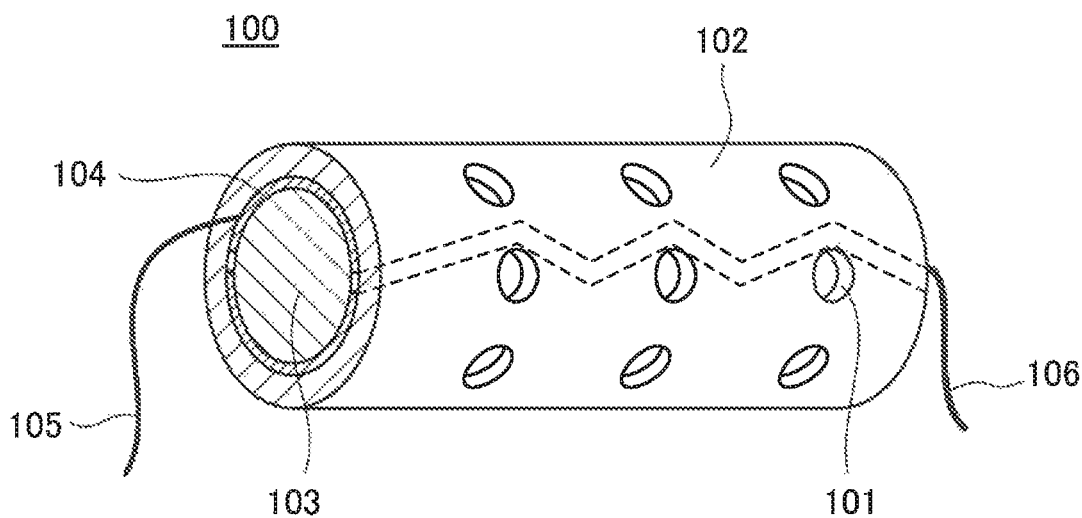
Figure 40A:
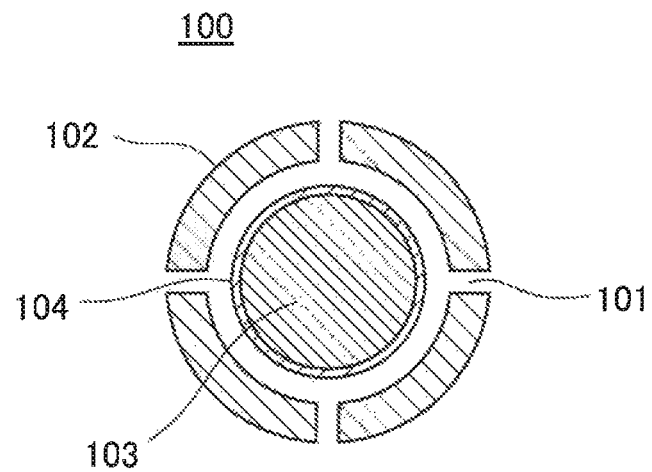
FIG. 40 is a cross-sectional view illustrating the switch device illustrated in FIG. 39 in (A) a state before liquid enters and (B) a state after liquid enters.
Figure 40B:
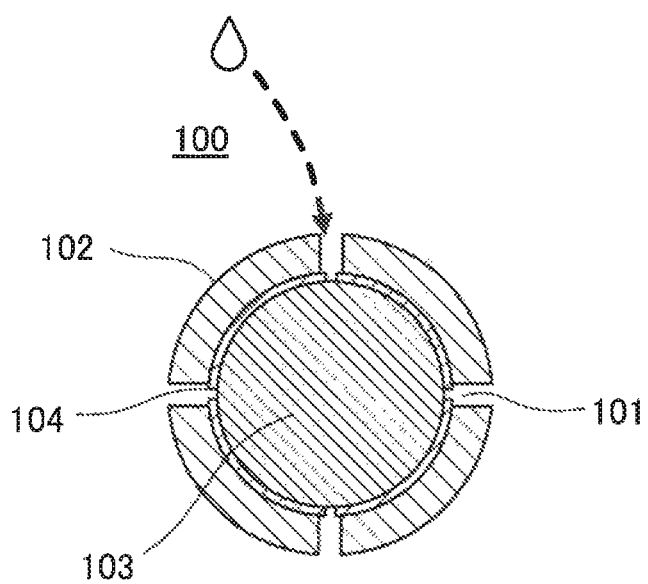

In this switch device 100, before liquid enters the housing 102 through the guiding inlet 101, as illustrated in FIGS. 39 (A) and 40 (B), by connecting a pair of the external-connection electrode members 105, 106 via the conductive layer 104, current is allowed to flow through the external circuit. Then, in the switch device 100, when liquid enters the housing 102 through the guiding inlet 101, such as in wetting with water or liquid leaking from a battery, as illustrated in FIGS. 39 (B) and 40 (B), the insulating material 103 expands on contact with the liquid and fractures the conductive layer 104 formed around the insulating material 103. Consequently, in the switch device 100, the pair of the external-connection electrode members 105, 106 connected via the conductive layer 104 are disconnected from each other, thereby interrupting the external circuit.

It should be noted that, in the switch device 100, the conductive layer 104 may be formed to solidly cover the insulating material 103 around its entire circumference, or the conductive layer 104 may be formed as a linear conductive pattern which wraps in a spiral around the insulating material 103. Furthermore, in the switch device 100, as is illustrated in FIG. 41 (A), the conductive layer 104 may be constituted by an electrically conductive linear member 107 such as a wire which wraps in a spiral around the side surface of the insulating material 103.

Figure 41A:
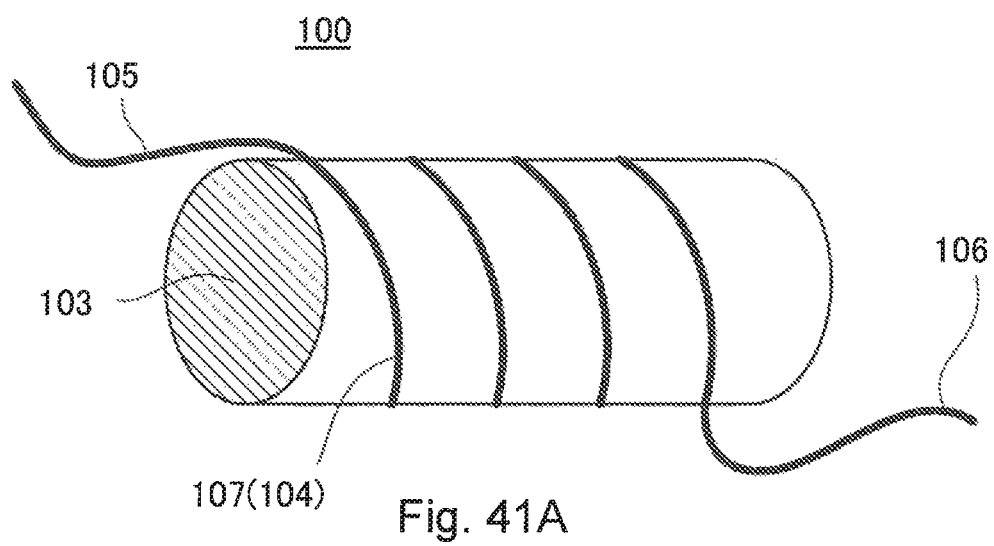
FIG. 41 is a perspective view illustrating a switch device in which a conductive layer is constituted by a conductive linear member which wraps in a spiral around a side surface of an insulating material in (A) a state before liquid enters and (B) a state after liquid enters.
Figure 41B:
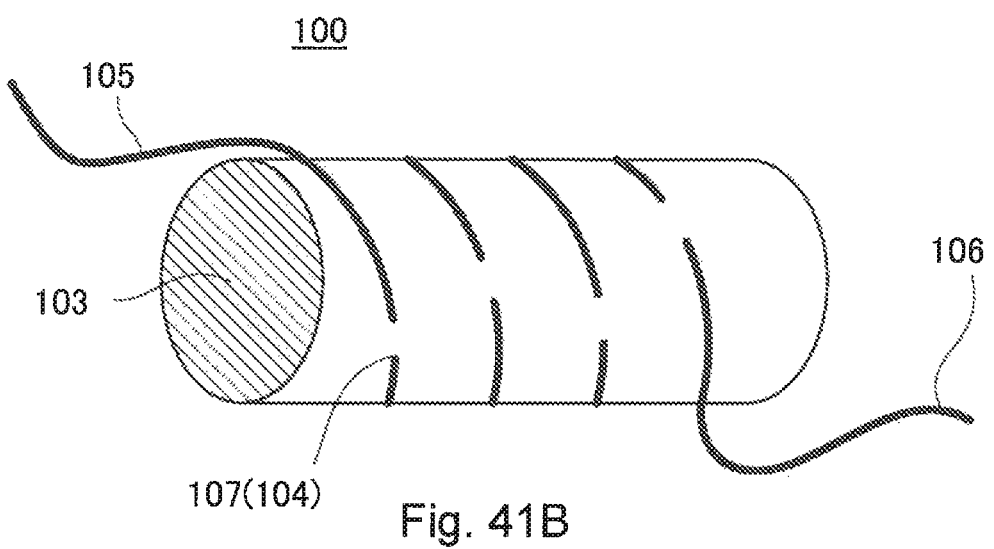

In the switch device 100, the conductive layer 104 can be easily formed by winding the electrically conductive linear member 107 in a spiral, and as illustrated in FIG. 41 (B), when the insulating material 103 expands, the linear member 107 is broken in portions so that it is possible to reliably interrupt the current path.

It should be noted that, in the switch device 100, the insulating material 103 may be formed in a hollow round tube shape and the conductive layer 104 may be formed on an inner circumferential surface. In this case as well, by the insulating material 103 expanding on contact with a liquid, the conductive layer 104 formed on the inner circumferential surface is cut, and it is possible to interrupt the current path.

Alternative Example 10 of the Switch Device

Furthermore, in a switch device according to the present disclosure, a conductive layer may be formed on a side surface of an insulating material, and both ends of the conductive layer which are interrupted may be connected by the insulating material expanding on contact with a liquid. A switch device 110 illustrated in FIGS. 42 and 43 includes a housing 112 which is in hollow shape and which has one or more guiding inlets 111 through which a liquid enters, an insulating material 113 in a tube shape is arranged in alignment with an interior wall of the housing 112 and expands on contact with the liquid, and a conductive layer 114 in a linear shape, which is connected on both ends to an external circuit, wraps around an inner circumferential surface of the insulating material 113.

The housing 112 is, for example, in a round tube shape and houses the insulating material 113 which is arranged in alignment with an interior wall of the housing 112. Moreover, in the housing 112, a slit-shaped guiding inlet 111 is formed. The insulating material 113 housed within the housing 112 is of a material which expands on contact with a liquid and can be made of the same materials used in the above-described insulating material 4. The insulating material 113 is in, for example, a round tube Shape similar to that of the casing 112, and a linear conductive layer 114 wraps in a spiral around an inner circumferential surface.

The conductive layer 114 may be formed of well-known conductive materials such as solder and may be formed using well-known methods such as electroplating or printing. Furthermore, the conductive layer 114 is connected to external-connection electrode members 115, 116, for example a pair of lead wires, the external-connection electrode members 115, 116 are connected to connecting electrodes of an external circuit so that the conductive layer 114 constitutes a portion of a current path of the external circuit.

Figure 42A:
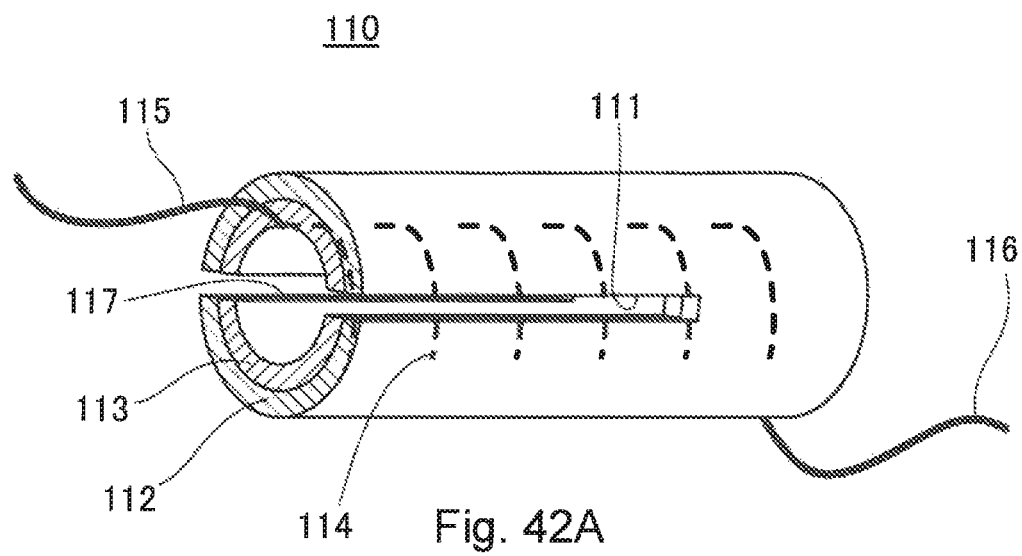
FIG. 42 is a perspective view illustrating a switch device in which a conductive layer formed on a side surface of an insulating material is electrically insulated and is to be connected by the insulating material expanding on contact with a liquid in (A) a state before liquid enters and (B) a state after liquid enters.
Figure 42B:
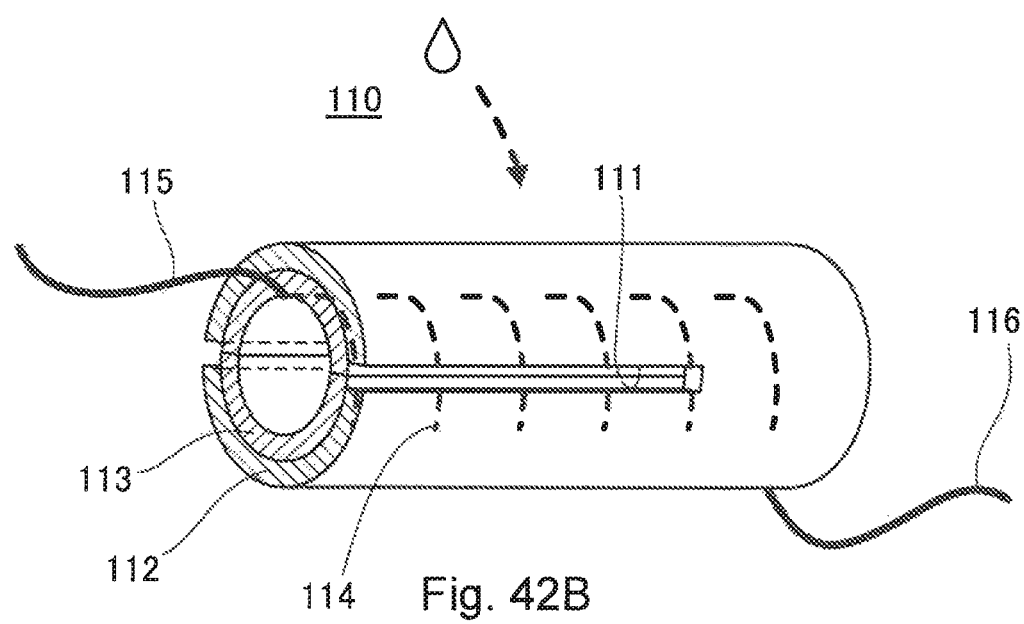
Figure 43A:
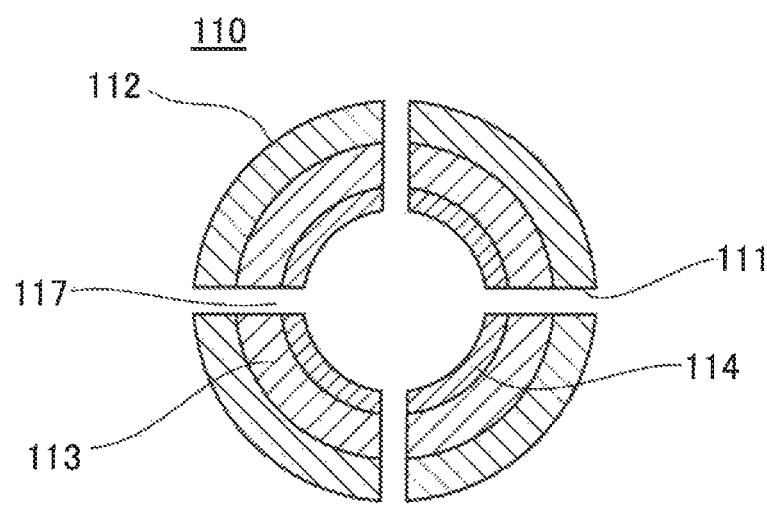
FIG. 43 is a cross-sectional view illustrating the switch device illustrated in FIG. 42 in (A) a state before liquid enters and (B) a state after liquid enters.
Figure 43B:
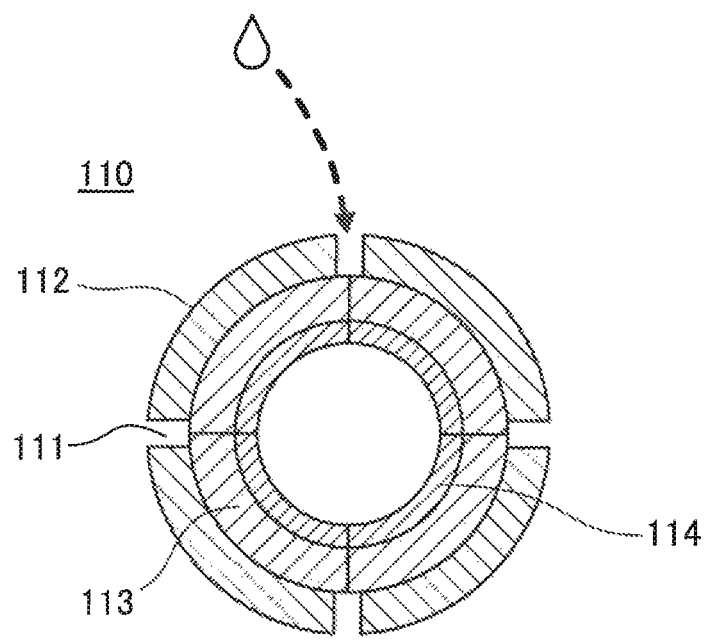

As illustrated in FIGS. 42 (A) and 43 (A), a slit 117, which is continuous with the guiding inlet 111, is formed in the insulating material 113 and the conductive layer 114, and both ends of the conductor 114, which are connected to the external-connection electrode members 115, 116, are made discontinuous by the slit 117. Consequently, in the switch device 110, in a state before liquid enters the housing 112 through the guiding inlet 111, the external circuit is interrupted by the conductive layer 114 being discontinuous.

Then, in the switch device 110, when liquid enters the through the guiding inlet 111 and the slit 117, such as in wetting with water or liquid leaking from a battery, as illustrated in FIGS. 42 (B) and 43 (B), the insulating material 113 expands to conform with the inner circumferential surface of the housing 112 on contact with the entering liquid, thus closing the slit 117. Thereby, in the switch device 110, a conductive path is formed by connecting the conductive layer 114 formed around the insulating material 113, and it is possible to electrically connect an external circuit which was made discontinuous by the slit 117.

It should be noted that, as the conductive layer 114, instead of the conductive pattern, the switch device 110 may employ a linear member which is electrically conductive, or a combination of a conductive pattern and a linear member having an electrically conducting property may be used. Furthermore, one or both ends of a discontinuity created by the slit 117 in the conductive layer 114 to be connected when the insulating material 113 expands may be formed to be metal terminals in order to improve connection properties.

EXAMPLE APPLICATION 1

Figure 44:
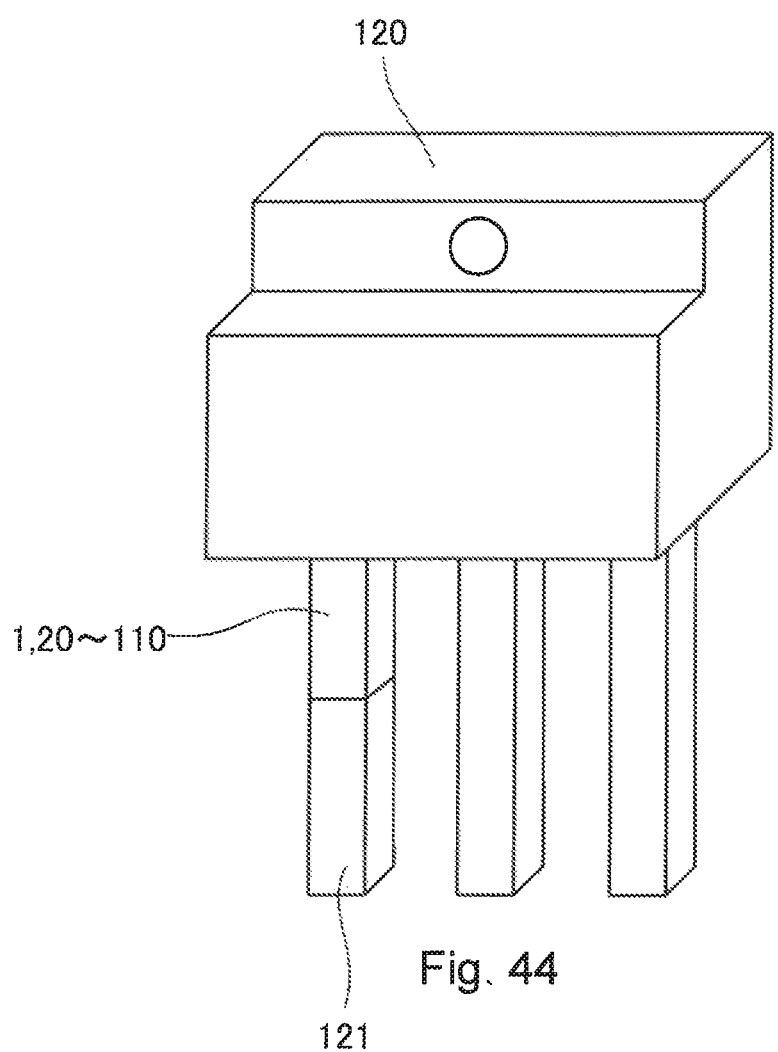
FIG. 44 is a perspective view illustrating an electronic component using a switch device according to the present disclosure.

Next, an example application of the present disclosure will be described. The switch device 1, 20 to 110 according to the present disclosure may be incorporated in an electronic component such as an FET. For example, referring to FIG. 44, in the switch device 1, 20 to 110, a gate electrode 121 of an FET 120 is provided with the housing 6; the gate electrode 121 serves as the first and second conductors 2, 3 which are electrically connected under normal conditions.

In the FET 120, in a normal state before liquid enters, the gate electrode 121 allows current to pass and is connected to a connection terminal on any kind of circuit board. Then in the FET 120, when liquid enters the housing 6, current in the gate electrode 121 is interrupted in response to a state change of the reaction part 5. Therefore, the FET 30 can stop switching (deactivate functioning) by wetting with a liquid.

It should be noted that, in the switch device 1, 20 to 110, the housing of the FET 120 may be used as the housing 6 and provided with the guiding inlet 7 together with providing the reaction part 5 inside the housing of the FET 120.

EXAMPLE APPLICATION 2

Figure 45:
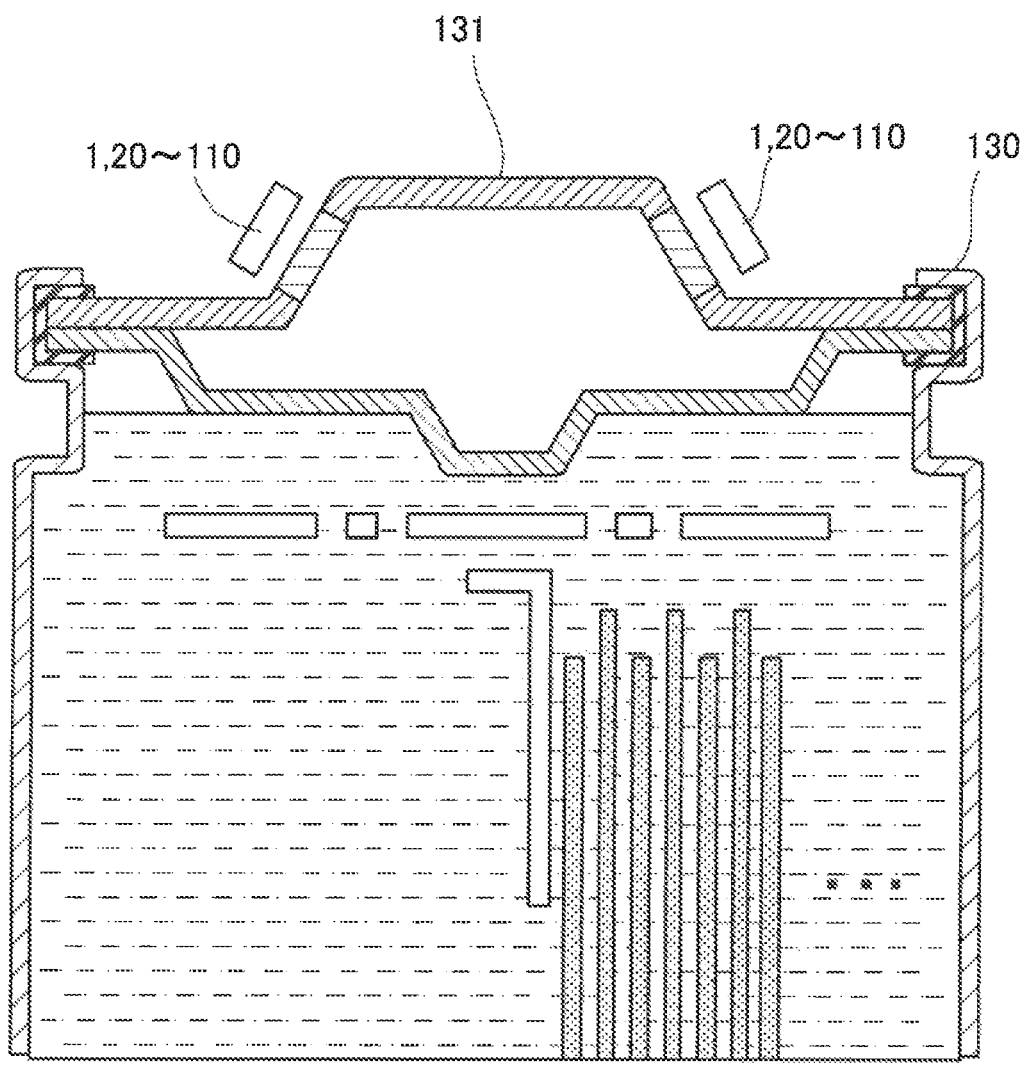
FIG. 45 is a schematic view illustrating a battery system using a switch device according to the present disclosure.

Furthermore, the switch device 1, 20 to 110 according to the present disclosure may be incorporated in a battery cell. For example, referring to FIG. 45, in the switch device 1, 20 to 110, a positive electrode 131 of a battery cell 130 serves as the first and second conductors 2, 3 through which current is allowed to flow under normal conditions, a battery holder which is not illustrated serves as the housing 6; when the battery cell 130 is installed in the battery holder, a reaction part 5 provided on a battery holder side and the positive electrode 131 of the battery cell 130 face each other.

The positive electrode 131 of the battery cell 130 allows current to flow under normal conditions, and electrical power is supplied to a circuit of any kind via electrode terminals of the battery holder. Then, in the battery cell 130, when a liquid enters the battery holder, such as in wetting with water or liquid leaking from a battery, electrical current in the positive electrode 131 is interrupted in response to a state change of the reaction part 5. Thereby, the switch device 1, 20 to 110 can stop a current flow of the battery cell 130 by being wet with a liquid.

Figure 46:
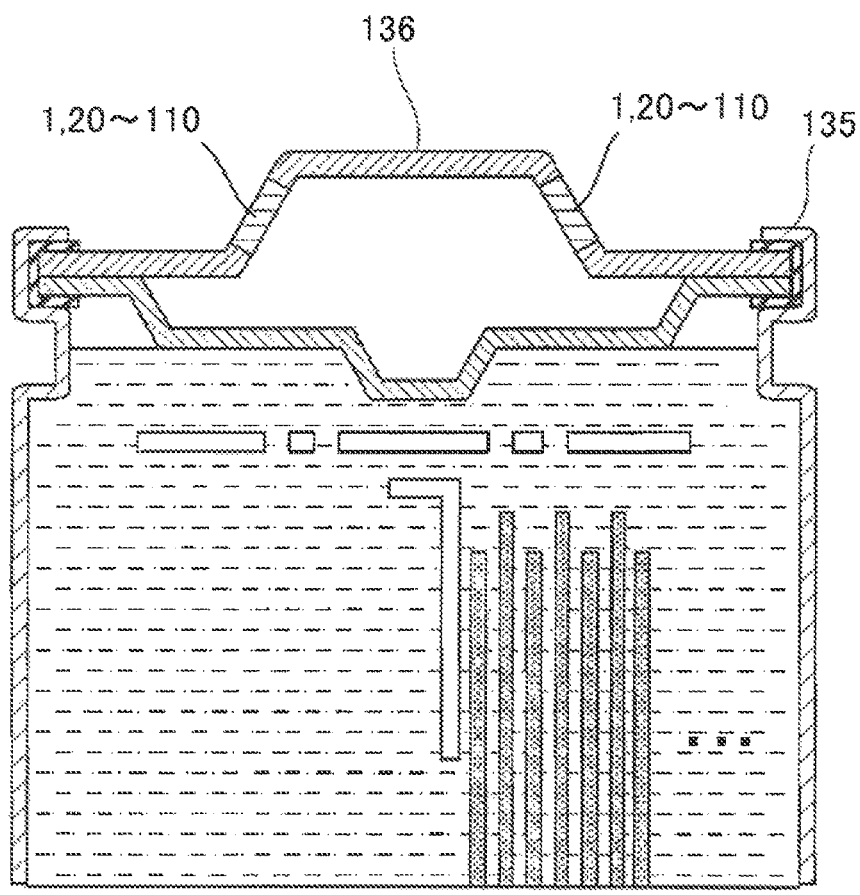
FIG. 46 is a schematic view illustrating a battery using a switch device according to the present disclosure.

Furthermore, as illustrated in FIG. 46, the switch device 1, 20 to 110 may he integrally formed in the positive electrode of the battery cell. In a battery cell 135 illustrated in FIG. 46, the switch device 1, 20 to 110 is integrally formed in the positive electrode 136, and the positive electrode can be electrically connected by the first and second electrodes 2, 3 of the switch device 1, 20 to 110 allowing current to pass. Then, in the battery cell 135, when a liquid enters the housing 6, such as in wetting with water or liquid leaking from a battery, the first and second conductors 2, 3 are separated in response to a state change of the reaction part 5, thereby interrupting electrical current in the positive electrode 136. Thus, the switch device 1, 20 to 110 can stop a current flow of the battery cell 135 by being wet with a liquid.

Figure 47:
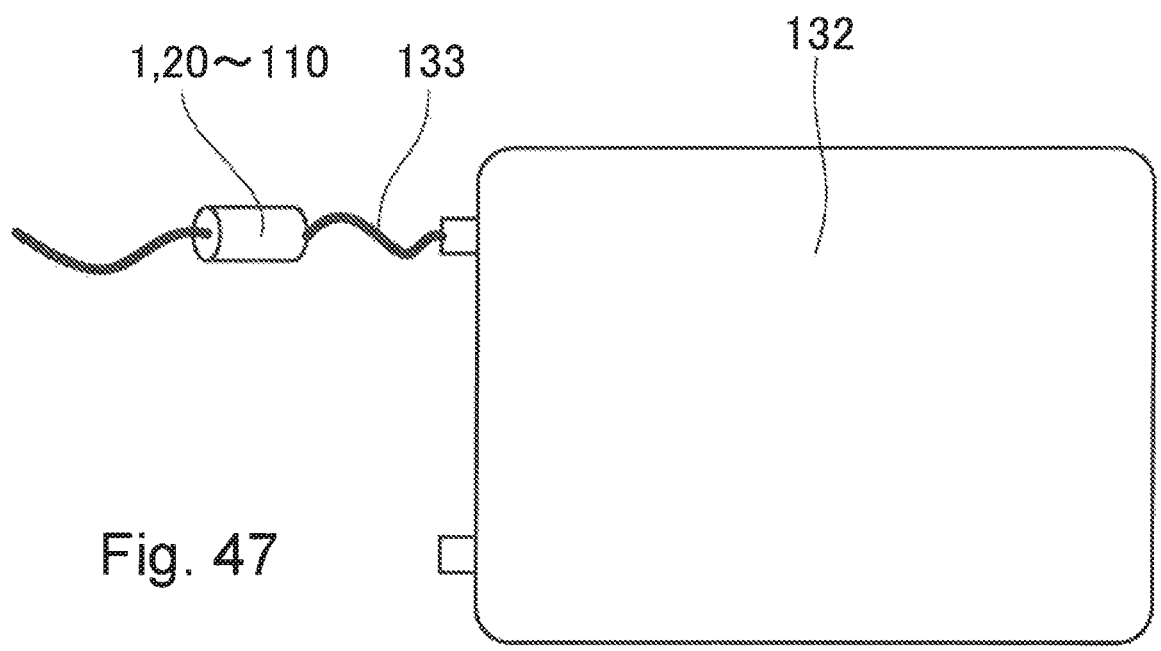
FIG. 47 is a schematic view illustrating a battery system using a switch device according to the present disclosure.

Furthermore, as illustrated in FIG. 47, the switch device 1, 20 to 110 may be provided on a charge/discharge path of a laminated battery cell 132. In the switch device 1, 20 to 110, a lead wire 133 used as the charge/discharge path of the laminated battery cell 132 serves as the first and second conductors 2, 3.

The laminated battery cell 132 is electrically connected via the switch device 1, 20 to 110 under normal conditions and can be charged/discharged. Then, in the laminated battery cell 132, when liquid enters the housing of the switch device 1, 20 to 110, electrical current is interrupted in the lead wire 133 in response to a state change of the reaction part 5. Thereby, it is possible to interrupt the charge/discharge path of the laminated battery cell 132 with the switch device 1, 20 to 110.

REFERENCE SIGNS LIST 1 switch device, 2 first conductor, 3 second conductor, 4 insulating material, 5 reaction part, 6 housing, 6c upper half, 6d lower half, 7 guiding inlet, 8 discharging outlet, 9 guiding inlet, 10 water repellent treated portion, 11 sheet, 12 external circuit, 20 switch device, 21 first metal terminal piece, 21*a* contact portion, 22 second metal terminal piece, 22*a* contact portion, 30 switch device, 31 guiding inlet, 32. outer conductor, 33 inner conductor, 34 insulating film, 40 switch device, 41 conductive particles, 42, 43 lead wires, 44, 45 metal terminal pieces, 46, 47 external-connection electrodes, 48 space, 50 switch device, 51 conductive particles, 52, 53 lead wires, 54 space, 55 mesh member, 56, 57 metal terminal pieces, 58 sheet, 59 space, 60 switch device, 61 conductive particles, 62 space, 63, 64 lead wires, 65 conductive particles, 66 sheet, 70 switch device, 71 conductive particles, 72, 73 external-connection electrodes, 74 securing part, 80 switch device, 81 conductive particles, 82, 83 lead terminals, 90 switch device, 91 conductive particles, 92, 93 lead terminals, 100 switch device, 101 guiding inlet, 102 housing, 103 insulating material, 104 conductive layer, 105, 106 external-connection electrode members, 107 linear member, 110 switch device, 111 guiding inlet, 112 housing, 113 insulating material, 114 conductive layer, 115, 116 external-connection electrode members, 117 slit, 120 FET, 130 battery cell, 131 positive electrode, 132 laminated battery cell

The invention claimed is:

1. A switch device comprising:
   first and second conductors connected to an external circuit; and
   a reaction part having an insulating material which changes state on contact with a liquid,
   wherein the first and second conductors are to be electrically connected or disconnected by the insulating material changing state by any of contracting, dissolving, and agglomerating on contact with the liquid, and
   wherein the first and second conductors are connected under normal conditions and are to be separated by the insulating material contracting or dissolving.

2. The switch device according to claim 1, further comprising a housing having one or more guiding inlets through which the liquid enters,
   wherein the insulating material and conductive particles are filled in the housing, and
   wherein the first and second conductors are connected via the conductive particles and are to be separated by the insulating material contracting or dissolving on contact with the liquid which enters through the one or more guiding inlets.

3. The switch device according to claim 2, wherein the first and second conductors are lead terminals led out from inside the housing.

4. A switch device comprising:
   first and second conductors connected to an external circuit; and
   a reaction part having an insulating material which changes state on contact with a liquid, wherein the first and second conductors are to be electrically connected or disconnected by the insulating material changing state by any of contracting, dissolving, and agglomerating on contact with the liquid, and wherein the first and second conductors are separated under normal conditions and are connected by the insulating material contracting or dissolving; and
   a housing having one or more guiding inlets through which the liquid enters,
   wherein the first and second conductors are lead terminals led out from inside the housing,
   wherein the insulating material and conductive particles are filled in the housing, and
   wherein the first and second conductors are separated and are to be connected via conductive particles by the insulating material contracting or dissolving on contact with the liquid entering through the one or more guiding inlets.

5. A switch device comprising:
   first and second conductors connected to an external circuit; and
   a reaction part having an insulating material which changes state on contact with a liquid,
   wherein the first and second conductors are to be electrically connected or disconnected by the insulating material changing state on contact with the liquid, wherein the first conductor is a tube-shaped body having one or more guiding inlets through which the liquid enters,
   wherein the second conductor is disposed within a hollow interior of the first conductor,
   wherein an interior wall of the first conductor or a surface of the second conductor is coated with the insulating material, and
   wherein the first and second conductors are electrically connected by the insulating material dissolving on contact with the liquid entering through the one or more guiding inlets.

6. A switch device comprising:
   first and second conductors connected to an external circuit; and
   a reaction part having an insulating material which changes state on contact with a liquid,
   wherein the first and second conductors are to be electrically connected or disconnected by the insulating material changing state on contact with the liquid, wherein the first conductor is a tube-shaped body having one or more guiding inlets through which the liquid enters,
   wherein the second conductor is disposed within a hollow interior of the first conductor,
   wherein the insulating material is interposed between the first and second conductors so as to shield the second conductor from the first conductor, and
   wherein the first and second conductors are to be electrically connected by the insulating material dissolving on contact with the liquid entering through the one or more guiding inlets.

7. A switch device comprising:
   first and second conductors connected to an external circuit; and
   a reaction part having an insulating material which changes state on contact with a liquid, wherein the first and second conductors are to be electrically connected or disconnected by the insulating material changing state by any of contracting, dissolving, and agglomerating on contact with the liquid; and
   a housing having one or more guiding inlets through which the liquid enters,
   wherein the insulating material is provided on an interior wall of the housing and conductive particles are arranged at a location at which the one or more guiding inlets open, and
   wherein the first and second conductors are provided in separation within the housing and are electrically connected via the conductive particles.

8. The switch device according to claim 7, wherein the one or more guiding inlets are blocked by a water-soluble material which dissolves in the liquid.

9. A switch device comprising:
   first and second conductors connected to an external circuit; and a reaction part having an insulating material which changes state on contact with a liquid, wherein the first and second conductors are to be electrically connected or disconnected by the insulating material changing state on contact with the liquid, further comprising a housing having one or more guiding inlets through which the liquid enters, wherein the first and second conductors are provided in separation within the housing and are electrically connected via conductive particles arranged within the housing, wherein the one or more guiding inlets are provided with a guiding conduit filled with the insulating material and facing the arranged conductive particles within the housing, wherein a space, into which the conductive particles are to be pushed, is provided below the arranged conductive particles, and wherein the conductive particles are to be pushed into the space by the insulating material expanding on contact with the liquid entering through the one or more guiding inlets to interrupt the arrangement of conductive particles.

10. The switch device according to claim 9, wherein the one or more guiding inlets are disposed on a surface of the housing and are blocked by a mesh member having a mesh size which is smaller than a size of the insulating material when the insulating material is expanded.

11. The switch device according to claim 9, wherein the one or more guiding inlets are formed in a tapered shape widening from an opening on a surface side of the housing towards a vicinity within the housing facing the arranged conductive particles.

12. The switch device according to claim 11, wherein the housing is made of a ceramic material or coated with a ceramic material.

13. The switch device according to claim 11, wherein the housing is made of a porous material.

14. A switch device comprising:

first and second conductors connected to an external circuit; and a reaction part having an insulating material which changes state on contact with a liquid, wherein the first and second conductors are to be electrically connected or disconnected by the insulating material changing state on contact with the liquid, further comprising a housing having one or more guiding inlets through which the liquid enters, wherein the first and second conductors are provided in separation within the housing and are electrically connected via an arrangement of conductive particles arranged within the housing, wherein the insulating material is provided in a sheet shape between the one or more guiding inlets and the arrangement of the conductive particles, wherein the conductive particles are to be pushed into a space provided below the arrangement of conductive particles, and wherein the arranged conductive particles are to be interrupted by the insulating material expanding on contact with the liquid entering through the one or more guiding inlets.

15. The switch device according to claim 14, wherein the first and second conductors are disposed in parallel in a non-contacting manner, and wherein the conductive particles are arranged between the first and second conductors.

16. A switch device comprising:

first and second conductors connected to an external circuit; and a reaction part having an insulating material which changes state on contact with a liquid, wherein the first and second conductors are to be electrically connected or disconnected by the insulating material changing state on contact with the liquid, further comprising a housing having one or more guiding inlets through which the liquid enters, wherein the one or more guiding inlets are filled with the insulating material and conductive particles, wherein the one or more guiding inlets are continuous with a space into which the conductive particles are to be pushed, wherein the first and second conductors are provided in separation within the space, wherein the insulating material expands on contact with the liquid entering through the one or more guiding inlets and pushes the conductive particles from the one or more guiding inlets into the space, and wherein the first and second conductors are to be connected via conductive particles pushed into the space.

17. A switch device comprising:

first and second conductors connected to an external circuit; and a reaction part having an insulating material which changes state on contact with a liquid, wherein the first and second conductors are to be electrically connected or disconnected by the insulating material changing state on contact with the liquid, further comprising a housing having a plurality of guiding inlets in a lattice pattern through which the liquid enters, wherein the insulating material and conductive particles are provided within the housing, wherein the first and second conductors are provided in separation within the housing, wherein the insulating material defines an arrangement of the conductive particles in a lattice pattern in accordance with the guiding inlets opening through the housing, the conductive particles electrically connecting the first and second conductors, and wherein the first and second conductors are in contact via the conductive particles and are to be electrically disconnected by the insulating material expanding, contracting, or dissolving on contact with the liquid entering through the guiding inlets, the conductive particles agglomerating at a position corresponding to one or more of the guiding inlets through which the liquid enters, and movement of the conductive particles being restricted by a securing part provided within the housing.

18. A switch device comprising:

first and second conductors connected to an external circuit; and a reaction part having an insulating material which changes state on contact with a liquid, wherein the first and second conductors are to be electrically connected or disconnected by the insulating material changing state on contact with the liquid, further comprising a housing having a plurality of guiding inlets in a lattice pattern, wherein the insulating material and conductive particles are provided within the housing, wherein the first and second conductors are provided in separation within the housing, wherein the conductive particles are arranged in the insulating material between the first and second conductors in a linear pattern corresponding to the guiding inlets opening through the housing, and wherein the first and second conductors are in contact via the conductive particles and are to be electrically disconnected by the insulating material expanding, contracting, or dissolving on contact with the liquid entering through the guiding inlets, the conductive particles agglomerating at a position corresponding to the guiding inlet through which the liquid enters, and movement of the conductive particles being restricted by a securing part provided within the housing.

19. A switch device comprising:

a housing having one or more guiding inlets through which a liquid enters;

an insulating material having a cylindrical shape which is provided in the housing and which expands on contact with the liquid; and a conductive layer which is connected on both ends to an external circuit and which is formed on a circumferential surface of the insulating material, wherein the both ends of the conductive layer are to be made discontinuous by the insulating material expanding on contact with the liquid entering through the one or more guiding inlets.

20. The switch device according to claim 19, wherein the conductive layer comprises a linear conductive pattern or a linear member having a conducting property wrapped in a spiral around a side surface of the insulating material.

21. A switch device comprising:

a housing in a hollow shape having one or more guiding inlets through which a liquid enters;

an insulating material in a tube shape which expands on contact with the liquid aligned with an interior wall of the housing; and a conductive layer in a linear shape which is connected on both ends to an external circuit and which wraps around an inner circumferential surface of the insulating material, wherein, in the insulating material and the conductive layer, a slit is formed which is continuous with the one or more guiding inlets, the both ends of the conductive layer being made discontinuous by the slit, and wherein the both ends of the conductive layer made discontinuous by the slit are to be connected by the insulating material expanding on contact with the liquid entering through the one or more guiding inlets.

22. The switch device according to claim 21, wherein the conductive layer is a linear conductive pattern or a linear member having a conducting property wrapped around an inner wall surface of the insulating material.

23. A battery system comprising:

a battery; and a reaction part having an insulating material which changes state on contact with a liquid, wherein a positive electrode or a negative electrode of the battery is to be insulated by the insulating material contracting, agglomerating, or dissolving on contact with the liquid.

* * * * *